(12) United States Patent
Fiske

(10) Patent No.: US 9,026,768 B2
(45) Date of Patent: May 5, 2015

(54) EXECUTING MACHINE INSTRUCTIONS COMPRISING INPUT/OUTPUT PAIRS OF EXECUTION NODES

(75) Inventor: Michael Stephen Fiske, San Francisco, CA (US)

(73) Assignee: Aemea Inc., Las Vegas, NV (US)

( * ) Notice: Subject to any disclaimer, the term of this patent is extended or adjusted under 35 U.S.C. 154(b) by 1025 days.

(21) Appl. No.: 12/499,749

(22) Filed: Sep. 14, 2009

(65) Prior Publication Data

US 2011/0066833 A1    Mar. 17, 2011

(51) Int. Cl.
*G06F 9/30* (2006.01)
*G06F 15/82* (2006.01)

(52) U.S. Cl.
CPC .............. *G06F 9/30* (2013.01); *G06F 9/30003* (2013.01); *G06F 15/825* (2013.01)

(58) Field of Classification Search
CPC ...... G06F 9/30; G06F 9/30003; G06F 15/825
USPC ..................... 717/132, 156, 157; 712/25, 200, 712/E9.016, E9.003, 201
See application file for complete search history.

(56) References Cited

U.S. PATENT DOCUMENTS

| | | | |
|---|---|---|---|
| 4,555,796 A * | 11/1985 | Sakoe | ............................ 704/241 |
| 4,961,005 A | 10/1990 | Salam | |
| 5,148,514 A | 9/1992 | Arima et al. | |
| 5,216,752 A | 6/1993 | Tam | |
| 5,303,328 A | 4/1994 | Masui et al. | |
| 5,325,464 A | 6/1994 | Pechanek et al. | |
| 5,481,644 A | 1/1996 | Inazumi | |
| 5,832,466 A | 11/1998 | Feldgajer | |
| 6,169,771 B1 | 1/2001 | Shou et al. | |
| 6,256,619 B1 | 7/2001 | Grichnik | |
| 6,292,586 B1 | 9/2001 | Kawakami et al. | |
| 6,470,261 B1 | 10/2002 | Ng et al. | |
| 6,601,053 B1 | 7/2003 | Schaffer et al. | |
| 6,678,548 B1 | 1/2004 | Echauz et al. | |
| 6,704,757 B1 | 3/2004 | Ohmi et al. | |
| 6,934,938 B2 * | 8/2005 | May et al. | ...................... 717/132 |

(Continued)

FOREIGN PATENT DOCUMENTS

| WO | WO/2007/008519 A2 | 1/2007 |
|---|---|---|
| WO | WO/2012/106383 A2 | 8/2012 |

OTHER PUBLICATIONS

G. Michael Schneider and Judith L. Gersting, CSC150 chapter 11: Models of computation, Turing Machines and State transition diagrams, Course Technology 2007, 5 pages.*

(Continued)

*Primary Examiner* — Kenneth Kim
(74) *Attorney, Agent, or Firm* — David Lewis

(57) ABSTRACT

A computing machine is disclosed having a memory system for storing a collection of execution nodes, a head for reading a sequence of symbols in the execution nodes in the memory system, and writing a sequence of symbols in the memory system. The machine is configured to execute a computation with a collection of pairs of execution nodes. Each pair of execution nodes represents a machine instruction. One execution node in the pair represents input of the machine instruction represented by the execution nodes. Another execution node in the pair represents output of the machine instruction represented by the execution nodes. Each execution node has a state of the machine, a sequence of symbols and a number.

29 Claims, 10 Drawing Sheets

(56) References Cited

U.S. PATENT DOCUMENTS

| | | | |
|---|---|---|---|
| 7,162,032 B2* | 1/2007 | Brekne | 380/30 |
| 7,249,116 B2 | 7/2007 | Fiske | |
| 7,398,260 B2 | 7/2008 | Fiske | |
| 7,623,468 B2* | 11/2009 | Panigrahy et al. | 370/252 |
| 8,010,467 B2 | 8/2011 | Fiske | |
| 8,019,705 B2 | 9/2011 | Fiske | |
| 8,712,942 B2 | 4/2014 | Fiske | |
| 8,817,981 B2 | 8/2014 | Fiske | |
| 2002/0038294 A1 | 3/2002 | Matsugu | |
| 2002/0059154 A1 | 5/2002 | Rodvold | |
| 2003/0183878 A1 | 10/2003 | Tajiri et al. | |
| 2003/0212645 A1 | 11/2003 | Schaffer et al. | |
| 2004/0162795 A1 | 8/2004 | Dougherty et al. | |
| 2005/0075702 A1 | 4/2005 | Shafer | |
| 2006/0236226 A1 | 10/2006 | Meijer et al. | |
| 2006/0245225 A1 | 11/2006 | Vorbach | |
| 2006/0259894 A1 | 11/2006 | Fiske | |
| 2006/0277533 A1 | 12/2006 | Fiske | |
| 2007/0014394 A1* | 1/2007 | Harder et al. | 380/28 |
| 2007/0061777 A1* | 3/2007 | Vashi et al. | 717/113 |
| 2007/0079108 A1 | 4/2007 | Fiske | |
| 2007/0288668 A1 | 12/2007 | Fiske | |
| 2011/0066833 A1 | 3/2011 | Fiske | |
| 2011/0274273 A1 | 11/2011 | Fiske | |
| 2012/0198560 A1 | 8/2012 | Fiske | |

OTHER PUBLICATIONS

Peter J. Angeline et al. "An Evolutionary Algorithm that Constructs Recurrent Neural Networks. " IEEE Transactions on Neural Networks, vol. 5, No. 1, Jan. 1994, pp. 54-65.

Farooq Azam "Biologically Inspired Modular Neural Networks" PhD Dissertation. Virginia Tech. May 2000. c Farooq Azam, 2000. pp. 1-149.

Dipankar Dasgupta et al. "Designing Application-Specific Neural Networks using the Structured Genetic Algorithm" IEEE Computer Society Press, Jun. 6, 1992. pp. 1-11.

John G. Elias. "Genetic Generation of Connection Patterns for a Dynamic Artificial Neural Network" Proceedings of the Combinations of Genetic Algorithms and Neural Networks Workshop, COGANN 92. pp. 1-17.

Dario Floreano et al. "Evolution of Spiking Neural Controllers for Autonomous Vision-Based Robots" T. Gomi (Ed.): ER 2001, LCNS 2217, pp. 38-61, 2001. © Springer-Verlag Berlin Heidelberg 2001.

G. Michael Schneider and Judith L Gersting , CSC150 chapter 11: Models of computation, Turing Machines and State transition diagrams, An Invitation To Course Technology 2007, pp. 1-6.

John C. Gallagher, et al "Continuous Time Recurrent Neural Networks: A Paradigm for Evolvable Analog Controller Circuits" 2000. pp. 1-6.

Takashi Kanamaru, et al. "Stochastic resonance in a pulse neural network with a propagational time delay" BioSystems 58 (2000) pp. 101-107.

Kirstian Lingren et al. "Regular Language Inference Using Evolving Neural Networks" IEEE 1992. pp. 1-13.

loana Domnica Marian "A biologically inspired model of motor control of direction" MS Thesis. University College Dublin, Ireland. Oct. 2002. pp. 1-209.

Alan F. Murray, et al. "Pulse-Stream VLSI Neural Networks Mixing Analog and Digital Techniques." IEEE Transactions on Neural Networks, vol. 2, No. 2, Mar. 1991. pp. 193-204.

L.M. Reyneri, "Theoretical and Implementation Aspects of Pulse Streams: an Overview" 1999. pp. 1-12.

Xin Yao, "Evolving Artificial Neural Networks." Proceedings of the IEEE, vol. 87, No. 9, Sep. 1999. pp. 1423-1447.

Supplementary European Search Report of European Patent Application No. EP05849368; search date: Jul. 15, 2009.

International Search Report of Application No. PCT/US05/41799; mailed on Feb. 13, 2007.

Supplementary European Search Report of European Patent Application No. EP05854862; search date: Jan. 11, 2010.

International Search Report of Application No. PCT/US05/46215; mailed on Jun. 26, 2008.

Supplemental Partial European Search Report of European Patent Application No. EP05858695; search date: Sep. 16, 2011.

International Search Report of Application No. PCT/US05/44660; mailed on Dec. 19, 2007.

Supplementary European Search Report of European Patent Application No. EP06748170; search date: Dec. 14, 2012.

International Search Report of Application No. PCT/US06/02271; mailed on May 29, 2007.

Supplemental Partial European Search Report of European Patent Application No. EP06786344; search date: Jan. 22, 2010.

International Search Report of Application No. PCT/US06/26159; mailed on Feb. 1, 2008.

International Search Report of Application No. PCT/US2012/023408; mailed on Aug. 22, 2012.

International Search Report of Application No. PCT/US2012/056786; mailed on Mar. 29, 2013.

* cited by examiner

EXECUTING MACHINE INSTRUCTIONS COMPRISING INPUT/OUTPUT PAIRS OF EXECUTION NODES

INTRODUCTION

A new computing machine and new mathematical concepts and methods of computing, executing and solving heretofore unknown computational problems are presented here. The computing machine, called a Dynamic Register Machine, and methods apply to hardware and software technology. The new machine and methods enable advances in machine learning, new and more powerful programming languages, and more powerful and flexible compilers and interpreters.

In Section 0, a dynamic register machine is described. In Section 9, the design of a dynamic register machine program presented in section 10 is explained. In section 10, a dynamic register machine program, called the IDRM, composed of 1590 dynamic register machine instructions is presented that can determine in a finite number of computational steps whether a given Turing machine has any immortal configurations.

Sections 1 through 8 describe and demonstrate mathematical concepts and computational methods for addressing the Turing Immortality problem and other computational problems. The Turing Immortality problem is unable to be solved by Turing machines. Furthermore, current computing machine implementations and software applications have been unable to solve this problem and other computing problems.

BRIEF DESCRIPTION OF THE FIGURES

In the following drawings like reference numbers are used to refer to like elements. Although the following figures depict various examples of the invention, the invention is not limited to the examples depicted in the figures.

and whose vertices are labeled $a_n$, $b_n$, $c_n$, $d_n$.

Figure 4A:
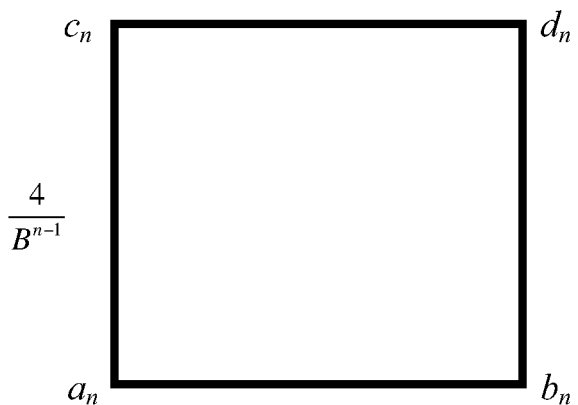
FIG. 4A shows a square whose sides have length $$\frac{4}{B^{n-1}}$$
Figure 4B:
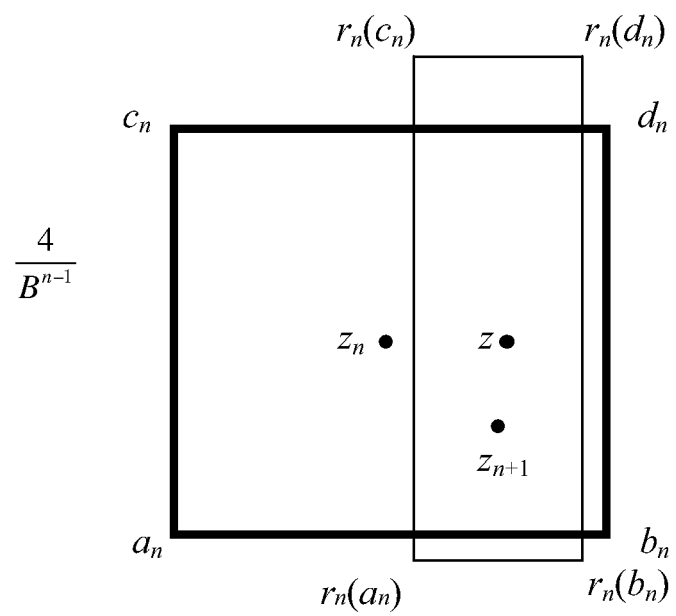

FIG. 4B shows a square whose sides have length $$\frac{4}{B^{n-1}}$$

and whose vertices are labeled $a_n$, $b_n$, $c_n$, $d_n$ and shows the image of the affine map $r_n$ to the unit square. It also shows points $z_n$, $z_{n+1}$, and z.

Figure 5A:
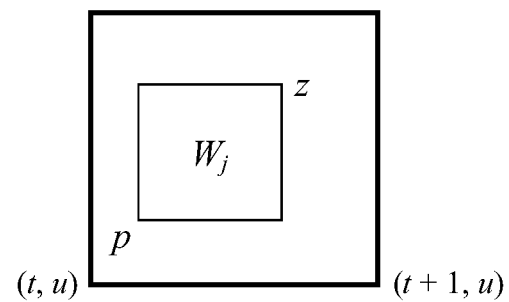

FIG. 5A shows unit square $W_j$ with lower left corner at (t, u) and a smaller square inside with lower left corner labeled p and upper right corner labeled z.

Figure 5B:
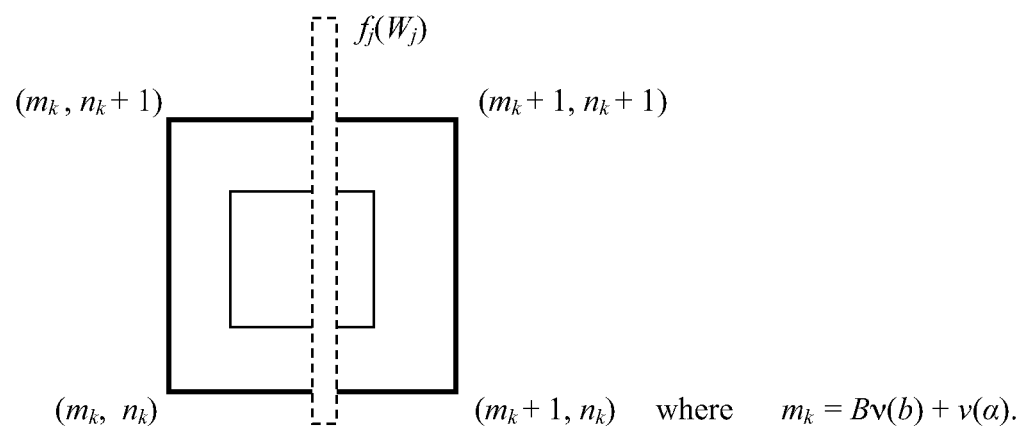

FIG. 5B shows unit square $W_j$ with lower left corner at ($m_k$, $n_k$) and dashed rectangle representing $f_j(W_j)$.

Figure 6:
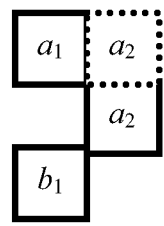

FIG. 6 shows four tape squares with contents $a_1$, $a_2$, $a_2$, $b_1$.

Figure 7:
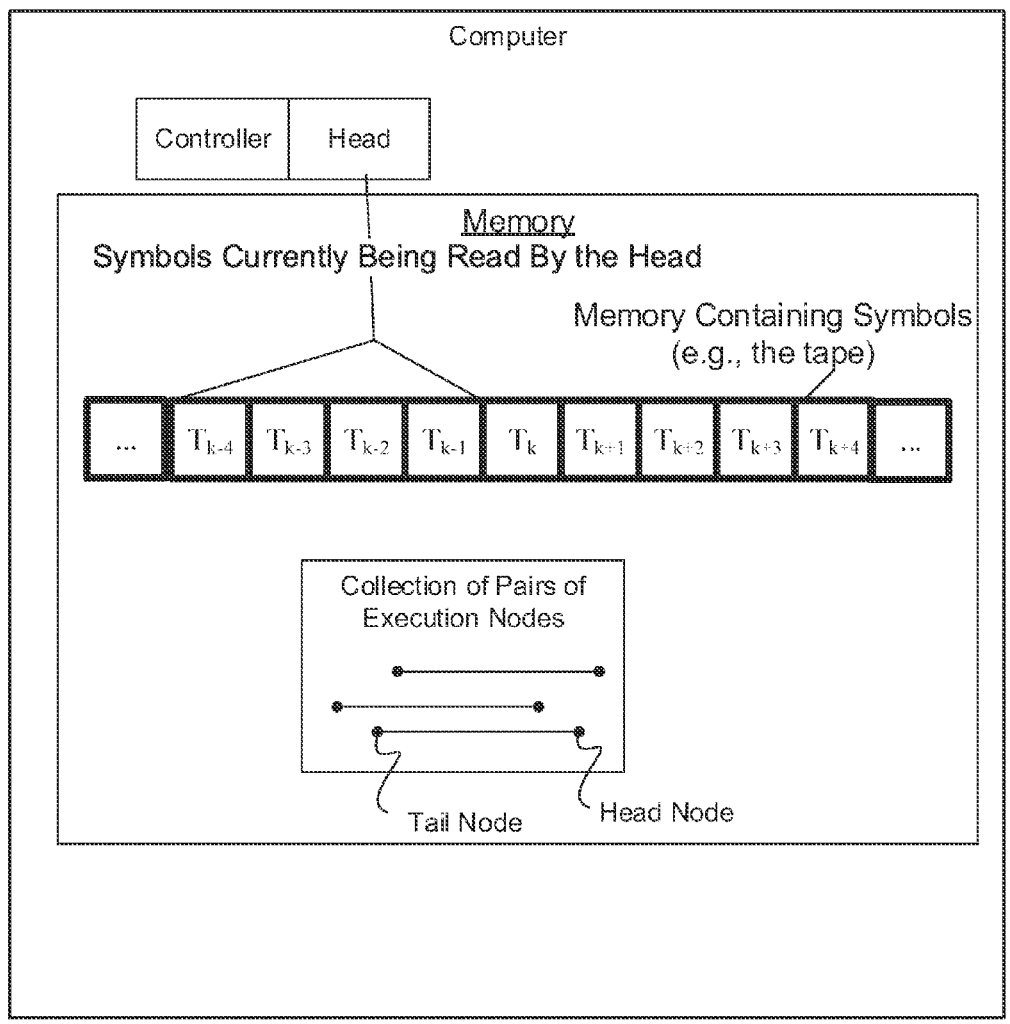

FIG. 7 shows a block diagram of a computer having a collection of execution nodes.

Figure 8:
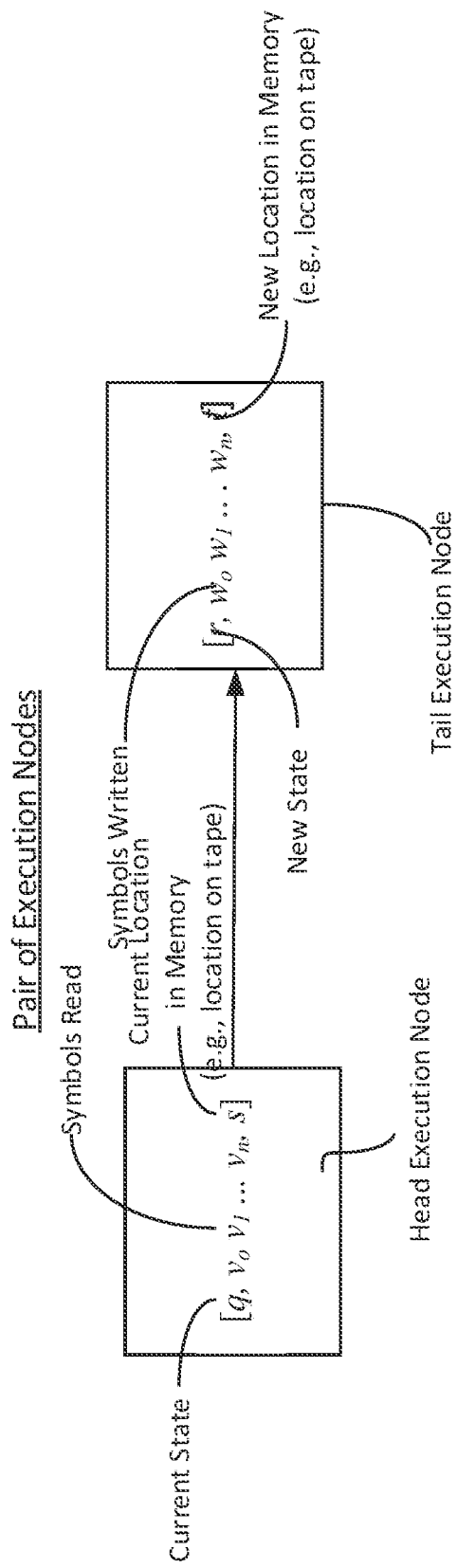

FIG. 8 shows a block diagram of an example of a pair of execution nodes.

Figure 9:
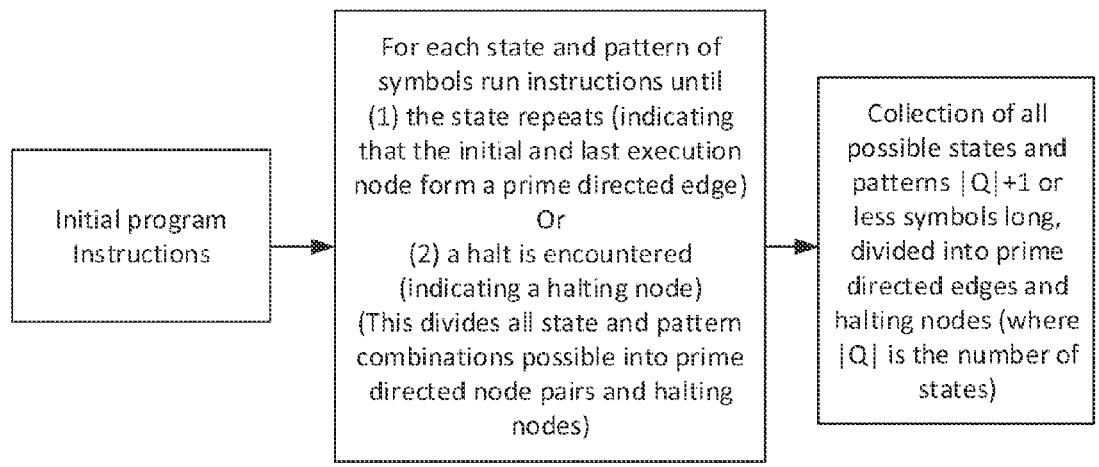

FIG. 9 shows a block diagram representing a method of searching for prime directed edges.

DYNAMIC REGISTER MACHINE SECTION 0

In this section, a dynamic register machine (DRM) is presented. Then in a later section a dynamic register machine program is demonstrated that can perform the following computation: for any Turing machine (Q, A, η) as input, the dynamic register machine program can execute method 8.36 in a finite number of computational steps. This explicit demonstration refutes the Church-Turing thesis.

The dynamic register machine is a new computing machine where its program can change while the machine is executing. While the program is being executing, new instructions may added to the program and/or instructions may be removed from the program. This computing system is an enhancement of the register machine conceived by Shepherdson & Sturgis.

The DRM has an unbounded number of registers labelled $R_0, R_1, R_2, \ldots$ each of which contains a natural number. There are seven types of instructions. A finite sequence of instructions is a DRM program denoted as P. The formal language for the dynamic register machine is represented as S-expressions: register $R_n$ as (R n). The contents of all of the registers may be represented as a list of natural numbers, for example (17 3 22 5 . . . ).

Instruction 0.1

[0] Constant Instruction (C m v)

For each pair of natural numbers m and v, the constant instruction (C m v) stores natural number v in register (R m) i.e. the contents of register $R_m$=v.

For example, if the contents of the registers are (17 2 671 3 81 95 . . . ). then the instruction (C 1 55) stores 55 in register (R 1). Afterward, the contents of the registers are (17 55 671 3 81 95 . . . ).

Instruction 0.2

[1] Successor Instruction (S m)

For natural number m, the successor instruction (S m) adds 1 to register (R m).

For example, if the current state of the registers is (26 0 2 678 12 78 . . . ) then the instruction (S 3) adds 1 to 678 so the register contents afterward are (26 0 2 679 12 78 . . . ).

Instruction 0.3

[2] Transfer Instruction (T m n)

For natural numbers m, n the transfer instruction (T m n) copies the contents of register (R n) to register (R m). All other registers are left unchanged.

If the current state of the registers is (17 0̸ 2 679 3 81 . . . ) then the instruction (T 0̸ 4) replaces (R 0̸) containing 17 with (R 4) which is 3 so the register contents are now (3 0̸ 2 679 3 81 . . . ).

Instruction 0.4

[3] Address Instruction (A m n)

For natural numbers m, n the address instruction (A m n) copies the contents of register (R (R n)) to register (R m). All other registers are left unchanged.

If the current state of the registers is (17 0̸ 2 679 3 81 . . . ) then (R 4)=3 and (R (R 4))=679. Thus, instruction (A 5 4) replaces (R 5) containing 81 with 679. After the execution of instruction (A 5 4) the register contents are (17 0̸ 2 679 3 679 . . . ).

Instruction 0.5

[4] Jump Instruction (J m n q)

For natural numbers m, n, q, if the contents of register $R_m$ equals the contents of register $R_n$ i.e. (R m)=(R n), then the jump instruction (J m n q) causes the program execution to jump to the instruction stored in (R q) i.e. the contents of register $R_q$. Otherwise, if (R m)≠(R n) the next instruction following instruction (J m n q) is executed. In the special case where (R q) is beyond the last instruction in program P, then the execution of program P terminates (halts).

Instruction 0.6

[5] Delete Instruction (D m n)

Starting with instruction (R m) delete the next (R n) instructions. If (R n)=0, then no instructions are deleted. If (R n)+(R m)−1 points to or beyond the last instruction of the current program P, then the execution of (D m n) deletes instruction (R m) and all of the instructions in program P that follow instruction (R m). As a consequence, execution of program P will halt if instruction (R m) precedes or immediately follows instruction (D m n).

Instruction 0.7

[6] Update Instruction (U k n q)

At execution time, the update instruction (U k n q) inserts (R n) instructions at line (R q) into program P starting at register k according to the following rules:

The (R n) inserted instructions and their corresponding arguments are determined by (R k), (R k+1), (R k+2), . . . [in other words the contents of registers k, k+1, k+2, . . . ] until (R n) instructions are completely determined.

If (R n)=0, then no instructions are inserted.

The type of the inserted instruction is determined by the table of equivalence classes:

| C | S | T | A | J | D | U |
|---|---|---|---|---|---|---|
| [0] | [1] | [2] | [3] | [4] | [5] | [6] | where [n]={m: m is a natural number and 7 divides m}

The contents of register k, (R k), lies in exactly one of [0], [1], [2], [3], [4], [5], [6]. Thus, the type of instruction is unambiguously determined by the previous table.

The $1^{st}$ argument m in (C m n), (S m), (T m n), (A m n), (J m n q), (D m n), (U m n q) is determined by (R k+1) the contents of register k+1.

If (R n)>1 and it is a Successor instruction, then the contents of register k+2 determine the type of the second instruction. Otherwise, the contents of register k+2 determines the value n in one of the instructions (C m n), (T m n), (A m n), (J m n q), (D m n), (U m n q).

If (R n)>1 and the type of the first inserted instruction is a Constant, Transfer, Address or Delete instruction, then the contents of register k+3 determines the type of the second inserted instruction.

If the type of the first inserted instruction is a Jump or Update instruction, then the contents of register k+3 determines the value of q in the instruction (J m n q) or (U m n q).

If (R n)>1 and the first inserted instruction is Jump or Update, then the contents of register k+4 determine the type of the second inserted instruction.

The type and arguments of the $2^{nd}$ instruction, $3^{rd}$ instruction, . . . , up to the (R n) instruction are determined inductively according to the previous rules—using consecutive registers starting at i. Register k+2 if (R k) lies in [1] i.e. (S m) is the first instruction.
ii. Register k+3 if (R k) lies in [0]∪[2]∪[3]∪[5] i.e. the first instruction is (C m n) (T m n), (A m n), or (D m n).
iii. Register k+4 if (R k) lies in [4]∪[6] i.e. the first instruction is (J m n q) or (U m n q).

Definition 0.8

Dynamic Register Machine Program Execution

A DRM program P is a finite sequence of instructions such that each instruction in the program is either a Successor, Constant, Transfer, Address, Jump, Update, or Delete instruction. Before DRM program execution begins, the value of every register is 0. In other words, (R k)=0̸ for every k.

The instructions in the program P are referenced by the Jump, Update, or Delete instructions in the following way. At the time of dynamic register machine execution of one of these three instructions, the first instruction in P is the $0^{th}$ instruction denoted as (P 0̸). The next instruction, if it exists, in P is (P 1). Inductively, the next instruction after (P k), if it exists, is (P k+1).

When the program P begins execution, the $0^{th}$ instruction (P 0̸) is executed first, if it exists. If at some execution step program P has no instructions, then the dynamic register machine execution of program P halts. (It is possible for a Delete instruction to delete the whole program or the initial program P may be empty.)

Inductively, if the $k^{th}$ instruction, (P k), is being executed and it is not a Jump, Update, or Delete instruction, then the next instruction executed is (P k+1). If the instruction (P k+1) does not exist, the dynamic register machine execution of program P halts.

Definition 0.9

Jump Execution

If (P k) is being executed and (P k)=(J m n q) then (R m) and (R n) are compared. If (R m)≠(R n) then the next instruction executed, if it exists, is (P k+1). If (P k+1) does not exist, then execution of program P halts.

If (R m)=(R n) then the next instruction executed, if it exists, is (P (R q)). In other words, instruction (P j) is executed where j=(R q). If (P j) does not exist, then execution of program P halts.

Before presenting the rules that describe the execution of the Delete and Update instructions, the simplest way to understand the deletion and insertion of instructions is that execution of the program P behaves like a linked list of instructions. If one or more instructions are deleted from the linked list $P_{old}$, then the instruction executed next is the one that immediately follows—in the sense of the new linked list $P_{new}$—the previous instruction (D m n)=($P_{old}$ k) executed in $P_{old}$. If one or more instructions are inserted into the linked list $P_{old}$, then the instruction executed next is the one that immediately follows—in the sense of the new linked list $P_{new}$—the previous instruction (U m n q)=($P_{old}$ k) that was executed.

A dynamic register machine example is presented first that illustrates the linked list behavior of the Delete and Update instructions. Then the formal rules are presented for determining the next instruction that is executed after a Delete or Update instruction.

Example 0.10

DRM Program with Update, Delete Instructions

| Instruction Number | Instruction | Program Comments |
|---|---|---|
| 0 | >(C 0 2) | Store 2 in register 0. Set (R 0) = 2. |
| 1 | (C 2 4) | Store 4 in register 2. |
| 2 | (C 5 1) | Store 1 in register 5. |
| 3 | (S 5) | Add 1 to register 5. |
| 4 | (T 6 5) | Copy contents of register 5 to register 6. |
| 5 | (A 7 5) | Copy (R (R 5)) to register 7. |
| 6 | (C 8 3) | Set (R 8) = 3. |
| 7 | (C 3 9) | Set (R 3) = 9. |
| 8 | (U 5 0 5) | Insert (R 0) instructions at (P (R 5)) with instruction translation starting at (R 5) |
| 9 | (J 2 5 2) | Jump to (R 2) if (R 2) is equal to (R 5) |
| 10 | (D 3 2) | Delete (R 2) instructions beginning at (P (R 3) ) |
| 11 | (C 0 17) | Set (R 0) = 17. |
| 12 | (S 0) | Add 1 to register 0. |

The program begins execution with the instruction (P 0) which is (C 0 2). The third column headed by Program Comments describes the results of executing that instruction. After instruction (T 6 5), executes, the contents of the registers is (2 0 4 0 0 2 2 0 0 . . . ).

Before instruction (A 7 5) executes, (R 5)=2 and (R 2)=4. Thus, the execution of (A 7 5) sets (R 7)=4. After instruction (A 7 5) executes, the contents of the registers are (2 0 4 0 0 2 2 4 0 0 . . . ).

After instruction (C 3 9) executes, the contents of the registers are (2 0 4 9 0 2 2 4 3 0 0 . . . ). Thus, when the instruction (U 5 0 5) executes (R 5)=2, (R 0)=2, (R 6)=2, (R 7)=4, and (R 8)=3 Thus, two instructions are inserted at (P 2) where they are determined starting at register 5. Since (R 5)=2, the first inserted instruction is a transfer instruction. Since (R 6)=2 and (R 7)=4 the first inserted instruction is (T 2 4). Since register 7 completes the first inserted instruction, (R 8)=3 determines that the second inserted instruction is an address instruction. The second inserted instruction is (A 0 0) because (R 9)=(R 10)=0.

After instruction (U 5 0 5) has executed, the next instruction executed is (3 2 5 2). The table on the following page shows program P before it executes instruction (3 2 5 2) and after it has been updated by the execution of instruction (U 5 0 5):

| Instruction Number | Instruction |
|---|---|
| 0 | (C 0 2) |
| 1 | (C 2 4) |
| 2 | (T 2 4) |
| 3 | (A 0 0) |
| 4 | (C 5 1) |
| 5 | (S 5) |
| 6 | (T 6 5) |
| 7 | (A 7 5) |
| 8 | (C 8 3) |
| 9 | (C 3 9) |
| 10 | (U 5 0 5) |
| 11 | >(J 2 5 2) |
| 12 | (D 3 2) |
| 13 | (C 0 17) |
| 14 | (S 0) |

When instruction (J 2 5 2) is executed, 4=(R 2)≠(R 5)=2 so the next instruction executed is (D 3 2). Since (R 2)=4 and (R 3)=9, four instructions are deleted from program P starting at instruction (P 9). As a result, instructions (C 3 9), (U 5 0 5), (J 2 5 2), and (D 3 2) are deleted from program P and the current program is shown in the following table after (D 3 2) is executed:

| Instruction Number | Instruction |
|---|---|
| 0 | (C 0 2) |
| 1 | (C 2 4) |
| 2 | (T 2 4) |
| 3 | (A 0 0) |
| 4 | (C 5 1) |
| 5 | (S 5) |
| 6 | (T 6 5) |
| 7 | (A 7 5) |
| 8 | (C 8 3) |
| 9 | >(C 0 17) |
| 10 | (S 0) |

The next instruction executed is (C 0 17). After instruction (S 0) is executed, there are no more instructions that follow (S 0), so the program execution halts. The final program is the same as in the previous table. When the program execution halts, the content of the registers is (18 0 4 9 0 2 2 4 3 0 . . . )

Definition 0.11

Delete Execution

If ($P_{old}$ k) is being executed and ($P_{old}$ k)=(D m n), then there are three cases for determining the next instruction that is executed. To define the three cases, it is first determined whether the execution of the delete command deletes itself—the kth instruction from $P_{old}$. The formal conditions for this to be true is that (R m)≤k<(R m)+(R n). If this condition is true, then CASE A shown below determines the next instruction that is executed.

CASE A. $(R\ m) \leq k < (R\ m)+(R\ n)$. After the deletion of the $(R\ n)$ instruction(s) from program $P_{old}$ starting at instruction $(R\ m)$ in program $P_{old}$, the new program is $P_{new}$ and the next instruction executed is $(P_{new}\ (R\ m))$.

CASE B. $k < (R\ m)$. The next instruction executed is $(P_{new}\ k+1)$.

CASE C. $(R\ m)+(R\ n) \leq 5\ k$. The next instruction executed is $(P_{new}\ k+1-(R\ n))$.

Definition 0.12

Update Execution

If $(P_{old}\ k)$ is being executed and $(P_{old}\ k)=(U\ m\ n\ q)$, then there are three cases for determining the next instruction that is executed. To define the three cases, before $(U\ m\ n\ q)$ is executed, consider the instruction $(P_{old}\ k+1)$ the instruction that immediately follows $(P_{old}\ k)$ in program $P_{old}$ right before the instructions are inserted.

CASE A. $(R\ q) < k$. After the $(R\ n)$ instructions are inserted into program $P_{old}$ at location $(R\ q)$, then instruction $(P_{old}\ k+1)$ now in $P_{new}$ is executed next. In other words, the next instruction executed is $(P_{new}\ k+1+(R\ n))$.

CASE B. $(R\ q)=k$. After the $(R\ n)$ instructions are inserted into program $P_{old}$ at location $(R\ q)$, then the first instruction inserted is executed next.

CASE C. $(R\ q) > k$. After the $(R\ n)$ instructions are inserted into program $P_{old}$ at location $(R\ q)$, then instruction $(P_{old}\ k+1)$ is executed next. In other words, the next instruction executed is $(P_{new}\ k+1)$.

AFFINE MAPS, HORIZONTAL & VERTICAL COVERINGS SECTION 1

Remark 1.1

Linear Maps as Matrices

The linear maps L and M are represented with matrices in the standard basis.

$$L\begin{pmatrix}x\\y\end{pmatrix} = \begin{pmatrix}a & b\\c & d\end{pmatrix}\begin{pmatrix}x\\y\end{pmatrix}$$

$$M\begin{pmatrix}x\\y\end{pmatrix} = \begin{pmatrix}h & i\\j & k\end{pmatrix}\begin{pmatrix}x\\y\end{pmatrix}$$

Each affine transformation is of the form $$f\begin{pmatrix}x\\y\end{pmatrix} = L\begin{pmatrix}x\\y\end{pmatrix} + \begin{pmatrix}m\\n\end{pmatrix}$$

where L or $$\begin{pmatrix}a & b\\c & d\end{pmatrix}$$

is called the linear part and $$\begin{pmatrix}m\\n\end{pmatrix}$$

is called the translational part. The unit square with lower left corner at coordinate $(j, k)$ is denoted as $U_{(j,k)} = \{(x, y): j \leq x \leq j+1\ \&\ k \leq y \leq k+1\}$ or it is sometimes represented with the corners of the square $[(j, k), (j+1, k), (j+1, k+1), (j, k+1)]$.

Remark 1.2

Affine Maps are Closed Under Composition

Consider affine maps $$f\begin{pmatrix}x\\y\end{pmatrix} = L\begin{pmatrix}x\\y\end{pmatrix} + \begin{pmatrix}m\\n\end{pmatrix} \text{ and } g\begin{pmatrix}x\\y\end{pmatrix} = M\begin{pmatrix}x\\y\end{pmatrix} + \begin{pmatrix}p\\q\end{pmatrix}$$

Then, $$g \cdot f\begin{pmatrix}x\\y\end{pmatrix} = g\left[L\begin{pmatrix}x\\y\end{pmatrix} + \begin{pmatrix}m\\n\end{pmatrix}\right] = M\left[L\begin{pmatrix}x\\y\end{pmatrix} + \begin{pmatrix}m\\n\end{pmatrix}\right] + \begin{pmatrix}p\\q\end{pmatrix} =$$

$$M * L\begin{pmatrix}x\\y\end{pmatrix} + M\begin{pmatrix}m\\n\end{pmatrix} + \begin{pmatrix}p\\q\end{pmatrix} = M * L\begin{pmatrix}x\\y\end{pmatrix} + \begin{pmatrix}mh+ni+p\\mj+nk+q\end{pmatrix}$$

Remark 1.3

Computation of the Composition of the Affine Maps $$g \cdot f\begin{pmatrix}x\\y\end{pmatrix} = \begin{pmatrix}ah+ci & bh+di\\aj+ck & bj+dk\end{pmatrix}\begin{pmatrix}x\\y\end{pmatrix} + \begin{pmatrix}mh+ni+p\\mj+nk+q\end{pmatrix}$$

Definition 1.4

Rectangular Area Preserving Affine Maps

An affine transformation r is called an rectangular area-preserving affine transformation if it is of the form $$r\begin{pmatrix}x\\y\end{pmatrix} = \begin{pmatrix}\frac{1}{A} & 0\\0 & A\end{pmatrix}\begin{pmatrix}x\\y\end{pmatrix} + \begin{pmatrix}m\\n\end{pmatrix}$$

for some $A>0$. In the next section, A is a number of the form $B^k$, where k is an integer and B is an integer greater than 1, and m, n are rational numbers.

Remark 1.5

Rectangular Area Preserving Affine Maps are Closed

Rectangular area preserving affine maps are closed under function composition.

Consider $$r_1\begin{pmatrix}x\\y\end{pmatrix}=\begin{pmatrix}\frac{1}{A}&0\\0&A\end{pmatrix}\begin{pmatrix}x\\y\end{pmatrix}+\begin{pmatrix}m\\n\end{pmatrix}\text{ and }r_2\begin{pmatrix}x\\y\end{pmatrix}=\begin{pmatrix}\frac{1}{B}&0\\0&B\end{pmatrix}\begin{pmatrix}x\\y\end{pmatrix}+\begin{pmatrix}p\\q\end{pmatrix}.$$

Then $$r_1\cdot r_2\begin{pmatrix}x\\y\end{pmatrix}=\begin{pmatrix}\frac{1}{AB}&0\\0&AB\end{pmatrix}\begin{pmatrix}x\\y\end{pmatrix}+\begin{pmatrix}\frac{m}{B}+p\\nB+q\end{pmatrix}=\begin{pmatrix}\frac{1}{AB}&0\\0&AB\end{pmatrix}\begin{pmatrix}x\\y\end{pmatrix}+\begin{pmatrix}\frac{p}{A}+m\\qA+n\end{pmatrix}$$

Remark 1.6

If $bc+(1-a)(d-1)\neq 0$ then $$f\begin{pmatrix}x\\y\end{pmatrix}=\begin{pmatrix}a&b\\c&d\end{pmatrix}\begin{pmatrix}x\\y\end{pmatrix}+\begin{pmatrix}m\\n\end{pmatrix}$$

has a fixed point at $$\left(\frac{(d-1)m-bn}{bc+(1-a)(d-1)},\frac{(a-1)n-cm}{bc+(1-a)(d-1)}\right).$$

Remark 1.7

When $b=c=0$ and $(1-a)(d-1)\neq 0$, then $$f\begin{pmatrix}x\\y\end{pmatrix}=\begin{pmatrix}a&0\\0&d\end{pmatrix}\begin{pmatrix}x\\y\end{pmatrix}+\begin{pmatrix}m\\n\end{pmatrix}$$

has a fixed point at $$\left(\frac{m}{1-a},\frac{n}{1-d}\right).$$

Definition 1.8

Vertical Covers

Consider rectangular area preserving affine map $$r\begin{pmatrix}x\\y\end{pmatrix}=\begin{pmatrix}\frac{1}{A}&0\\0&A\end{pmatrix}\begin{pmatrix}x\\y\end{pmatrix}+\begin{pmatrix}m\\n\end{pmatrix}$$

where A>1 and with square domain W=[(u, v), (u+s, v), (u+s, v+s), (u, v+s)] with sides of length s. r(W) vertically covers W if and only if all four conditions hold:
1.) The y-coordinate of r(u, v)≤v.
2.) The y-coordinate of r(u+s, v+s)≥v+s.
C. The x-coordinate of r(u, v)≥u.
D. The x-coordinate of r(u+s, v+s)≤u+s.

Figure 1A:
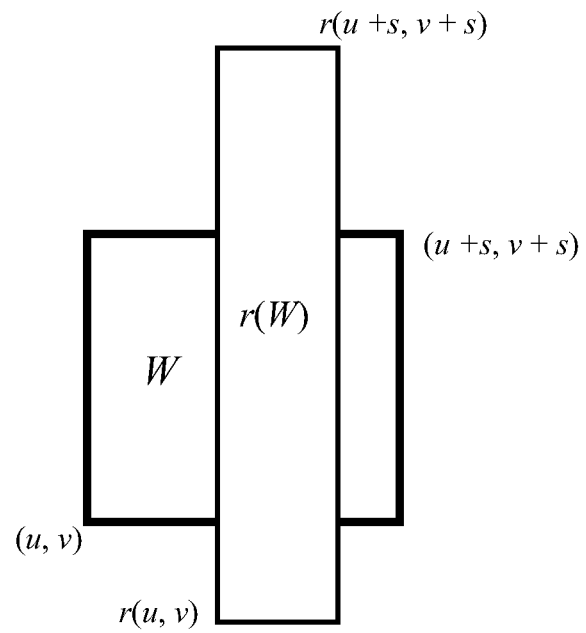
FIG. 1A shows the geometry of a vertical cover.

The geometry of a vertical cover is shown in FIG. 1A.

Remark 1.9

Vertical Cover Fixed Point

When a=1/A and d=A such that A>1, then $$r\begin{pmatrix}x\\y\end{pmatrix}=\begin{pmatrix}\frac{1}{A}&0\\0&A\end{pmatrix}\begin{pmatrix}x\\y\end{pmatrix}+\begin{pmatrix}m\\n\end{pmatrix}$$

has a fixed point at $$\left(\frac{mA}{A-1},\frac{n}{1-A}\right).$$

On square W=[(0,0), (s,0), (s,s), (0,s)], the image of affine map r on W is $$r(W)=\left[(m,n),\left(m+\frac{s}{A},n\right),\left(m+\frac{s}{A},n+sA\right),(m,n+sA)\right]$$

which is a rectangle with width $$\frac{s}{A}$$

and height sA.

Definition 1.10

Horizontal Covers

Figure 1B:
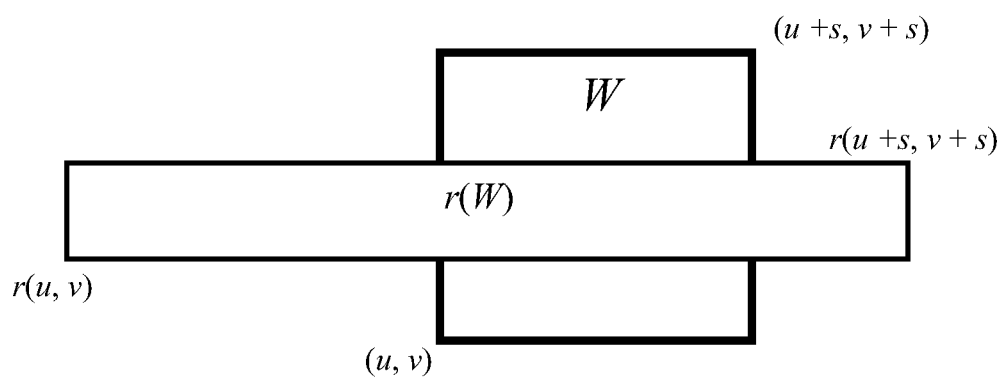
FIG. 1B shows the geometry of a horizontal cover.

Consider the rectangular area preserving affine map $$r\begin{pmatrix}x\\y\end{pmatrix}=\begin{pmatrix}A&0\\0&\frac{1}{A}\end{pmatrix}\begin{pmatrix}x\\y\end{pmatrix}+\begin{pmatrix}m\\n\end{pmatrix}$$

where A>1 and with square domain W=[(u, v), (u+s, v), (u+s, v+s), (u, v+s)] with sides of length s. r(W) horizontally covers W if and only if all four conditions hold:
1.) The x-coordinate of r(u, v)≤u.
2.) The x-coordinate of r(u+s, v+s)≥u+s.
3.) The y-coordinate of r(u, v)≥v.
4.) The y-coordinate of r(u+s, v+s)≤v+s.
The geometry of a horizontal cover is shown in FIG. 1B.

Remark 1.11

Horizontal Cover Fixed Point

When a=A and $$d=\frac{1}{A}$$

such that A>1, then $$r\begin{pmatrix} x \\ y \end{pmatrix} = \begin{pmatrix} A & 0 \\ 0 & \frac{1}{A} \end{pmatrix} \begin{pmatrix} x \\ y \end{pmatrix} + \begin{pmatrix} m \\ n \end{pmatrix}$$

has a fixed point $$\left( \frac{m}{1-A}, \frac{nA}{A-1} \right).$$

On square $W=[(0, 0), (s, 0), (s, s), (0, s)]$ $$r(W) = \left[ (m, n), (m + sA, n), \left( m + sA, n + \frac{s}{A} \right), \left( m, n + \frac{s}{A} \right) \right]$$

is a rectangle with width $sA$ and height $$\frac{s}{A}.$$

Figure 1C:
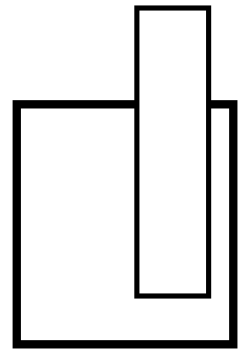
FIG. 1C shows the geometry of an affine map whose fixed point does not lie in the unit square domain.

Example 1.12

$$r\begin{pmatrix} x \\ y \end{pmatrix} = \begin{pmatrix} 1/2 & 0 \\ 0 & 2 \end{pmatrix} \begin{pmatrix} x \\ y \end{pmatrix} + \begin{pmatrix} \frac{4}{10} \\ \frac{1}{10} \end{pmatrix}$$

with Standard Unit Square $U_{(0, 0)}$.
The fixed point $$\left( \frac{8}{10}, \frac{-1}{10} \right)$$

is not in $-U_{(0,0)}$. The geometry is shown in FIG. 1C

Theorem 1.13

Vertical Covering Fixed Point Theorem

Consider the rectangular, area-preserving affine map $$r\begin{pmatrix} x \\ y \end{pmatrix} = \begin{pmatrix} \frac{1}{A} & 0 \\ 0 & A \end{pmatrix} \begin{pmatrix} x \\ y \end{pmatrix} + \begin{pmatrix} m \\ n \end{pmatrix}$$

for some $A>1$ and square domain $W=[(u, v), (u+s, v), (u+s, v+s) (u, v+s)]$. Then $r(W)$ vertically covers $W$ if and only if fixed point $$\left( \frac{mA}{A-1}, \frac{n}{1-A} \right)$$

lies in W.
Proof.

Define $$r'\begin{pmatrix} x \\ y \end{pmatrix} = r\begin{pmatrix} x \\ y \end{pmatrix} - \begin{pmatrix} u \\ v \end{pmatrix}$$

to translate W so that W is a square of sides with length s with lower left corner at the origin. Thus, without loss of generality, it suffices to verify it for domain $W=[(0, 0), (s, 0), (s, s), (0, s)]$. Observe that $r(0, 0)=(m, n)$ and $$r(s, s) = \left( m + \frac{s}{A}, n + sA \right).$$

Figure 1D:
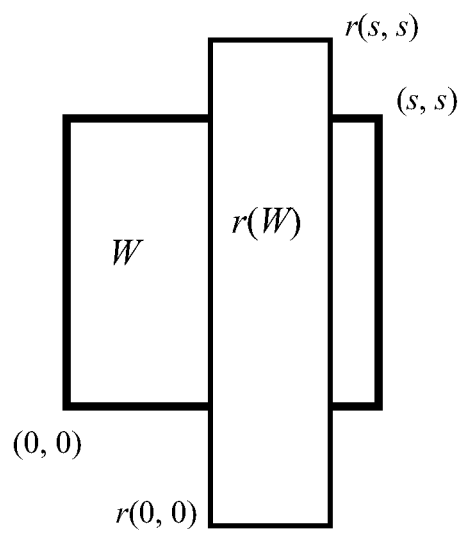
FIG. 1D shows a vertical cover of a square with sides whose length=s.

The geometry is shown in FIG. 1D. Observe that
1.) The y-coordinate of $r(0, 0)=n$
2.) The y-coordinate of $r(s, s)=n+sA$
3.) The x-coordinate of $r(0, 0)=m$
4.) The x-coordinate of $$r(s, s) = m + \frac{s}{A} ( \Leftrightarrow ) \left( \frac{mA}{A-1}, \frac{n}{1-A} \right)$$

lies in W iff $0 \leq \frac{n}{1-A} \leq s$ AND $0 \leq \frac{mA}{A-1} \leq s$ iff $[n \leq 0$ AND $n \geq (1-A)s]$ AND $[0 \leq mA \leq (A-1)s]$ iff $[n \leq 0$ AND $n + sA \geq s]$ AND $\left[ 0 \leq m \text{ AND } m + \frac{s}{A} \leq s \right]$ iff [The $y$-coordinate of $r(0, 0) \leq 0$] AND

[the $y$-coordinate of $r(s, s) \geq s$] AND

[the $x$-coordinate of $r(0, 0) \geq 0$] AND

[the $x$-coordinate of $r(s, s) \leq s$].

Theorem 1.14

Horizontal Covering Fixed Point Theorem

Consider the rectangular, area-preserving affine map $$r\begin{pmatrix} x \\ y \end{pmatrix} = \begin{pmatrix} A & 0 \\ 0 & \frac{1}{A} \end{pmatrix} \begin{pmatrix} x \\ y \end{pmatrix} + \begin{pmatrix} m \\ n \end{pmatrix}$$

for some $A>1$ and square $W=[(u, v), (u+s, v), (u+s, v+s) (u, v+s)]$. Then $r(W)$ horizontally covers W if and only if fixed point $$\left( \frac{m}{1-A}, \frac{nA}{A-1} \right)$$

lies in W.
Proof.

Define $$r'\binom{x}{y} = r\binom{x}{y} - \binom{u}{v}$$

to translate W so that W is the square with lower left corner at the origin. Thus, without loss of generality, it suffices to verify it for W=[(0, 0), (s, 0), (s, s), (0, s)]. Observe $$r(0, 0) = (m, n) \text{ and } r(s, s) = \left(m + sA, n + \frac{s}{A}\right).$$

Figure 1E:
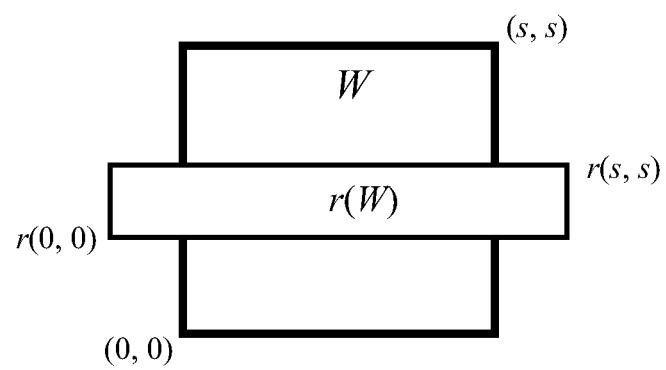
FIG. 1E shows a horizontal cover of a square with sides whose length=s.

The geometry is shown in FIG. 1E. Observe that
1.) The x-coordinate of r(0, 0)=m
2.) The x-coordinate of r(s, s)=m+sA
3.) The y-coordinate of r(0, 0)=n
4.) The y-coordinate of $$r(s, s) = n + \frac{s}{A} (\Leftrightarrow) \left(\frac{m}{1-A}, \frac{nA}{A-1}\right)$$

lies in W $$\text{iff } 0 \leq \frac{m}{1-A} \leq s \text{ and } 0 \leq \frac{nA}{A-1} \leq s$$

$$\text{iff } [m \leq 0 \text{ AND } m \geq (1-A)s] \text{ AND } [0 \leq nA \leq (A-1)s]$$

$$\text{iff } [m \leq 0 \text{ AND } m + sA \geq s] \text{ AND } \left[0 \leq n \text{ AND } n + \frac{s}{A} \leq s\right]$$

iff [The x-coordinate of $r(0, 0) \leq 0$] AND

[the x-coordinate of $r(s, s) \geq s$] AND

[the y-coordinate of $r(0, 0) \geq 0$] AND

[the y-coordinate of $r(s, s) \leq s$].

Definition 1.15

Function Index Sequence and Function Sequence

Let $\{f_1, f_2, \ldots, f_I\}$ be a set of functions. Then a function index sequence is a function S: $\mathbb{N} \to \{1, 2, \ldots, I\}$. If p is a point, then the orbit with respect to this function index sequence is [p, $f_{S(1)}(p), f_{S(2)}f_{S(1)}(p), \ldots, f_{S(m)}f_{S(m-1)} \cdots f_{S(2)}f_{S(1)}(p), \ldots$ ]. Square brackets indicate that the order matters. Sometimes the first few functions will be listed in a function sequence when it is periodic. For example, [$f$, $g$, $f$, $g$, ...] is written when formally this function sequence is S: $\mathbb{N} \to \{f, g\}$ where $S(n)=f$ when n is odd and $S(n)=g$ when n is even.

Example 1.16

$$f\binom{x}{y} = \begin{pmatrix} \frac{1}{4} & 0 \\ 0 & 4 \end{pmatrix}\binom{x}{y} + \binom{4}{0}$$

on domain $U_{(0, 0)}$ and $$g\binom{x}{y} = \begin{pmatrix} \frac{1}{4} & 0 \\ 0 & 4 \end{pmatrix}\binom{x}{y} + \binom{-1}{0}$$

on $U_{(4, 0)}$ $$g \cdot f\binom{x}{y} = \begin{pmatrix} \frac{1}{16} & 0 \\ 0 & 16 \end{pmatrix}\binom{x}{y} + \binom{0}{0} \text{ and}$$

$$f\binom{0}{0} = \binom{4}{0} f\binom{1}{0} = \binom{4.25}{0} f\binom{0}{1} = \binom{4}{1}$$

(0, 0) is a fixed point of g $f$. The orbit of any point p chosen from the horizontal segment connected by the points (0, 0) and (1, 0) with respect to the function sequence [$f$, g, $f$, g, ...] is a subset of $U_{(0, 0)} \cup U_{(4, 0)}$. The point p is called an immortal point. The orbit of a point Q outside this segment exits (halts) $U_{(0, 0)} \cup U_{(4, 0)}$.

Definition 1.17

Halting and Immortal Orbits in the Plane

Let P denote the two dimensional x, y plane. Suppose $f_k$: $U_k \to P$ is a function for each k such that whenever $j \neq k$, then $U_j \cap U_k = \emptyset$. For any point p in the plane P an orbit may be generated as follows. The $0^{th}$ iterate of the orbit is p. Given the kth iterate of the orbit is point q, if point q does not lie in any $U_k$, then the orbit halts. Otherwise, q lies in at least one $U_j$. Inductively, the k+1 iterate of q is defined as $f_j(q)$. If p has an orbit that never halts, this orbit is called an immortal orbit and p is called an immortal point. If p has an orbit that halts, this orbit is called a halting orbit and p is called a halting point.

Notation 1.18 x and y Coordinate Functions and Euclidean Metric in Plane P

Let $p=(p_1, p_2)$ and let $q=(q_1, q_2)$ be two points in P. The x and y coordinate functions are defined as x: P×P→P such that $x(p_1, p_2)=p_1$ and y: P×P→P where $y(p_1, p_2)=p_2$. The Euclidean metric is d: P×P→$\mathbb{R}^+$ where Affine Maps,

AFFINE MAP ITERATION ⇔ TURING MACHINE EXECUTION SECTION 2

Definition 2.1

Turing Machine

A Turing machine is a triple (Q, A, η) where
There is a unique state h, called the halt state.
Q is a finite set of states that does not contain the halt state h. The states are represented as $Q=\{q_1, q_2, \ldots, q_K\}$ or as the natural numbers $Q=\{2, \ldots, K\}$ and the halt state as 1. Before machine execution begins, there is a starting state and s is an element of Q.
L and R are special symbols that instruct the machine to advance to the left square or to the right square on the tape T.
A is a finite set of alphabet symbols that are read from and written to the tape. The alphabet symbols are denoted as $A=\{a_1, a_2, \ldots, a_J\}$ or as the natural numbers $A=\{1, 2, \ldots, J\}$. A does not contain the symbols L, R.

$\eta$ is a function where $\eta$: $Q \times A \to (Q \cup \{h\}) \times A \times \{L, R\}$ The $\eta$ function acts as the program for the Turing machine in the following manner. For each q in Q and $\alpha$ in A, the expression $\eta(q, \alpha)=(r, \beta, x)$ describes how machine $(Q, A, \eta)$ executes one computational step. When in state q and scanning alphabet symbol $\alpha$ on the tape:

1.) Machine $(Q, A, \eta)$ changes to state r.
2.) Machine $(Q, A, \eta)$ rewrites alphabet symbol $\alpha$ as symbol $\beta$ on the tape.
C. If x=L, then machine $(Q, A, \eta)$ moves its tape head one square to the left on the tape and is subsequently scanning the symbol in this square.
D. If x=R, then machine $(Q, A, \eta)$ moves its tape head one square to the right on the tape and is subsequently scanning the symbol in this square.
E. If r=h, machine $(Q, A, \eta)$ enters the halting state h, and the machine stops (halts).

Definition 2.2

Turing Machine Tape

The Turing machine tape T is represented as a function T: $Z \to A$ where Z denotes the integers. The tape T is M-bounded if there exists a bound M>0 such that for T(k)=#, where $a_1$=#, whenever $|k|>M$. The symbol on the kth square of the tape is denoted as $T_k$.

Definition 2.3

Turing Machine Configuration with Tape Head Location

Let $(Q, A, \eta)$ be a Turing machine with tape T. A configuration is an element of the set $\zeta=(Q \cup \{h\}) \times Z \times \{T: T \text{ is tape with range } A\}$. The standard definition of a Turing machine assumes the initial tape is M-bounded and the tape contains only blank symbols, denoted as #, outside the bound. See [LEWIS].

If (q, k, T) is a configuration in $\zeta$, then k is called the tape head location. The tape head location is M-bounded if there exists a natural number M>0 such that the tape head location k satisfies $|k| \leq M$. A configuration whose first coordinate equals h is called a halted configuration. The set of non-halting configurations is $N=\{(q, k, T) \in \zeta: q \neq h\}$ The purpose of the definition of a configuration is that the first coordinate stores the current state of the Turing machine, the third coordinate stores the contents of the tape, and the second coordinate stores the location of the tape head on the tape. Before presenting some examples of configurations, it is noted that there are different methods to describe the tape contents. One method is $$T(k) = \begin{cases} \alpha_k & \text{if } l \leq k \leq n \\ \# & \text{otherwise} \end{cases}.$$

This is a max $\{|l|, |n|\}$-bounded tape. Another convenient representation is to list the tape contents and underline the symbol to indicate the location of the tape head. ($\ldots \#\#\alpha\underline{\beta}\#\# \ldots$).

Figure 2A:
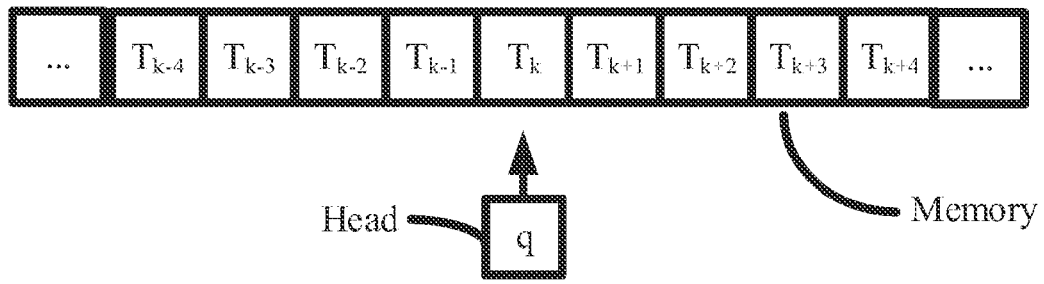
FIG. 2A shows a Turing machine with tape and tape head.
Figure 2B:
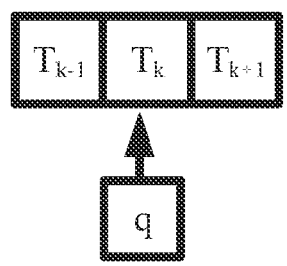
FIG. 2B shows a Turing machine with tape head and three tape squares.

A diagram shown in FIG. 2A may also represent the tape, tape head location, and the configuration (q, k, T).

Example 2.4

Turing Machine Configuration

Consider configuration (p, 2, $\ldots \#\#\alpha\underline{\beta}\#\# \ldots$). The first coordinate indicates that the Turing machine is in state p. The second coordinate indicates that its tape head is currently scanning tape square 2, denoted as $T_2$ or T(2). The third coordinate indicates that tape square 1 contains symbol $\alpha$, tape square 2 contains symbol $\beta$, and all other tape squares contain the # symbol.

Example 2.5

Turing Machine Halt Configuration Represented as Natural Numbers

A second example of a configuration is (1, 6, $\ldots$ 1111 $\underline{2}$33111 $\ldots$). This configuration is a halted configuration. The first coordinate indicates that the machine is in halt state 1. The second coordinate indicates that the tape head is scanning tape square 6. The underlined 2 in the third coordinate indicates that the tape head is currently scanning a 2. In other words, T(6)=2, T(7)=3, T(8)=3, and T(k)=1 when k<6 OR k>8.

Definition 2.6

Turing Machine Execution Step

Given Turing machine $(Q, A, \eta)$ with configuration (q, k, T) such that T(k)=$\alpha$. After the execution of one computational step, the new configuration is one of the three cases such that for all three cases $T_{new}(k)=\beta$ and $T_{new}(j)=T(j)$ whenever $j \neq k$:
  I. (r, k−1, $T_{new}$) if $\eta(q, \alpha)=(r, \beta, L)$.
  II. (r, k+1, $T_{new}$) if $\eta(q, \alpha)=(r, \beta, R)$.
  III. (h, k±1, $T_{new}$). In this case, the machine execution stops (halts).

The program symbol $\eta$ is overloaded as $\eta$: $N \to \zeta$ where $\eta(q, k, T)=(r, k−1, T_{new})$ when $\eta(q, \alpha)=(r, \beta, L)$ and $\eta(q, k, T)=(r, k+1, T_{new})$ when $\eta(q, \alpha)=(r, \beta, R)$. See 2.14, 2.17.

If Turing machine $(Q, A, \eta)$ with initial configuration (s, k, T) reaches the halt state h after a finite number of execution steps, then the machine execution halts. Otherwise, it is said that the machine execution is immortal on initial configuration (s, k, T).

Definition 2.7

Turing Program Length

The program length is the number of elements in the domain of $\eta$. The program length is denoted as $|\eta|$. Observe that $|\eta|=|Q \times A|=|Q||A|$. In [TURING] and [DAVIS], they omit quintuples (q, a, r, b, x) when r is the halting state. In the representation shown here, $\eta(q, a)=(1, b, x)$ or $\eta(q, a)=(h, b, x)$.

Definition 2.8

Value Function and Base

Suppose the alphabet $A=\{a_1, a_2, \ldots, a_J\}$ and the states are $Q=\{q_1, q_2, \ldots, q_K\}$. Define the symbol value function v: $A \cup Q \cup \{h\} \to N$ where N denotes the natural numbers.

$$v(x) = \begin{cases} 0 & \text{if } x = h \\ i & \text{if } x = a_i \\ i+|A| & \text{if } x = q_i \\ |Q|+|A| & \text{if } x = q_K \end{cases}$$

Choose the number base $B=|Q|+|A|+1$. Observe that $0 \leq v(x) < B$ and that each symbol chosen from $A \cup Q \cup \{h\}$ has a unique value in base B.

Definition 2.9

Turing Machine Program Isomorphism

Two Turing machines $M_1(Q_1, A_1, \eta_1, s_1)$ and $M_2(Q_2, A_2, \eta_2, s_2)$ have a program isomorphism denoted as $\Psi: M_1 \to M_2$ if A. There is a function $\phi: Q_1 \to Q_2$ that is a bijection.
B. There is a function $\gamma: A_1 \to A_2$ that is a bijection.
C. There is a function $\Psi: M_1 \to M_2$ such that for each pair $(q, a)$ in $Q_1 \times A_1$ $$\Psi(q,a) = \eta_2(\phi(q), \gamma(a))$$

Remark 2.10

If alphabet $A=\{a\}$, then the halting behavior of the Turing machine is completely determined in $\leq |Q|+1$ execution steps.
Proof.
Suppose $Q=\{q_1, q_2, \ldots q_K\}$. Observe that the program length is $|\eta|=|Q|$. Also, after an execution step every tape symbol on the tape must be a. Consider the possible execution steps: $\eta(q_{S(1)}, a) \to \eta(q_{S(2)}, a) \to \eta(q_{S(3)}, a) \ldots \eta(q_{S(k+1)}, a)$. If the program execution does not halt in these $|Q|+1$ steps, then $S(i)=S(j)$ for some $i \neq j$; and the tape contents are still all a's. Thus, the program will exhibit periodic behavior whereby it will execute $\eta(q_{S(i)}, a) \to \ldots \to \eta(q_{S(j)}, a)$ indefinitely. If the program does not halt in $|Q|+1$ execution steps, then the program will never halt.

As a result of Remark 2.10, from now on, it is assumed that $|A| \geq 2$. Further, since at least one state is needed, then from here on, it is assumed that the base $B \geq 3$.

Definition 2.11

Turing Machine Configuration to x-y Plane P Correspondence

See FIG. 2A. For a fixed machine $(Q, A, \eta)$, each configuration $(q, k, T)$ represents a unique point $(x, y)$ in P. The coordinate functions x: $\zeta \to P$ and y: $\zeta \to P$, where $\zeta$ is the set of configurations, are $x(q, k, T) = T_k T_{k+1} \cdot T_{k+2} T_{k+3} T_{k+4} \ldots$ where this sequence in base B represents a real number as $$Bv(T_k) + v(T_{k+1}) + \sum_{j=1}^{\infty} v(T_{k+j+1})B^{-j} y(q,k,T) = qT_{k-1} \cdot T_{k-2}T_{k-3}T_{k-4} \ldots$$

where this sequence in base B represents a real number as $$Bv(q) + v(T_{k-1}) + \sum_{j=1}^{\infty} v(T_{k-j-1})B^{-j}$$

Define function $\phi: \Pi \to P$ as $\phi(q, k, T) = (x(q, k, T), y(q, k, T))$ where $\varnothing$ is the set of non-halting configurations defined in 2.3. $\phi$ will be used in 2.14 and 2.17.

Remark 2.12

Unit Square at $(\lfloor x \rfloor, \lfloor y \rfloor)$

The unit square $U_{(\lfloor x \rfloor, \lfloor y \rfloor)}$ has a lower left corner with coordinates $(\lfloor x \rfloor, \lfloor y \rfloor)$ where $$\lfloor x \rfloor = Bv(t_k) + v(T_{k+1}) \text{ and } \lfloor y \rfloor = Bv(q) + v(T_{k-1})$$

Definition 2.13

Left Affine Function

Figure 2C:
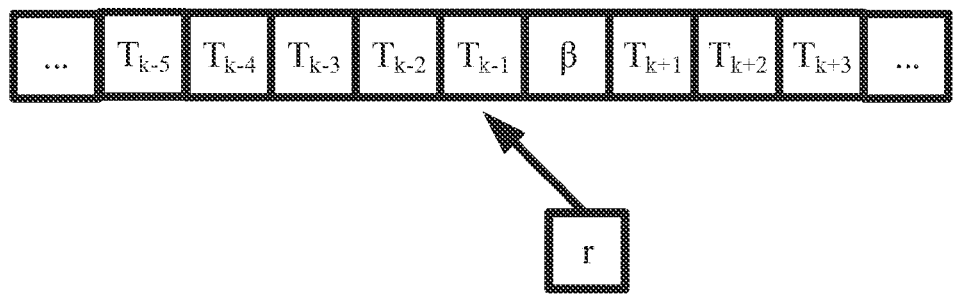
FIG. 2C shows the result after a Turing instruction is executed where $T_k$ is replaced with $\beta$ and the tape head moves one tape square to the left.

This is for case $-I$, where $-\eta(q, T_k) = (r, \beta, L)$. FIG. 2C shows the result after this computational step is executed.

$$x \mapsto T_{k-1}\beta \cdot T_{k+1}T_{k+2}T_{k+3} \ldots$$

$$B^{-1}x = T_k \cdot T_{k+1}T_{k+2}T_{k+3}T_{k+4}$$

Thus, $m = T_{k-1}\beta - T_k$ where the subtraction of integers is in base B.

$$y \mapsto T_{k-2}\beta \cdot T_{k-3}T_{k-4}T_{k-5} \ldots$$

$$By = qT_{k-1}T_{k-2} \cdot T_{k-3}T_{k-4}T_{k-5} \ldots$$

Thus, $n = rT_{k-2} - qT_{k-1}T_{k-2}$ where the subtraction of integers is in base B.
Define the left affine function $F_{(\lfloor x \rfloor, \lfloor y \rfloor)}: U_{(\lfloor x \rfloor, \lfloor y \rfloor)} \to P$ where $$F_{(\lfloor x \rfloor, \lfloor y \rfloor)}\begin{pmatrix} x \\ y \end{pmatrix} = \begin{pmatrix} \frac{1}{B} & 0 \\ 0 & B \end{pmatrix}\begin{pmatrix} x \\ y \end{pmatrix} + \begin{pmatrix} m \\ n \end{pmatrix},$$

$$m = Bv(T_{k-1}) + v(\beta) - v(T_k) \text{ and } n = Bv(r) - B^2 v(q) - Bv(T_{k-1}).$$

Lemma 2.14

Left Affine Function $\Leftrightarrow$ Turing Machine Computational Step

Let $(q, k, T)$ be a Turing machine configuration. Suppose $\eta(q, T_k) = (r, b, L)$ for some state r in $Q \cup \{h\}$ and some alphabet symbol b in A and where $T_k = a$. Consider the next Turing Machine computational step. The new configuration is $(r, k-1, T^b)$ where $T^b(j) = T(j)$ for every $j \neq k$ and $T^b(k) = b$. The commutative diagram $\phi\eta(q, k, T) = F_{(\lfloor x \rfloor, \lfloor y \rfloor)}\phi(q, k, T)$ holds.

In other words, $F_{(\lfloor x \rfloor, \lfloor y \rfloor)}[x(q, k, T), y(q, k, T)] = [x(r, k-1, T^b), y(r, k-1, T^b)]$.

Proof.

$$x(r, k-1, T^b) = T_{k-1}b \cdot T_{k+1}T_{k+2} \ldots$$

The x coordinate of $$F_{(\lfloor x \rfloor, \lfloor y \rfloor)}[x(q, k, T), y(q, k, T)] = B^{-1}x(q, k, T) + Bv(T_{k-1}) +$$
$$v(b) - v(a)$$
$$= B^{-1}(aT_{k+1} \cdot T_{k+2}T_{k+3} \ldots) +$$
$$Bv(T_{k-1}) + v(b) - v(a)$$
$$= a \cdot T_{k+1}T_{k+2}T_{k+3} \ldots +$$
$$Bv(T_{k-1}) + v(b) - v(a)$$
$$= T_{k-1}b \cdot T_{k+1}T_{k+2}T_{k+3} \ldots$$

$$y(r, k - 1, T^b) = rT_{k-2} \cdot T_{k-3}T_{k-4} \ldots$$

The y coordinate of $$F_{(\lfloor x \rfloor, \lfloor y \rfloor)}[x(q, k, T), y(q, k, T)] = By(q, k, T) + Bv(r) -$$
$$B^2v(q) - Bv(T_{k-1}).$$
$$= B(qT_{k-1} \cdot T_{k-2}T_{k-3} \ldots) +$$
$$Bv(r) - B^2v(q) - Bv(T_{k-1}).$$
$$= qT_{k-1}T_{k-2} \cdot T_{k-3} \ldots +$$
$$Bv(r) - B^2v(q) - Bv(T_{k-1}).$$
$$= rT_{k-2} \cdot T_{k-3}T_{k-4} \ldots$$
$$= y(r, k - 1, T^b).$$

Remark 2.15

Minimum Vertical Translation for Left Affine Function

As in 2.13, n is the vertical translation. $|Bv(r)-Bv(T_{k-1})|=B|v(r)-v(T_{k-1})| \leq B(B-1)$ Since q is a state, $v(q) \geq (|A|+1)$. This implies $|-B^2v(q)| \geq (|A|+1)B^2$ This implies that $|n| \geq (|A|+1)B^2 - B(B-1) \geq |A|B^2 + B$. Thus, $|n| \geq |A|B^2 + B$.

Definition 2.16

Right Affine Function

Figure 2D:
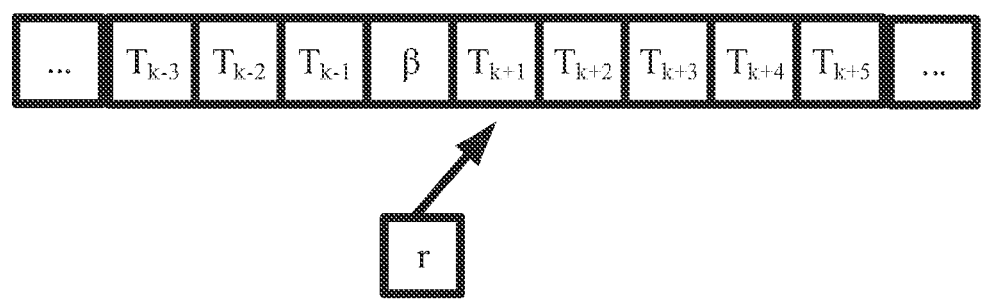
FIG. 2D shows the result after a Turing instruction is executed where $T_k$ is replaced with $\beta$ and the tape head moves one tape square to the right.

This is for case II, where $\eta(q, T_k) = (r, \beta, R)$. FIG. 2D shows the result after this computational step is executed.

$$x \mapsto T_{k+1}T_{k+2} \cdot T_{k+3}T_{k+4} \ldots$$
$$Bx = T_kT_{k+1}T_{k+2} \cdot T_{k+3}T_{k+4} \ldots$$

Thus, $m = T_{k+1}T_{k+2} - T_kT_{k+1}T_{k+2}$ where the subtraction of integers is in base B.

$$y \mapsto r\beta \cdot T_{k-1}T_{k-2}T_{k-3} \ldots$$
$$B^{-1}y = q \cdot T_{k-1}T_{k-2}T_{k-3} \ldots$$

Thus, $n = r\beta - q$ where the subtraction of integers is in base B. Define the right affine function $G_{(\lfloor x \rfloor, \lfloor y \rfloor)}: U_{(\lfloor x \rfloor, \lfloor y \rfloor)} \to P$ such that $$G_{(\lfloor x \rfloor, \lfloor y \rfloor)}\begin{pmatrix} x \\ y \end{pmatrix} = \begin{pmatrix} B & 0 \\ 0 & \frac{1}{B} \end{pmatrix}\begin{pmatrix} x \\ y \end{pmatrix} + \begin{pmatrix} m \\ n \end{pmatrix}$$

where $m = -B^2v(T_k)$ and $n = Bv(r) + v(\beta) - v(q)$.

Lemma 2.17

Right Affine Function ⇔ Turing Machine Computational Step

Let (q, k, T) be a Turing machine configuration. Suppose $\eta(q, T_k) = (r, b, R)$ for some state r in $Q \cup \{h\}$ and some alphabet symbol b in A and where $T_k = a$. Consider the next Turing Machine computational step. The new configuration is (r, k+1, $T^b$) where $T^b(j) = T(j)$ for every $j \neq k$ and $T^b(k) = b$. The commutative diagram $\phi\eta(q, k, T) = G_{(\lfloor x \rfloor, \lfloor y \rfloor)}\phi(q, k, T)$ holds.

In other words, $G_{(\lfloor x \rfloor, \lfloor y \rfloor)}[x(q, k, T), y(q, k, T)] = [x(r, k+1, T^b), y(r, k+1, T^b)]$.

Proof.

From $\eta(q, T_k) = (r, b, R)$, it follows that $x(r, k+1, T^b) = T_{k+1}T_{k+2} \cdot T_{k+3}T_{k+4} \ldots$ The x coordinate of $$G_{(\lfloor x \rfloor, \lfloor y \rfloor)}[x(q, k, T), y(q, k, T)] = Bx(q, k, T) - B^2v(a) -$$
$$B^2v(a)$$
$$= B(aT_{k+1} \cdot T_{k+2}T_{k+3}T_{k+4} \ldots) -$$
$$B^2v(a)$$
$$= aT_{k+1}T_{k+2} \cdot T_{k+3}T_{k+4} \ldots -$$
$$B^2v(a)$$
$$= T_{k+1}T_{k+2} \cdot T_{k+3}T_{k+4}$$
$$= x(r, k + 1, T^b)$$

From $\eta(q, T_k) = (r, b, R)$, it follows that $y(r, k+1, T^b) = rb \cdot T_{k-1}T_{k-2}T_{k-3} \ldots$ The y coordinate of $$G_{(\lfloor x \rfloor, \lfloor y \rfloor)}[x(q, k, T), y(q, k, T)] = B^{-1}y(q, k, T) + Bv(r) +$$
$$v(b) - v(q)$$
$$= B^{-1}(qT_{k-1} \cdot T_{k-2}T_{k-3} \ldots) +$$
$$Bv(r) + v(b) - v(q)$$
$$= q \cdot T_{k-1}T_{k-2}T_{k-3} \ldots +$$
$$Bv(r) + v(b) - v(q)$$
$$= rb \cdot T_{k-1}T_{k-2}T_{k-3} \ldots$$
$$= y(r, k + 1, T^b).$$

Remark 2.18

Minimum Vertical Translation for Right Affine Function

First $$|v(\beta) - v(q)| \leq B - 1.$$

$$|n| = |Bv(r) + v(\beta) - v(q)| \geq$$
$$Bv(r) - (B - 1) \geq$$
$$(|A| + 1)B - (B - 1) \text{ because } v(r) \geq |A| + 1$$
$$= |A|B + 1.$$

Thus, $|n| \geq |A|B + 1$.

Theorem 2.19

Turing Machine Execution ⇔ Affine Map Orbit Halting/Immortal Orbit Correspondence Theorem Consider Turing machine $(Q, A, \eta)$ with initial tape configuration $(s, 0, T)$. WLOG, it is assumed that the machine begins executing with the tape head at $0^{th}$ position of the tape. Let $f_1, f_2, \ldots, f_I$ denote the I affine functions with corresponding unit square domains $W_1, W_2, W_3, \ldots, W_I$ determined from 2.11, 2.12, 2.13 and 2.16. Let $p=(x(s, 0, T), y(s, 0, T))$. From 2.11, $$x(s, 0, T) = Bv(T_0) + v(T_1) + \sum_{j=1}^{\infty} v(T_{j+1})B^{-j} \text{ and}$$

$$y(s, 0, T) = Bv(s) + v(T_{-1}) + \sum_{j=1}^{\infty} v(T_{-j-1})B^{-j}.$$

There is a 1 to 1 correspondence between the mth point of the orbit $[p, f_{S(1)}(p), f_{S(2)}f_{S(1)}(p), \ldots, f_{S(m)}f_{S(m-1)} \cdots f_{S(2)}f_{S(1)}(p), \ldots]$ $$\subseteq \bigcup_{k=1}^{I} W_k$$

and the mth computational step of the Turing machine $(Q, A, \eta)$ with initial configuration $(s, 0, T)$. In particular, the Turing Machine halts on initial configuration $(s, 0, T)$ if and only if p is a halting point with respect to affine functions $f_k: W_k \to P$ where $1 \le k \le I$. Dually, the Turing Machine is immortal on initial configuration $(s, 0, T)$ if and only if p is an immortal point with respect to affine functions $f_k: W_k \to P$ where $1 \le k \le I$.

Proof.

From lemmas 2.14, 2.17, definition 2.11 and remark 2.12, every computational step of $(Q, A, \eta)$ on current configuration $(q, k, T')$ corresponds to the application of one of the unique affine maps $f_k$, uniquely determined by remark 2.12 and definitions 2.13, 2.16 on the corresponding point $p=[x(r, k, T'), y(r, k, T')]$. Thus by induction, the correspondence holds for all n if the initial configuration $(s, 0, T)$ is an immortal configuration which implies that $[x(s, 0, T), y(s, 0, T)]$ is an immortal point. Similarly, if the initial configuration $(s, 0, T)$ is a halting configuration, then the machine $(Q, A, \eta)$ on $(s, 0, T)$ halts after N computational steps. For each step, the correspondence implies that the orbit of initial point $p_0=[x(s, 0, T), y(s, 0, T)]$ exits $$\bigcup_{k=1}^{R} W_k$$

on the Nth iteration of the orbit. Thus, $p_0$ is a halting point.

Definition 2.20

Translation Equivalent Configurations

With respect to Turing machine $(Q, A, \eta)$, the two configurations $(q, k, T)$ and $(q, j, V)$ are translation equivalent if $T(m)=V(m+j-k)$ for every integer m.

Corollary 2.21

Immortal Periodic Points, Induced by Configurations, Correspond to Translation Equivalent Configurations that are Immortal Periodic Proof.

Suppose $p=[x(q, k, T), y(q, k, T)]$ with respect to $(Q, A, \eta)$ and p lies in $$\bigcup_{k=1}^{I} W_k$$

such that $f_{S(N)}f_{S(N-1)} \cdots f_{S(1)}(p)=p$. Starting with configuration $(q, k, T)$, after N execution steps of $(Q, A, \eta)$, the resulting configuration $(q, j, V)$ satisfies $x(q, k, T)=x(q, j, V)$ and $y(q, k, T)=y(q, j, V)$ because of $f_{S(N)}f_{S(N-1)} \cdots f_{S(1)}(p)=p$ and Theorem 2.19. This implies that $(q, k, T)$ is translation equivalent to $(q, j, V)$.

By induction this argument may be repeated indefinitely. Thus, $(q, k,$ is an immortal configuration such that for every N computational steps of $(Q, A, \eta)$, the kth resulting configuration $(q, j_k, V_k)$ is translation equivalent to $(q, k, T)$.

Lemma 2.22

Two affine functions with adjacent unit squares as their respective domains are either both right affine or both left affine functions. (Adjacent unit squares have lower left x and y coordinates that differ at most by 1. It is assumed that $|Q| \ge 2$, since any Turing program with only one state has a trivial halting behavior that can be determined in $|A|$ execution steps when the tape is bounded.)

Proof.

From 2.12, the unit square $U_{(\lfloor x \rfloor, \lfloor y \rfloor)}$ has a lower left corner with coordinates $(\lfloor x \rfloor, \lfloor y \rfloor)$ where $\lfloor x \rfloor = Bv(T_k)+v(T_{k+1})$ and $\lfloor y \rfloor = Bv(q)+v(T_{k-1})$. A left or right affine function (left or right move) is determined by the state q and the current tape square $T_k$. If states $q \ne r$, then $|Bv(q)-Bv(r)| \ge B$. If two alphabet symbols a, b are distinct, then $|v(a)-v(b)| < |A|$.

Thus, if two distinct program instructions have different states $q \ne r$, then the corresponding unit squares have y-coordinates that differ by at least $B-|A|=|Q| \ge 2$, since any Turing program with just one state has trivial behavior that can be determined in $|A|$ execution steps when the tape is bounded. Otherwise, two distinct program instructions must have distinct symbols at $T_k$. In this case, the corresponding unit squares have x-coordinates that differ by at least $B-|A|=|Q| \ge 2$.

Definition 2.23

Rationally Bounded Coordinates

Let $f_1, f_2, \ldots, f_I$ denote the I affine functions with corresponding unit square domains $W_1, W_2, W_I$. Let p be a point in the plane P with orbit $[p, f_{S(1)}(p), f_{S(2)}f_{S(1)}(p), \ldots, f_{S(m)}f_{S(m-1)} \cdots f_{S(2)}f_{S(1)}(p), \ldots]$. Then the orbit of p has rationally bounded coordinates if the x and y coordinates are rational for every point in the orbit and if there exists a natural number M such that for every point, $f_{S(k)}f_{S(k-1)} \cdots f_{S(2)}f_{S(1)}(p)$, when the x and y coordinates are expressed in reduced form M divides the denominator of each coordinate.

Theorem 2.24

An Orbit with Rationally Bounded Coordinates is Periodic or Halting.

Proof.

Suppose both coordinates are rationally bounded for the whole orbit and M is the natural number. If one point in the orbit exits $$\bigcup_{k=1}^{I} W_k$$

then the proof is completed. It is a halting orbit. Otherwise, consider the first R $M^2+1$ points of the orbit. Since there are most $M^2$ points in a unit square with coordinates that are rationally bounded by integer M, then two distinct points in the orbit must be the same. Thus, the orbit is periodic.

Theorem 2.25

An Orbit with Unbounded Coordinates is an Immortal Orbit that is not Periodic, where it is Assumed that the Initial Tape is Bounded.

Proof.

If the orbit halts, then the orbit has a finite number of points. Thus, it must be an immortal orbit. This orbit can not be periodic because the coordinates are rationally unbounded.

Corollary 2.26

An unbounded machine execution corresponds to an immortal orbit.

Corollary 2.27

If the Turing Machine execution is unbounded on the right half of the tape, then in regard to the corresponding affine orbit, there is a subsequence $S(1), S(2), \ldots, S(k), \ldots$ of the indices of the function sequence $g_1, g_2, \ldots, g_k, \ldots$ such that for each natural number n the composition of functions $g_{S(n)} g_{(n-1)} \cdots g_{S(1)}$ iterated up to the s(n)th orbit point is of the form $$\begin{pmatrix} B^n & 0 \\ 0 & \frac{1}{B^n} \end{pmatrix} \begin{pmatrix} x \\ y \end{pmatrix} + \begin{pmatrix} m_{s(n)} \\ t_{s(n)} \end{pmatrix}$$

where $m_{s(n)}, t_{s(n)}$ are rational numbers.

Corollary 2.28

If the Turing Machine execution is unbounded on the left half of the tape, then in regard to the corresponding affine orbit, there is a subsequence $S(1), S(2), \ldots, S(k), \ldots$ of the indices of the function sequence $g_1, g_2, \ldots, g_k, \ldots$ such that for each natural number n the composition of functions $g_{S(n)} g_{S(n-1)} \cdots g_{S(1)}$ iterated up to the s(n)th orbit point is of the form:

$$\begin{pmatrix} \frac{1}{B^n} & 0 \\ 0 & B^n \end{pmatrix} \begin{pmatrix} x \\ y \end{pmatrix} + \begin{pmatrix} m_{s(n)} \\ t_{s(n)} \end{pmatrix}$$

where $m_{s(n)}, t_{s(n)}$ are rational numbers.

Theorem 2.29

M-Bounded Execution Implies a Halting or Periodic Orbit

Suppose that the Turing Machine $(Q, A, \eta)$ begins or continues execution with a configuration such that tape and tape head location are both M-bounded during the next $(2M+1)|Q||A|^{2M+1}+1$ execution steps. Then the Turing Machine program halts in at most $(2M+1)|Q||A|^{2M+1}+1$ execution steps or its corresponding orbit is periodic with period less than or equal to $(2M+1)|Q||A|^{2M+1}+1$ Proof.

If the program halts in $(2M+1)|Q||A|^{2M+1}+1$ steps, then the proof is completed. Otherwise, consider the first $(2M+1)|Q||A|^{2M+1}+1$ steps. After each of these computational steps, the tape contents T(k) at square k are blank whenever $|k|>M$. There are a maximum of $|Q| |A|$ program commands for each tape head location. There are a maximum of $(2M+1)$ tape head locations. For each of the remaining 2M non-blank tape squares, each square can have at most $|A|$ different symbols, which means a total of $|A|^{2M}$ possibilities for these tape squares. Thus, in the first $(2M+1)|Q||A|^{2M+1}+1$ points of the corresponding orbit in P, there are at most distinct $(2M+1)|Q||A|^{2M+1}$ points so at least one point in the orbit must occur more than once.

EXAMPLES, PERIODIC POINTS AND TAPE PATTERNS SECTION 3

Example 3.1

$Q = \{q_0, q_1, q_2\} \quad A = \{\#, a, b\}$

| $q$ | $T_k$ | $\eta(q, T_k)$ |
|---|---|---|
| $q_0$ | # | $(q_1, a, R)$ |
| $q_0$ | $a$ | $(q_0, a, L)$ |
| $q_0$ | $b$ | $(q_0, b, L)$ |
| $q_1$ | # | $(q_0, b, L)$ |
| $q_1$ | $a$ | $(q_1, a, R)$ |
| $q_1$ | $b$ | $(q_1, b, R)$ |
| $q_2$ | # | $(h, \#, R)$ |
| $q_2$ | $a$ | $(h, a, R)$ |
| $q_2$ | $b$ | $(h, b, R)$ |

The initial tape contents are all #'s. Formally, T(k)=# for every integer k. Base B=|Q|+|A|+1=7. For this example, as defined in 2.8, the value function v: $A \cup Q \cup \{h\} \to N$ is defined as v(h)=0 v(#)=1 v(a)=2 v(b)=3 v($q_0$)=4 v($q_1$)=5 v($q_2$)=6.

In regard to the affine orbit and Turing Machine execution correspondence, the affine functions $f_j$ and unit square domains $W_j$, the current Turing Machine state, tape head and tape are shown after each execution step. The location of the tape head is indicated by underlining the tape symbol and placing the state of the machine directly underneath this tape square.

$$f_1(x, y) = \left(7x - 49, \frac{1}{7}y + 33\right) \text{ on}$$

$$W_1 = [(8, 29), (9, 29), (9, 30), (8, 30)]$$

$$p = \left(8\frac{1}{6}, 29\frac{1}{6}\right)$$

| Tape Coordinate | 0 | 1 | 2 | 3 | 4 | 5 | 6 | 7 | 8 |
|---|---|---|---|---|---|---|---|---|---|
| Tape Contents | # | <u>#</u> | # | # | # | # | # | # | # |
| State | | $q_0$ | | | | | | | |

$$f_{15}(x, y) = \left(\frac{1}{7}x + 16, 7y - 231\right) \text{ on}$$

$$W_{15} = [(8, 37), (9, 37), (9, 38), (8, 38)]$$

$$p = \left(8\frac{1}{6}, 37\frac{1}{6}\right)$$

| Tape Coordinate | 0 | 1 | 2 | 3 | 4 | 5 | 6 | 7 | 8 |
|---|---|---|---|---|---|---|---|---|---|
| Tape Contents | # | a | <u>#</u> | # | # | # | # | # | # |
| State | | | $q_1$ | | | | | | |

$$f_4(x, y) = \left(\frac{1}{7}x + 7, 7y - 175\right) \text{ on}$$

$$W_4 = [(17, 29), (18, 29), (18, 30), (17, 30)]$$

$$p = \left(17\frac{1}{6}, 29\frac{1}{6}\right)$$

| Tape Coordinate | 0 | 1 | 2 | 3 | 4 | 5 | 6 | 7 | 8 |
|---|---|---|---|---|---|---|---|---|---|
| Tape Contents | # | <u>a</u> | b | # | # | # | # | # | # |
| State | | $q_0$ | | | | | | | |

$$f_2(x, y) = \left(7x - 49, \frac{1}{7}y + 33\right) \text{ on}$$

$$W_2 = [(9, 29), (10, 29), (10, 30), (9, 30)]$$

$$p = \left(9\frac{19}{42}, 29\frac{1}{6}\right)$$

| Tape Coordinate | 0 | 1 | 2 | 3 | 4 | 5 | 6 | 7 | 8 |
|---|---|---|---|---|---|---|---|---|---|
| Tape Contents | # | <u>#</u> | a | b | # | # | # | # | # |
| State | $q_0$ | | | | | | | | |

$$f_{13}(x, y) = \left(7x - 98, \frac{1}{7}y + 32\right) \text{ on}$$

$$W_{13} = [(17, 37), (18, 37), (18, 38), (17, 38)]$$

$$p = \left(17\frac{1}{6}, 37\frac{1}{6}\right)$$

-continued

| Tape Coordinate | 0 | 1 | 2 | 3 | 4 | 5 | 6 | 7 | 8 |
|---|---|---|---|---|---|---|---|---|---|
| Tape Contents | a | <u>a</u> | b | # | # | # | # | # | # |
| State | | $q_1$ | | | | | | | |

$$f_{11}(x, y) = \left(7x - 147, \frac{1}{7}y + 33\right) \text{ on}$$

$$W_{11} = [(22, 37), (23, 37), (23, 38), (22, 38)]$$

$$p = \left(22\frac{1}{6}, 37\frac{13}{42}\right)$$

| Tape Coordinate | 0 | 1 | 2 | 3 | 4 | 5 | 6 | 7 | 8 |
|---|---|---|---|---|---|---|---|---|---|
| Tape Contents | a | a | <u>b</u> | # | # | # | # | # | # |
| State | | | $q_1$ | | | | | | |

$$f_{16}(x, y) = \left(\frac{1}{7}x + 23, 7y - 238\right) \text{ on}$$

$$W_{16} = [(8, 38), (9, 38), (9, 39), (8, 39)]$$

$$p = \left(8\frac{1}{6}, 38\frac{97}{294}\right)$$

| Tape Coordinate | 0 | 1 | 2 | 3 | 4 | 5 | 6 | 7 | 8 |
|---|---|---|---|---|---|---|---|---|---|
| Tape Contents | a | a | b | <u>#</u> | # | # | # | # | # |
| State | | | | $q_1$ | | | | | |

$$f_7(x, y) = \left(\frac{1}{7}x + 14, 7y - 182\right) \text{ on}$$

$$W_7 = [(24, 30), (25, 30), (25, 31), (24, 31)]$$

$$p = \left(24\frac{1}{6}, 30\frac{13}{42}\right)$$

| Tape Coordinate | 0 | 1 | 2 | 3 | 4 | 5 | 6 | 7 | 8 |
|---|---|---|---|---|---|---|---|---|---|
| Tape Contents | a | a | <u>b</u> | b | # | # | # | # | # |
| State | | | $q_0$ | | | | | | |

$$f_5(x, y) = \left(\frac{1}{7}x + 14, 7y - 182\right) \text{ on}$$

$$W_5 = [(17, 30), (18, 30), (18, 31), (17, 31)]$$

$$p = \left(17\frac{19}{42}, 30\frac{1}{6}\right)$$

| Tape Coordinate | 0 | 1 | 2 | 3 | 4 | 5 | 6 | 7 | 8 |
|---|---|---|---|---|---|---|---|---|---|
| Tape Contents | a | <u>a</u> | b | b | # | # | # | # | # |
| State | | $q_0$ | | | | | | | |

$$f_3(x, y) = \left(\frac{1}{7}x + 7, 7y - 175\right) \text{ on}$$

$$W_3 = [(16, 29), (17, 29), (17, 30), (16, 30)]$$

$$p = \left(16\frac{145}{294}, 29\frac{1}{6}\right)$$

-continued

| Tape Coordinate | 0 | 1 | 2 | 3 | 4 | 5 | 6 | 7 | 8 |
|---|---|---|---|---|---|---|---|---|---|
| Tape Contents | $\underline{a}$ | $a$ | $b$ | $b$ | # | # | # | # | # |
| State | $q_0$ | | | | | | | | |

$f_2(x, y) = \left(7x - 49, \frac{1}{7}y + 33\right)$ on $W_2 = [(9, 29), (10, 29), (10, 30), (9, 30)]$ $p = \left(9\frac{733}{2058}, 29\frac{1}{6}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $\underline{\#}$ | $a$ | $a$ | $b$ | $b$ | # | # | # | # | # |
| State | $q_0$ | | | | | | | | | |

$f_{14}(x, y) = \left(7x - 98, \frac{1}{7}y + 32\right)$ on $W_{14} = [(16, 37), (17, 37), (17, 38), (16, 38)]$ $p = \left(16\frac{145}{294}, 37\frac{1}{6}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $\underline{a}$ | $a$ | $b$ | $b$ | # | # | # | # | # |
| State | | $q_1$ | | | | | | | | |

$f_{13}(x, y) = \left(7x - 98, \frac{1}{7}y + 32\right)$ on $W_{13} = [(17, 37), (18, 37), (18, 38), (17, 38)]$ $p = \left(17\frac{19}{42}, 37\frac{13}{42}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $\underline{a}$ | $b$ | $b$ | # | # | # | # | # |
| State | | | $q_1$ | | | | | | | |

$f_9(x, y) = \left(7x - 147, \frac{1}{7}y + 33\right)$ on $W_9 = [(24, 37), (25, 37), (25, 38), (24, 38)]$ $p = \left(24\frac{1}{6}, 37\frac{97}{294}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $a$ | $\underline{b}$ | $b$ | # | # | # | # | # |
| State | | | | $q_1$ | | | | | | |

$f_{12}(x, y) = \left(7x - 147, \frac{1}{7}y + 33\right)$ on $W_{12} = [(22, 38), (23, 38), (23, 39), (22, 39)]$ $p = \left(22\frac{1}{6}, 38\frac{685}{2085}\right)$ -continued

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $a$ | $b$ | $\underline{b}$ | # | # | # | # | # |
| State | | | | $q_1$ | | | | | | |

$f_{16}(x, y) = \left(\frac{1}{7}x + 23, 7y - 238\right)$ on $W_{16} = [(8, 38), (9, 38), (9, 39), (8, 39)]$ $p = \left(8\frac{1}{6}, 38\frac{6847}{14406}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $a$ | $b$ | $b$ | $\underline{\#}$ | # | # | # | # |
| State | | | | | $q_1$ | | | | | |

$f_8(x, y) = \left(\frac{1}{7}x + 21, 7y - 189\right)$ on $W_8 = [(24, 31), (25, 31), (25, 32), (24, 32)]$ $p = \left(24\frac{1}{6}, 31\frac{685}{2058}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $a$ | $b$ | $\underline{b}$ | $b$ | # | # | # | # |
| State | | | | $q_0$ | | | | | | |

$f_7(x, y) = \left(\frac{1}{7}x + 14, 7y - 182\right)$ on $W_7 = [(24, 30), (25, 30), (25, 31), (24, 31)]$ $p = \left(24\frac{19}{42}, 30\frac{97}{294}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $a$ | $\underline{b}$ | $b$ | # | # | # | # | # |
| State | | | | $q_0$ | | | | | | |

$f_5(x, y) = \left(\frac{1}{7}x + 14, 7y - 182\right)$ on $W_5 = [(17, 30), (18, 30), (18, 31), (17, 31)]$ $p = \left(17\frac{145}{294}, 30\frac{13}{42}\right)$

| Tape Coordinate | −1 | 0 | 1 | 2 | 3 | 4 | 5 | 6 | 7 | 8 |
|---|---|---|---|---|---|---|---|---|---|---|
| Tape Contents | $a$ | $a$ | $\underline{a}$ | $b$ | $b$ | # | # | # | # | # |
| State | | $q_0$ | | | | | | | | |

$f_6(x, y) = \left(\frac{1}{7}x + 14, 7y - 182\right)$ on $W_6 = [(16, 30), (17, 30), (17, 31), (16, 31)]$ $p = \left(16\frac{1027}{2058}, 30\frac{1}{6}\right)$

| Tape Coordinate | −1 | 0 | 1 | 2 | 3 | 4 | 5 | 6 | 7 | 8 |
|---|---|---|---|---|---|---|---|---|---|---|
| Tape Contents | a | _a_ | a | b | b | b | # | # | # | # |
| State | | $q_0$ | | | | | | | | |

$f_3(x, y) = \left(\frac{1}{7}x + 7, 7y - 175\right)$ on $W_3 = [(16, 29), (17, 29), (17, 30), (16, 30)]$ $p = \left(16\frac{5143}{14406}, 29\frac{1}{6}\right)$

| Tape Coordinate | −1 | 0 | 1 | 2 | 3 | 4 | 5 | 6 | 7 | 8 |
|---|---|---|---|---|---|---|---|---|---|---|
| Tape Contents | _a_ | a | a | b | b | b | # | # | # | # |
| State | $q_0$ | | | | | | | | | |

$f_2(x, y) = \left(7x - 49, \frac{1}{7}y + 33\right)$ on $W_3 = [(9, 29), (10, 29), (10, 30), (9, 30)]$ $p \approx \left(9.3367, 29\frac{1}{6}\right)$

| Tape Coordinate | −2 | −1 | 0 | 1 | 2 | 3 | 4 | 5 | 6 | 7 | 8 |
|---|---|---|---|---|---|---|---|---|---|---|---|
| Tape Contents | # | a | a | a | b | b | b | # | # | # | # |
| State | $q_0$ | | | | | | | | | | |

$f_{14}(x, y) = \left(7x - 98, \frac{1}{7}y + 32\right)$ on $W_3 = [(16, 37), (17, 37), (17, 38), (16, 38)]$ $p \approx \left(16.357, 37\frac{1}{6}\right)$

| Tape Coordinate | −2 | −1 | 0 | 1 | 2 | 3 | 4 | 5 | 6 | 7 | 8 |
|---|---|---|---|---|---|---|---|---|---|---|---|
| Tape Contents | a | _a_ | a | b | b | b | # | # | # | # | # |
| State | | $q_1$ | | | | | | | | | |

$f_{14}(x, y) = \left(7x - 98, \frac{1}{7}y + 32\right)$ on $W_3 = [(16, 37), (17, 37), (17, 38), (16, 38)]$ $p \approx (16.499, 37.3095)$

| Tape Coordinate | −2 | −1 | 0 | 1 | 2 | 3 | 4 | 5 | 6 | 7 | 8 |
|---|---|---|---|---|---|---|---|---|---|---|---|
| Tape Contents | a | a | _a_ | b | b | b | # | # | # | # | # |
| State | | | $q_1$ | | | | | | | | |

$f_{13}(x, y) = \left(7x - 98, \frac{1}{7}y + 32\right)$ on $W_3 = [(17, 37), (18, 37), (18, 38), (17, 38)]$ $p \approx (17.493, 37.3299)$

| Tape Coordinate | −2 | −1 | 0 | 1 | 2 | 3 | 4 | 5 | 6 | 7 | 8 |
|---|---|---|---|---|---|---|---|---|---|---|---|
| Tape Contents | a | a | a | _a_ | b | b | b | # | # | # | # |
| State | | | | $q_1$ | | | | | | | |

$$p = \left(14 + 3 + \frac{\frac{3}{7}}{1 - \frac{1}{7}}, 35 + 2 + \frac{\frac{2}{7}}{1 - \frac{1}{7}}\right) = \left(17\frac{1}{2}, 37\frac{1}{3}\right)$$

is a non-periodic cluster point that corresponds to the machine being in state $q_1$ and the tape head location is at square 1 and the tape contents are T(k)=a whenever k≤1 and T(k)=b whenever k>1.

$$v = \left(2 \cdot 7 + 2 + \frac{\frac{2}{7}}{1 - \frac{1}{7}}, 5 \cdot 7 + 2 + \frac{\frac{2}{7}}{1 - \frac{1}{7}}\right) = \left(16\frac{1}{3}, 37\frac{1}{3}\right)$$

is a cluster point of the immortal orbit that corresponds to the machine being in state $q_1$ and the tape head location can be at any square j and the tape contents are T(k)=a for every k on the tape. Observe that v is a fixed point of $$f_{14}(x, y) = \left(7x - 98, \frac{1}{7}y + 32\right)$$

lying in the interior of the unit square $W_{14}$=[(16, 37), (17, 37), (17, 38), (16, 38)].

Observe that if $$v_0 = \left(16\frac{145}{294}, 37\frac{1}{6}\right)$$

which is when the tape head is at 0; the machine is in state $q_1$; and T(0−1)=T(0)=T(0+1)=a. Then $v_0$ is in this immortal orbit.

| Tape Coordinate | −1 | 0 | 1 | 2 | 3 | 4 | 5 | 6 | 7 | 8 |
|---|---|---|---|---|---|---|---|---|---|---|
| Tape Contents | a | _a_ | a | b | b | # | # | # | # | # |
| State | | $q_1$ | | | | | | | | |

Set $v_1$=to the first time the point in the immortal orbit has its tape head at 4; and the machine is in state $q_0$; and T(−1−2)=T(−1−1)=T(−1)=T(−1+1)=T(−1+2)=a.

| Tape Coordinate | -4 | -3 | -2 | -1 | 0 | 1 | 2 | 3 | 4 | 5 | 6 | 7 | 8 |
|---|---|---|---|---|---|---|---|---|---|---|---|---|---|
| Tape Contents | # | a | a | a | a | a | b | b | b | b | # | # | # |
| State | | | | $q_1$ | | | | | | | | | |

By induction, for every k>1, set $v_k$=to the first time the point in the immortal orbit has its tape head at k; the machine is in state $q_0$; and T(-k+j)=a for every j such that |j|≤k+1. This implies $$\lim_{n \to \infty} v_n = v.$$

Observe that $$f_2 f_3 f_6 f_5 f_7 f_8 f_{16} f_{12} f_9 f_{13} f_{14}(x, y) = \left(\frac{1}{7}x + \frac{33616}{2401}, 7y - 223\right)$$

has fixed point $$v = \left(\frac{16808}{1029}, \frac{223}{6}\right) = (16.3340 \ldots, 37.1\overline{6}).$$

Figure 3:
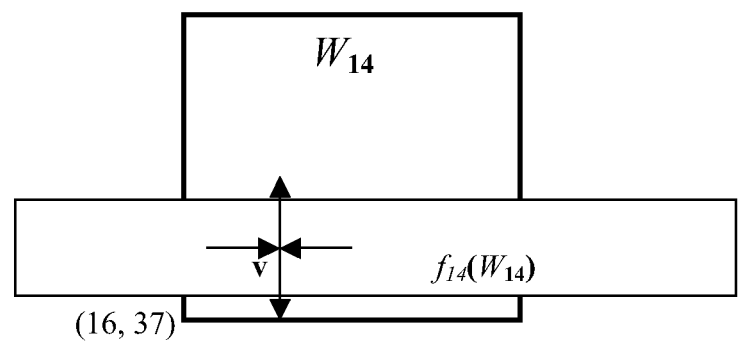
FIG. 3 shows a horizontal cover where the lower left corner of the unit square is (16, 37).

See FIG. 3.

$$f_{14}\left(16\frac{3}{7}, 37\frac{1}{6}\right) = \left(17, 37\frac{13}{42}\right) \quad f_{14}\left(16\frac{3}{7}, 37\frac{1}{2}\right) = \left(17, 37\frac{5}{14}\right)$$

$(16.4285, 37.166) \to$  $(16.4285, 37.5) \to$
$(17, 37.3095 \ldots)$  $(17, 37.357 \ldots)$ Observe that $$f_7 f_8 f_{16} f_{12} f_9 f_{13} f_{14} f_2 f_3 f_5(x, y) = \left(x + \frac{2}{49}, y + \frac{1}{7}\right)$$

$$w = \left(\frac{21 \cdot 7}{7 - 1}, \frac{-189}{1 - 7}\right) = \left(24\frac{1}{2}, 31\frac{1}{2}\right)$$

is a cluster point of the immortal orbit that corresponds to the machine being in state $q_0$ and the tape head location can be at any square j and the tape contents are T(k)=b for every k on the tape.

Observe that w is a fixed point of $$f_8(x, y) = \left(\frac{1}{7}x + 21, 7y - 189\right)$$

lying in the interior of the unit square $W_8$=[(24, 31), (25, 31), (25, 32), (24, 32)]. Also, observe that if $$w_3 = \left(24\frac{1}{6}, 31\frac{685}{2085}\right)$$

which is when the tape head is at 3; and the machine is in state $q_0$; and T(3-1)=T(3)=T(3+1)=b, then $w_3$ is in this immortal orbit.

| Tape Coordinate | -1 | 0 | 1 | 2 | 3 | 4 | 5 | 6 | 7 | 8 |
|---|---|---|---|---|---|---|---|---|---|---|
| Tape Contents | a | a | a | b | b | b | # | # | # | # |
| State | | | | | $q_0$ | | | | | |

Set $W_4$ equal to the first time the point in the immortal orbit has its tape head at 4; and the machine is in state $q_0$; and T(4-2)=T(4-1)=T(4)=T(4+1)=T(4+2)=b.

| Tape Coordinate | -4 | -3 | -2 | -1 | 0 | 1 | 2 | 3 | 4 | 5 | 6 | 7 | 8 |
|---|---|---|---|---|---|---|---|---|---|---|---|---|---|
| Tape Contents | # | a | a | a | a | a | b | b | b | b | b | # | # |
| State | | | | | | | | | $q_0$ | | | | |

By induction, for every k>4, set $w_k$=to the first time the point in the immortal orbit has its tape head at k; and the machine is in state $q_0$; and T(k+j)=b for every j such that |j|≤k-2. Observe that $$\lim_{n \to \infty} w_n = w$$

Notation 3.2

Different notations are introduced that represent a point corresponding to a Turing machine configuration. The coordinates of the point are not dependent on the integer value of the tape head with respect to the tape. For this reason, in these different notations, the position of the tape head is located without indicating the integer value of the tape head.

The expression p=[3, w⟨1⟩2v] represents point p where the current state of the machine is 3; the tape head points to a tape square containing a 1; the tape square adjacent to the right of the tape head contains a 2; the remainder of the tape squares to the right of this 2 are represented by a variable v which may represent an arbitrary sequence of alphabet symbols on the right side of the tape; and the remainder of the tape squares to the left of the tape head are represented by a variable w which may represent an arbitrary sequence of alphabet symbols on the left side of the tape.

To express the configuration at a computational step, 3 111 1222 represents that the machine is in state 3, the tape head is located at the underlined 1 and there are 2's to the right of the tape head and 1's to the left of the tape head. If a sequence of symbols is overlined then that means the remainder of the tape squares contain that periodic pattern. For example, p=[3, $\overline{12}$⟨1⟩$\overline{212}$] means the machine is in state 3; that the tape to the right of the tape head contains the periodic pattern 212 212 212 . . . ; and the tape to the left of the tape head contains the periodic pattern . . . 12 12 12 12 12.

The following examples demonstrate simple immortal periodic points.

Example 3.3

$Q = \{2, 3\}$.

Halting state = 1

$A = \{1, 2\}$.

Program 1034

| $Q$ | $T_k$ | $\eta(q, T_k)$ |
|---|---|---|
| 2 | 1 | (1, 1, R) |
| 2 | 2 | (3, 2, L) |
| 3 | 1 | (2, 2, R) |
| 3 | 2 | (2, 1, R) |

| | |
|---|---|
| 3 | w22v |
| 2 | w12v |
| 3 | w12v |
| 2 | w22v |
| 3 | w22v |

The tape head moves for this non-hyperbolic immortal periodic point are $\{RLRL\}^n$. All points p=[3, w⟨2⟩2v] are non-hyperbolic immortal periodic points with period C=4. Program 1034 does not have any hyperbolic immortal periodic points.

Example 3.4

$Q = \{2, 3\}$.

Halting state = 1.

$A = \{1, 2\}$.

Program 481

| $Q$ | $T_k$ | $\eta(q, T_k)$ |
|---|---|---|
| 2 | 1 | (3, 1, L) |
| 2 | 2 | (1, 2, R) |
| 3 | 1 | (3, 1, R) |
| 3 | 2 | (2, 1, L) |

| | |
|---|---|
| 3 | 1111222 |
| 3 | 1111222 |
| 2 | 1111122 |
| 3 | 1111122 |
| 3 | 1111122 |
| 3 | 1111122 |

The tape head moves for this immortal periodic point are $\{RLLRR\}^n$ where n is a positive integer. Point p=[3, $\overline{1}$⟨1⟩2$\overline{2}$] is an immortal periodic point with period 5 and hyperbolic degree 1. There is an immortal periodic point q=[3, $\overline{1}$⟨1⟩$\overline{1}$] with period 1 and hyperbolic degree 1. There is also has an immortal periodic point w=[2, $\overline{12}$⟨1⟩$\overline{1}$] with period 2 and hyperbolic degree −2.

Example 3.5

$Q = \{2, 3, 4, 5, 6\}$.

Halting state = 1.

$A = \{1, 2\}$.

Left pattern = 2

Middle Pattern = 1121.

Right pattern = 1

| $Q$ | $T_k$ | $\eta(q, T_k)$ |
|---|---|---|
| 2 | 1 | (3, 2, R) |
| 2 | 2 | (1, 2, R) |
| 3 | 1 | (4, 1, R) |
| 3 | 2 | (1, 2, R) |
| 4 | 1 | (1, 1, R) |
| 4 | 2 | (5, 1, R) |
| 5 | 1 | (6, 2, L) |
| 5 | 2 | (1, 2, R) |
| 6 | 1 | (2, 1, L) |
| 6 | 2 | (1, 2, R) |

| | |
|---|---|
| 2 | y11211 |
| 3 | y21211 |
| 4 | y21211 |
| 5 | y21111 |
| 6 | y21121 |
| 2 | y21121 |
| 3 | y22121 |
| 4 | y22121 |
| 5 | y22111 |
| 6 | y22112 |

The point p=[2, $\overline{2}$⟨1⟩121$\overline{1}$] is the only immortal periodic point derived from state 2. The immortal point p has period C=5. The minimum left pattern "2" has length 1. The middle pattern "1121" has length 4; and the right pattern "1" has length 1.

Example 3.6

$Q = \{q, r, s, t, u, v, w, x\}$.

$A = \{1, 2\}$.

Halting state = h

Left pattern = 12.

Spanning Middle Pattern = 1212212.

Right pattern = 212.

-continued

| Q | $T_k$ | $\eta(q, T_k)$ |
|---|---|---|
| q | 1 | (r, 1, R) |
| q | 2 | (h, 2, R) |
| r | 1 | (h, 1, R) |
| r | 2 | (s, 2, R) |
| s | 1 | (t, 1, R) |
| s | 2 | (h, 2, R) |
| t | 1 | (h, 1, R) |
| t | 2 | (u, 2, R) |
| u | 1 | (h, 1, R) |
| u | 2 | (v, 1, R) |
| v | 1 | (h, 1, R) |
| v | 2 | (w, 2, R) |
| w | 1 | (h, 1, R) |
| w | 2 | (x, 1, L) |
| x | 1 | (h, 1, R) |
| x | 2 | (q, 2, R) |

Machine execution steps with tape head initially at tape square 1. Tape head location is indicated by underline.

| q | ... | 1 | 2 | 1 | 2 | <u>1</u> | 2 | 1 | 2 | 2 | 1 | 2 | 2 | 1 | 2 | 2 | 1 | 2 | ... |
|---|---|---|---|---|---|---|---|---|---|---|---|---|---|---|---|---|---|---|---|
| r | ... | 1 | 2 | 1 | 2 | 1 | <u>2</u> | 1 | 2 | 2 | 1 | 2 | 2 | 1 | 2 | 2 | 1 | 2 | ... |
| s | ... | 1 | 2 | 1 | 2 | 1 | 2 | <u>1</u> | 2 | 2 | 1 | 2 | 2 | 1 | 2 | 2 | 1 | 2 | ... |
| t | ... | 1 | 2 | 1 | 2 | 1 | 2 | 1 | <u>2</u> | 2 | 1 | 2 | 2 | 1 | 2 | 2 | 1 | 2 | ... |
| u | ... | 1 | 2 | 1 | 2 | 1 | 2 | 1 | 2 | <u>2</u> | 1 | 2 | 2 | 1 | 2 | 2 | 1 | 2 | ... |
| v | ... | 1 | 2 | 1 | 2 | 1 | 2 | 1 | 2 | <u>2</u> | 2 | 1 | 2 | 2 | 1 | 2 | 2 | 1 | 2 | ... |
| w | ... | 1 | 2 | 1 | 2 | 1 | 2 | 1 | 2 | 2 | <u>2</u> | 1 | 2 | 2 | 1 | 2 | 2 | 1 | 2 | ... |
| x | ... | 1 | 2 | 1 | 2 | 1 | 2 | 1 | 2 | <u>2</u> | 1 | 2 | 1 | 2 | 2 | 1 | 2 | ... |
| q | ... | 1 | 2 | 1 | 2 | 1 | 2 | 1 | 2 | 1 | 2 | <u>1</u> | 2 | 2 | 1 | 2 | 2 | 1 | 2 | ... |

The tape head moves are $(R^6LR)^n$. The point $p=[q, \overline{12\langle 1\rangle} \,\overline{212}]$ is an immortal periodic point with period 8 and hyperbolic degree 6.

Definition 3.7

Computational Period

Suppose the Turing machine $(Q, A, \eta)$ has an immortal periodic point p. If the machine starts its execution at point p, then the minimal number of computational steps, denoted C(p), for the machine to return to point p is called the computational period of p. Observe that the computational period C(p) is the same number as the period of p with respect to the corresponding affine maps $f_k: W_k \to P$ where $1 \le k \le I$.

Remark 3.8

Hyperbolic Degree $m(p) = |R|-|L|$ and $C(p) = |R|+|L|$

If p is an immortal periodic point with computational period C(p), then $C(p) = |R|+|L|$ where $|R|$ denotes the number of right tape head moves during these C(p) computational steps and $|L|$ denotes the number of left tape head moves during these C(p) computational steps. From section 2, let $f_{S(C)} f_{S(C-1)} \ldots f_{S(1)}$ be the corresponding sequence of affine maps. Then the linear part of $f_{S(C)} f_{S(C-1)} \ldots f_{S(1)}$ has the form $$\begin{pmatrix} B^m & 0 \\ 0 & \frac{1}{B^m} \end{pmatrix}$$

where $m=|R|-|L|$. When it is understood which immortal periodic point is referred to, then the argument p is omitted and m denotes the hyperbolic degree and C denotes the computational period.

Definition 3.9

Hyperbolic Degree, Right Shift, Left Shift

Consider affine map r with linear part of the form $$\begin{pmatrix} B^m & 0 \\ 0 & \frac{1}{B^m} \end{pmatrix}$$

for some integer $m \ne 0$. If $m > 0$, then r is called an m degree right shift hyperbolic map. If $m < 0$, then r is called an m degree left shift hyperbolic map.

Definition 3.10

Patterns and Subpatterns

A pattern W is a finite sequence of alphabet symbols chosen from A. In other words, W: $\{0, 1, \ldots, n-1\} \to A$. The length of W=n and is denoted as $|W|=n$. The kth element of the pattern W is denoted as W(k) or $w_k$. Thus, pattern W is sometimes explicitly expressed as $w_0 w_1 \ldots w_{-1}$. S is a subpattern of W if $S = w_j w_{j+1} \ldots w_{k-1} w_k$ for some j and k satisfying $0 \le j \le k \le n-1$ and the length of $S=k-j+1$. In computer science, sometimes S is called a substring. S is a left subpattern if $j=0$ and a right subpattern if $k=n-1$.

Definition 3.11

Pattern Divisibility

The positive integer m divides pattern W if the length of W=rm for some positive integer r and all of the following hold:

$$W(0) = W(m) = \ldots = W((r-1)m)$$

...

$$W(j) = W(m+j) = \ldots = W((r-1)m+j)$$

$$W(m-1)=W(2m-1)=\ldots=W(rm-1)$$

More formally, for every non-negative integer j satisfying 0≤j≤m−1 and for every positive integer k satisfying 1≤k≤r−1, then W(j)=W(1+km).

Example 3.12

Patterns, Subpatterns, Divisibility

Set pattern W=01 00$\underline{1}$0. The length of W equals 6. The integer 3 divides W.

T=0100 is a left subpattern of W. U=010 is a right subpattern of W.

Set pattern V=11 $\underline{0}$101. The length of V equals 6. V is divisible by 6 but has no smaller divisors. The set of all subpatterns of V that have length 5={11010, 10101}

Definition 3.13

Left-Right Periodic Tape

Turing tape T is left periodic with left period α with respect to tape square k if α is the smallest positive integer such that for each j satisfying 0≤j<α, then for every positive integer m, T(k−j−mα)=T(k−j). Turing tape T is right periodic with right period β with respect to square k if β is the smallest positive integer such that for each j satisfying 0≤j<β, then for every positive integer m, T(k+j+mβ)=T(k+j). A tape is left-right (α, γ, β) periodic if the tape is left periodic with period α respect to tape square k and right periodic with period β respect to tape square (k+γ+1) for some non-negative integer γ. Observe that in general α≠β.

The sequence of α tape symbols T(k−α+1) T(k−α+2) . . . T(k) is called the left pattern. When γ>0, the tape sequence T(k+1) . . . T(k+γ) is called the middle pattern. When γ=0, the middle pattern is called the empty pattern. The sequence of tape symbols T(k+γ+1) T(k+γ+2) . . . T(k+γ+β) is called the right pattern.

Example 3.14

Left-Right Periodic Tape

Below the left-right periodic tape has a left period α=1 and a right period β=1. The left pattern is 0. The middle pattern is 1. The right pattern is 1.

|   |   |   |   | k |   | k+γ+1 |   |   |   |
|---|---|---|---|---|---|-------|---|---|---|
|...| 0 | 0 | 0 | 0 | 1 | 1     | 1 | 1 |...|

Below the left-right periodic tape has a left period α=3 and right period β=4. The left pattern is 001. The middle pattern is 10. The right pattern is 1001.

|   |   |   |   |   |   | k |   | k+γ+1 |   |   |   |   |   |   |
|---|---|---|---|---|---|---|---|-------|---|---|---|---|---|---|
|...| 0 | 0 | 1 | 0 | 0 | 1 | 1 | 0     | 1 | 0 | 0 | 1 | 1 | 0 | 0 | 1 |...|

Definition 3.15

Tape Head glb λ, lub μ, Window of Execution [λ, μ]

Suppose a Turing machine begins or continues its execution with tape head at tape square k. During the next N computational steps, the greatest lower bound λ of the tape head is the left most (smallest integer) tape square that the tape head visits during these N computational steps; and the least upper bound μ of the tape head is the right most (largest integer) tape square that the tape head visits during these N computational steps. The window of execution denoted as [λ, μ] or [λ, λ+1, . . . , μ−1, μ] is the sequence of integers representing the tape squares that the tape head visited during these N computational steps. The length of the window of execution is μ−λ+1 which is also the number of distinct tape squares visited by the tape head during these N steps. To express the window of execution for the next n computational steps, the lower and upper bounds are expressed as a function of n: [λ(n), μ(n)].

Remark 3.16

If j≤k, then [λ(j), μ(j)]⊆[λ(k), μ(k)]

This follows immediately from the definition of the window of execution.

Since the tape squares may be renumbered without changing the results of the machine execution, for convenience it is often assumed that the machine starts execution at tape square 0. In example 3.6, during the next 8 computational steps—one cycle of the immortal periodic point—the window of execution is [0, 6]. The length of the window of execution is 7.

Observe that if the tape squares are renumbered and the goal is to refer to two different windows of execution, for example [λ(j), μ(j)] and [λ(k), μ(k)], then both windows are renumbered with the same relative offset so that the two windows can be compared.

Definition 3.17

Spanning Middle Pattern of an Immortal Periodic Point

Let p=[q, $\overline{b_j...b_k}$ $a_{L(p)}$ . . . ⟨$a_i$⟩ . . . $a_{U(p)}$ $\overline{c_1...c_m}$] be an immortal periodic point with period C(p). The tape head is currently at tape square i. For each n, satisfying L(p)≤n≤U(p), the current tape contents of tape square n is $a_n$; in other words, T(n)=$a_n$. Suppose [L(p), U(p)] is the window of execution over the next C(p)−1 computational steps. The spanning middle pattern of p is $a_{L(p)}a_{L(p)+1}$ . . . $a_{U(p)-1}$ $a_{U(p)}$. Observe that the length of the spanning middle pattern equals U(p)−L(p)+1.

Remark 3.18

Length of Spanning Middle Pattern of p≤C(p)

Case A. If the tape head moves for the next C(p)−1 computational steps are $L^{C(p)-1}$, only right tape head moves, then before the first computational step, the tape head is at tape square L(p) whose contents are $a_{L(p)}$; after the C(p)−1 computational step the tape head is at tape square U(p) whose contents are $a_{U(p)}$. Thus, C(p)=U(p)−L(p)+1.

Case B. If the tape head moves for the next C(p)−1 computational steps are $L^{C(p)-1}$, only left tape head moves, then before the first computational step, the tape head is at tape square U(p) whose contents are $a_{U(p)}$; after the C(p)−1 computational step the tape head is at tape square L(p). Thus, C(p)=U(p)−L(p)+1.

Case C. Otherwise, during the next C(p)−1 computational steps, there is at least one left tape head move and one right tape head move that cancel each other in terms of the length of the spanning middle pattern. Thus, U(p)−L(p)+1<C(p).

Remark 3.19

Non-Hyperbolic Immortal Period Point p is Bounded by its Minimal Spanning Pattern Thus, p is of the form [q, w $a_{L(p)}$ ... ⟨$a_i$⟩ ... $a_{U(p)}$ v] such that $a_{L(p)}a_{L(p)+1}$ ... $a_{U(p)−1} a_{U(p)}$. is the minimal spanning pattern of p.

w is a variable representing any sequence of symbols from A on the tape to the left of symbol $a_{L(p)}$.

v is a variable representing any sequence of symbols from A on the tape to the right of $a_{U(p)}$.

Remark 3.20

Any hyperbolic periodic point has a Left-Right Periodic Tape. And the left period and the right period of the tape each divide the degree of the hyperbolicity.

Proof.

If it is a right-shift hyperbolic periodic point, then there is a point p and an affine map r with linear part $$\begin{pmatrix} B^m & 0 \\ 0 & \frac{1}{B^m} \end{pmatrix}$$

such that r(p)=p. From the Turing/Affine correspondence theorem, r(p) corresponds to m net moves of the tape head to the right.

The point p corresponds to the following configuration where the tape head is at square k and the machine is also in state q:

|   |   |   |   |   |   | k |   | k+m |   |   |   |   |
|---|---|---|---|---|---|---|---|-----|---|---|---|---|
| ... | $b_m$ | ... | $b_2$ | $b_1$ | $a_0$ | $a_1$ | ... | $a_m$ | $a_1$ |   |   | ... |

The point r(p) corresponds to the following configuration where the tape head is at square k+m and the machine is also in state q:

|   |   |   |   | k+m |   | k+2m |   |   |   |   |
|---|---|---|---|-----|---|------|---|---|---|---|
| ... | $b_m$ | ... | $b_2$ | $b_1$ | $a_0$ | $a_1$ | ... | $a_m$ | $a_1$ | ... | r(p)=p implies that T(k+m)=T(k) for every integer k. If it is a left-shift hyperbolic periodic point, there is a point p and an affine map r with linear part $$\begin{pmatrix} \frac{1}{B^m} & 0 \\ 0 & B^m \end{pmatrix}$$

such that r(p)=p. From the Turing/Affine correspondence theorem, r(p) corresponds to m net moves of the tape head to the left and r(p)=p implies that T(k+m)=T(k) for every integer k.

Remark 3.21

If hyperbolic immortal periodic point p has hyperbolic degree m>0, then the right pattern of p, is a right subpattern of the spanning middle pattern of p.

Remark 3.22

If hyperbolic immortal periodic point p has hyperbolic degree m<0, then the left pattern of p, is a left subpattern of the spanning middle pattern of p.

IMMORTAL CONFIGURATIONS AND ORBITS
SECTION 4

The purpose of this section is to show that every immortal orbit, induced by an immortal Turing configuration, has a subsequence that converges to an immortal periodic point.

Theorem 4.1

An Immortal Orbit has Recurrent Points

Proof.

Let $\epsilon>0$. Let $f_1, f_2, \ldots, f_I$ denote the I affine functions with corresponding unit square domains $W_1, W_2, W_3, W_I$. Let p be an immortal point. Then its orbit $$\{p, f_{S(1)}(p), f_{S(2)}f_{S(1)}(p), \ldots, f_{S(m)}f_{S(m-1)} \ldots f_{S(2)}f_{S(1)}(p), \ldots\} \subseteq \bigcup_{k=1}^{I} W_k.$$

The area of $$\bigcup_{k=1}^{I} W_k$$

equals I. There exists a natural number N such that $$\frac{1}{N} < \frac{\varepsilon}{\sqrt{2}}.$$

Consider the first $I(N^2+1)$ points of this orbit. Then at least $N^2+1$ points of the orbit must lie in at least one of these unit squares $W_k$. This implies that there are two points from the orbit in unit square $W_k$ with the distance between them less than or equal to $\frac{1}{N}$.

Definition 4.2

Cluster Point

Let $\{p_n\}_{n=1}^{\infty}$ be a sequence of points and d a metric. The point q is a cluster point of $\{p_n\}_{n=1}^{\infty}$ if for any $\epsilon>0$ and for any N, there exists $m \geq N$ such that $d(q, p_m)<\epsilon$.

Definition 4.3

Immortal Points

Let $$U(Q, A, \eta) = \left\{ p \in \bigcup_{k=1}^{l} W_k : p \text{ has an immortal orbit with respect to machine } (Q, A, \eta) \right\}$$

U is called the set of immortal points with respect to Turing machine $(Q, A, \eta)$.

Theorem 4.4

Immortal Points are a Closed Set

Suppose $$\lim_{n \to \infty} p_n = p$$

and for each n, $p_n$, lies in $U(Q, A, \eta)$. Then p is an immortal point.

Proof.

Since $$\lim_{n \to \infty} p_n = p$$

a subsequence $q_n$ of $p_n$ may be constructed with the property that $$d(q_n, p) < \frac{1}{B^n}.$$

This means the corresponding tape of p and the corresponding tape of $q_n$ are the same for the first n symbols on the tape in both directions.

$p$

| Tape Contents | ... | $b_{n+1}$ | $b_n$ | ... | $b_1$ | $\underline{a_0}$ | $a_1$ | ... | $a_n$ | $a_{n+1}$ | ... |
|---|---|---|---|---|---|---|---|---|---|---|---|
| State with tape head at $a_0$ | | | | | | $w$ | | | | | |

$q_n$

| Tape Contents | ... | $d_{n+1}$ | $b_n$ | ... | $b_1$ | $\underline{a_0}$ | $a_1$ | ... | $a_n$ | $c_{n+1}$ | ... |
|---|---|---|---|---|---|---|---|---|---|---|---|
| State with tape head at $a_0$ | | | | | | $w$ | | | | | |

By reductio absurdum, suppose p is not an immortal point. Then execution of $(Q, A, \eta)$ on p halts at the Nth execution step for some natural number N. Since each computational step of $(Q, A, \eta)$ moves either one tape square to the left or to the right, this means that execution of $(Q, A, \eta)$ on p must halt on some tape symbol $a_k$ or $b_k$ such that $k \leq N$. Assuming execution begins at tape square 0 or renumbering if necessary: this means that $(Q, A, \eta)$ starting at point p must halt before moving to the right of tape square N or to the left of tape square $-N$. Consider point $q_{N+2}$. By assumption, $q_{N+2}$ is immortal but the first N+2 execution steps of $(Q, A, \eta)$ on $q_{N+2}$ and p must be the same because their tape symbols agree in both directions for at least the first N+2 tape squares. This is a contradiction: p halts on execution step N and $q_{N+2}$ does not halt on step N. Thus, p must be an immortal point.

Lemma 4.5

Every point in an immortal orbit and all cluster points lie in the interior of $$\bigcup_{k=1}^{l} W_k.$$

Each point is a distance at least $$\frac{1}{B-1}$$

from the boundary of every $W_k$.

Proof.

Consider a non-halting Turing machine execution. After every execution step, the state in the machine configuration is not in a halting state, h and the tape's range is in A. Further, recall that $v(h)=0$, $v(a_1)=1$, $v(a_{|A|})=|A|$ and $v(q_{|Q|})=B-1$. If the tape contents of every tape square is $a_1$, this corresponds to x and y coordinates whose fractional parts are $$\frac{\frac{1}{B}}{1-\frac{1}{B}} = \frac{1}{B-1}.$$

If the tape contents of every tape square is $a_{|A|}$, which is the tape symbol with the largest value with respect to v, then this corresponds to x and y coordinates whose fractional parts are $$\frac{\frac{|A|}{B}}{1-\frac{1}{B}} = \frac{|A|}{B-1}.$$

Thus, the point p in the immortal orbit corresponding to each configuration has the property that $$|x(p) - \lfloor x(p) \rfloor| \geq \frac{1}{B-1},$$

$$|y(p) - \lfloor y(p) \rfloor| \geq \frac{1}{B-1}$$

$$|\lceil x(p) \rceil - x(p)| \geq \frac{(B-1)}{B-1} - \frac{|A|}{B-1} = \frac{|Q|}{B-1}$$

and $$|\lceil y(p) \rceil - y(p)| \geq \frac{(B-1)}{B-1} - \frac{|A|}{B-1} = \frac{|Q|}{B-1}.$$

Thus, any cluster point of the immortal orbit must be at least $$\frac{1}{B-1}$$

from the boundary of each $W_k$.

Before the main result is reached, it is helpful to do some elementary counting of finite tape patterns (sequences) based on the finite alphabet A and the finite state set Q regardless of the particular Turing machine program $\eta$.

Example 4.6

The Alphabet A={1, 2, 3}

$s_1 s_2 = 12$ is a particular 2-sequence where $s_1=1$ and $s_2=2$.

| ... | 3 | 3 | 1 | 2 | 3 | 1 | 2 | 1 | 2 | 1 | 2 | 3 | 3 | ... |

The 2-sequence 12 occurs four times on the above tape. The 2-sequence 12 is non-overlapping. The 3-sequence $s_1 s_2 s_3 = 123$ occurs two times on the above tape.

Definition 4.7

Alphabet Sequences

Suppose alphabet $A = \{a_1, a_2, a_3, \ldots, a_n\}$. A k-sequence is a sequence of k symbols denoted as $s_1\ s_2\ s_3 \ldots s_k$ where each $s_j$ lies in A.

Definition 4.8

Overlapping and Disjoint Tape Sequences

Let $T_k$ denote the alphabet symbol on the kth square of the Turing tape. Then $T_k\ T_{k+1} \ldots T_n$, where k is an n−k+1 sequence of alphabet symbols. The two sequences $T_j\ T_{j+1} \ldots T_m$ and $T_k\ T_{k+1} \ldots T_n$ are disjoint if m<k OR n<j. Otherwise, they are called overlapping sequences. Furthermore, overlapping sequences are distinct if j≠k OR m≠n.

Definition 4.9

Identical Tape Sequences

The two tape sequences $T_j\ T_{j+1} \ldots T_m$ and $T_k\ T_{k+1} \ldots T_n$ are identical if they are the same length (i.e. n−k=m−j) and $T_{k+i} = T_{j+i}$ for each i satisfying 1≤i≤n−k.

Definition 4.10

Identical Program Execution up to $B''$

Two Turing machines $M_1(Q_1, A_1, \eta_1)$ and $M_2(Q_2, A_2, \eta_2)$ have identical program execution up to $B''$ if there is an isomorphism $\Psi: M_1 \rightarrow M_2$ such that the following conditions hold:
(1) Both $\phi: Q_1 \rightarrow Q_2$ and $\gamma: A_1 \rightarrow A_2$ are bijective functions.
(2) $\Psi(\eta_1) = \eta_2$ such that $\Psi\eta_1(q, a) = \eta_2(\phi(q), \gamma(a))$
(3) Machine $M_1$ has tape head location j and machine $M_2$ has tape head location k.
(4) $\Psi(T_{j+m}) = \Gamma_{k+m}$ for every m such that −n≤m≤n where T is the tape for $M_1$ and $\Gamma$ is the tape for $M_2$.
(5) $M_1$ program execution is in state r and $M_2$ program execution is in state q.
(6) $\phi(r) = q$.

Observe that the same machine can be identical to itself up to $B''$ at two different steps in its program execution.

Example 4.11

Non-Overlapping 3-Sequences $A = \{0, 1\}$  000 001 010 011 100 101 110 111  $a_1 a_2 a_3$ Thus $a_1 a_2 a_3$ repeats one of the previous 3-sequences. In a sequence of length equal to $|A|^3 + 3$ at least one 3-sequence is repeated.

Example 4.12

Distinct Overlapping 2-Sequences

In any sequence of length $|A|^2+2$, two distinct overlapping 2-sequences are repeated.

$A = \{0, 1\}$ 0000 0001 00101 00100

001101 01000 01001 0101 011000 011001 0111 ...

Duality of 0 and 1 for the remaining eight have corresponding repeats as the first eight.

Remark 4.13

Distinct overlapping n-sequences that are subsequences of any sequence of length $L=|A|^n+n$ implies that at least two subsequences are identical.

Proof.

Let $a_1\ a_2\ a_3\ \ldots\ a_L$ be any alphabet sequence constructed from A. Define the set of n-sequences $S=\{a_{j+1}\ a_{j+2}\ \ldots\ a_{j+n}: 0 \leq j \leq |A|^n\}$. All elements of S are subsequences of $a_1 a_2 a_3 \ldots a$. By the definition of S, there are $|A|^n+1$ distinct overlapping subsequences of $a_1 a_2 a_3 \ldots a_L$ but the maximum number of non-identical n-sequences constructed from A is $|A|^n$. Thus, at least two n-sequences must be identical.

Lemma 4.14

Distinct non-overlapping n-sequences that are subsequences of any sequence of length $L=m|A|^n+n$ implies that at least m+1 subsequences are identical.

Proof.

Define $S=\{a_{j+1}\ a_{j+2}\ \ldots\ a_{j+n}: 0 \leq j \leq m|A|^n\}$. The rest of the proof is similar as for 4.13.

Corollary 4.15

Any Turing tape sequence of length $L=|Q||A|^n+n$ has at least one n-sequence that occurs $|Q|+1$ times. In other words, the tape sequence has $|Q|+1$ distinct, non-overlapping subsequences.

Proof.

This follows immediately from lemma 4.14 and definitions 4.7, 4.8 and 4.9.

Theorem 4.16

If machine $(Q, A, \eta)$ has an immortal configuration, then it has an immortal periodic point.

Proof.

Let $f_1, f_2, \ldots f_I$ denote I affine functions with corresponding unit square domains $W_1, W_2, W_3, \ldots, W_I$ induced by a Turing machine $(Q, A, \eta)$ where base $B=|Q|+|A|1$. Let $p=(x(q, k, T), y(q, k, T))$ for some immortal configuration $(q, k, T)$ with respect to $(Q, A, \eta)$. Then the orbit of p, $[p, f_{S(1)}(p), f_{S(2)}f_{S(1)}(p), \ldots, f_{S(m)}f_{S(m-1)} \ldots f_{S(2)}f_{S(1)}(p), \ldots]$, is an immortal orbit. By theorem 4.4, let z be a cluster point of this immortal orbit. By choosing appropriate elements of the subsequence of the orbit that converges to z, there exists a subsequence from this immortal orbit with the following properties:

A. $\lim_{n \to \infty} z_n = z$

B. For all $n$, $z_n \in \text{interior} \bigcup_{k=1}^{I} W_k$ and $z \in \text{interior} \bigcup_{k=1}^{I} W_k$.

C. $d(z_n, z) < \dfrac{1}{B^n}$

D. $z_{n+1} = r_n(z_n)$ where $r_n$ is the affine function that is the composition of the finite sequence of functions mapping $z_n$ to $z_{n+1}$ in the immortal orbit.

Consider the sequence of squares $[a_n, b_n, c_n, d_n]$ with center $z_n$ and sides with length $$\frac{4}{B^{n-1}}$$

for n>1. See FIG. 1A.

From lemma 4.5, z is in the interior of $W_j$ for some j. Set $\delta = \inf\{d(p, z): p \in \partial W_j\}$. Since z is in the interior, then $\delta > 0$. Thus, there is a natural number N such that $$\frac{4\sqrt{2}}{B^{N-1}} < \frac{\delta}{2}.$$

Thus, for $n \geq N$ this geometrically means that if z is in the square $[a_n, b_n, c_n, d_n]$ then this whole square is a subset of $W_j$. Also, observe that $$d(z_n, z_{n+1}) \leq d(z_n, z) + d(z, z_{n+1}) <$$

$$\frac{1}{B^n} + \frac{1}{B^{n+1}} < \frac{2}{B^n} \leq \frac{2}{B}\frac{1}{B^{n-1}} \leq$$

$$\frac{1}{B^{n-1}} \text{ because } B \geq 2.$$

See FIG. 1B. The previous inequalities imply that $z_{n+1}$ and z are in the interior of square $[a_n, b_n, c_n, d_n]$ since $z_n$ is at the center. Thus, square $[a_n, b_n, c_n, d_n]$ is a subset of $W_j$ for $n \geq N$.

Covering Condition.

If for some $n \geq N$, the linear part of at least one $r_n$ is of the form $$\begin{pmatrix} B^m & 0 \\ 0 & \frac{1}{B^m} \end{pmatrix} \text{ or } \begin{pmatrix} \frac{1}{B^m} & 0 \\ 0 & B^m \end{pmatrix}$$

for some $m \geq 1$, then $r_n([a_n, b_n, c_n, d_n])$ vertically or horizontally covers the square $[a_n, b_n, c_n, d_n]$. For this particular $n \geq N$, this implies that $r_n$ has a fixed point in square $[a_n, b_n, c_n, d_n] \subseteq W$. By theorems 1.13 and 1.14, the vertical and horizontal covering fixed point theorems respectively, $r_n$ has a fixed point which is an immortal periodic point. Otherwise, for some M, for all $n \geq M$, the linear part of $r_n$ is the identity:

$$\begin{pmatrix} 1 & 0 \\ 0 & 1 \end{pmatrix}$$

Set U=maximum {M, N} where N was chosen above such that $$\frac{4\sqrt{2}}{B^{N-1}} < \frac{\delta}{2}. \text{ Set } L = |Q||A|^{(2U+1)} + (2U+1).$$

If there exists n≥L with $r_n(x, y)=(x, y)$, the proof is completed. Otherwise, from 2.26 and 2.29, the program execution is unbounded on the left of the tape or the right of the tape or both. W.L.O.G. it is assumed that program execution is unbounded on the right. (The argument for unbounded on the left is similar.)

Thus, when n≥L, then $z_n$ corresponds to the tape head being located at some position k, the tape contents are fixed at least n symbols in both directions from the tape square k and the machine is in some state $q_1$. In other words, $z_n$ corresponds to

| Tape Location | k − n | ... | k − 3 | k − 2 | k − 1 | k | k + 1 | k + 2 | ... | k + n |
|---|---|---|---|---|---|---|---|---|---|---|
| Tape Contents | $b_n$ | ... | $b_3$ | $b_2$ | $b_1$ | $a_0$ | $a_1$ | $a_2$ | ... | $a_n$ | ... |
| State (Tape head) | | | | | | $q_1$ | | | | |

Since the program execution is unbounded on the right, for the next net L moves to the right on the tape, consider the state q when the tape head is located at tape square k+U+j for each j such that 0≤j≤L. By lemma 4.14, there are |Q|+1 distinct tape (2U+1)-sequences that are identical where the tape head lies at a distinct tape location that is in the middle of this (2U+1)-sequence. Since there are |Q| states, this means there are at least two of these sequences that are identical and are also in the same state. Thus, there is an affine map r from the one identical (2U+1)-sequence (point v) to the other identical (2 U+1)-sequence (point w); in other words, r(v)=w where map r's linear part is hyperbolic $$\begin{pmatrix} B^m & 0 \\ 0 & \frac{1}{B^m} \end{pmatrix}$$

such that m≥1. Let $[a_v, b_v, c_v, d_v]$ be the square with center v and side length equal to $$\frac{4}{B^U}.$$

Thus, $$r(v) = w \text{ and } d(v, w) < \frac{1}{B^U}$$

implies that $r([a_v, b_v, c_v, d_v])$ horizontally covers the square $[a_v, b_v, c_v, d_v]$. By 1.14, r has a fixed point in $[a_v, b_v, c_v, d_v]$ which is an immortal periodic point.

The work in the previous proof yields a sharper result. In particular, if m, n≥L, then $z_m$ and $z_n$ are identical up to $B^L$.

Thus, the execution of the machine for the next net L tape head moves to the right are identical.

Thus, the immortal orbit $[p, f_{S(1)}(p), \ldots, f_{S(m)}f_{S(m-1)} \cdots f_{S(2)}f_{S(1)}(p), \ldots]$ has a subsequence that converges to a periodic point in square $[a_v, b_v, c_v, d_v]$ with center v. Also observe that 2.19, 2.21, and 4.4 imply that this immortal periodic point corresponds to an immortal periodic configuration.

Remark 4.17

By making each of the (2U+1)-sequences in theorem 4.16 at least m tape squares apart the horizontal covering rectangle or vertical covering rectangle can be made thinner than ϵ>0 where the periodic point lies inside the covering rectangle.

IMMORTAL CYCLES SECTION 5

Lemma 5.1

Left Affine Function Vertically Covers or No Intersection

Let $f_k: W_k \to P$ where 1≤k≤I denote I affine maps derived from some Turing machine (Q, A, η) as described in section 2 with base B=|Q|+|A|+1 where A={#, $a_2$, ..., $a_J$}. Here $a_1$=#. Suppose $f_j$ is a left affine function. Then for each k such that 1≤k≤I, then $f_j(W_j)$ vertically covers $W_k$ or $f_j(W_j) \cap W_k = \emptyset$.
Proof.

If $f_j(W_j) \cap W_k = \emptyset$, then the proof is completed. Otherwise, $f_j(W_j) \cap W_k \neq \emptyset$, Let (t, u) denote the lower left corner of $W_j$. The point (t, u) does not correspond to any configuration that can occur because h is a halt state and is not an alphabet symbol but aids in the understanding of the geometry of the configurations:

| Imaginary Tape Contents | ... | h | h | h | b | $\underline{c}$ | d | h | h | ... |
|---|---|---|---|---|---|---|---|---|---|---|
| State is under the tape head | | | | | | q | | | | | where b, c, and d lie in A and t=B v(c)+v(d) and u=B v(q)+v(b).

The point $$p = \left(t + \frac{1}{B-1}, u + \frac{1}{B-1}\right)$$

corresponds to the machine configuration:

| Tape Contents | ... | # | # | # | b | $\underline{c}$ | d | # | # | ... |
|---|---|---|---|---|---|---|---|---|---|---|
| State is under the tape head | | | | | | q | | | | | where $$x(p) = Bv(c) + v(d) + \frac{1}{B-1} \text{ and } y(p) = Bv(q) + v(b) + \frac{1}{B-1}$$

such that every tape square that is two or more tape squares to the right of the tape head contains symbol # and every tape square that is two or more tape squares to the left of the tape head contains symbol #. Observe that from 2.11, the geometric series $$\sum_{j=1}^{\infty} v(\#) B^{-j} = \frac{1}{B-1}.$$

The point $$z = \left(t + \frac{|A|}{B-1}, u + \frac{|A|}{B-1}\right)$$

corresponds to the machine configuration:

| Tape Contents | ... | $a_J$ | $a_J$ | $a_J$ | b | $\underline{c}$ | d | $a_J$ | $a_J$ | ... |
|---|---|---|---|---|---|---|---|---|---|---|
| State is under the tape head | | | | | | q | | | | | where $$x(p) = Bv(c) + v(d) + \frac{|A|}{B-1} \text{ and } y(p) = Bv(q) + v(b) + \frac{|A|}{B-1}$$

such that every tape square that is two or more tape squares to the right of the tape head contains symbol $a_j$ and every tape square that is two or more tape squares to the left of the tape head contains symbol $a_j$. Observe that the fractional part is computed as $$\frac{\frac{|A|}{B}}{1 - \frac{1}{B}} = \frac{|A|}{B-1}$$

because $v(a_J)=|A|$. See FIG. 5A.

The point $f_j(p)$ corresponds to the machine configuration:

| Tape Contents | ... | # | # | # | $\underline{b}$ | $\alpha$ | d | # | # | ... |
|---|---|---|---|---|---|---|---|---|---|---|
| State (Tape head) | | | | | q | | | | | |

$$x(f_j(p)) = Bv(b) + v(\alpha) + \frac{v(d)}{B} + \frac{1}{B(B-1)}$$

and $$y(f_j(p)) = Bv(q) + v(\#) + \frac{1}{B-1}.$$

The point $f_j(z)$ corresponds to the machine configuration:

| Tape Contents | ... | $a_J$ | $a_J$ | $a_J$ | $\underline{b}$ | $\alpha$ | d | $a_J$ | $a_J$ | ... |
|---|---|---|---|---|---|---|---|---|---|---|
| State (Tape head) | | | | | q | | | | | |

$$x(f_j(z)) = Bv(b) + v(\alpha) + \frac{v(d)}{B} + \frac{|A|}{B(B-1)} \text{ and}$$

$$y(f_j(z)) = Bv(q) + v(a_J) + \frac{|A|}{B-1}$$

such that every tape square that is three or more tape squares to the right of the tape head contains the symbol $a_J$ and every tape square that is one or more tape squares to the left of the tape head contains the symbol $a_J$.

Remarks I, II, III and IV—verify the geometry shown in FIG. 5B which completes the proof that $f_j(W_j)$ vertically covers $W_k$.

From the geometry of FIG. 5B, Remarks I and II verify that the x-coordinates of the two vertical sides of the rectangle $f_j(W_j)$ lie between the x-coordinates of $W_k$. And Remarks III and IV verify that the y-coordinates of the two horizontal sides of $W_k$ lie between the y-coordinates of rectangle $f_1(W_j)$.

Remark I:

$$\frac{v(d)}{B} + \frac{1}{B(B-1)} \geq \frac{1}{B-1}$$

Since $v(d) \geq 1$, then $(B-1) v(d) \geq (B-1)$. Thus, $B v(d) - v(d) + 1 \geq B$.

Thus, $$\frac{(B-1)v(d)+1}{B(B-1)} \geq \frac{B}{B(B-1)}.$$

Simplifying both sides completes Remark I.

Remark II:

$$\frac{v(d)}{B} + \frac{|A|}{B(B-1)} \leq \frac{|A|}{B-1}$$

$0 \leq (B-1)(|A|-v(d))$ implies that $(B-1) v(d)+|A| \leq |A| B$

Thus, $$\frac{(B-1)v(d)+|A|}{B(B-1)} \leq \frac{|A|}{B(B-1)}.$$

Simplifying both sides completes Remark II.

Remark III:

$$y(f_j(p)) \leq n_k + \frac{1}{B-1}$$

(The lower horizontal side of $f_j(W_j)$ is below the lower horizontal side of $W_k$.)

If $$y(f_j(p)) > n_k + \frac{1}{B-1},$$

then since the fractional part of $$y(f_j(p)) \text{ is } \frac{1}{B-1}$$

this implies that B v(q)+v(#)>$n_k$. Thus, B v(q)+v(#)−$n_k$≥1 because B v(q)+v(#) is a positive integer. This implies the lower horizontal side of $f_j(W_j)$ is above $W_k$ which contradicts that $f_j(W_j) \cap W_k \neq \emptyset$ Remark IV:

$$y(f_j(z)) \geq n_k + \frac{|A|}{B-1}$$

(The upper horizontal side of $f_j(W_j)$ is above the upper horizontal side of $W_k$.)

If $$y(f_j(z)) < n_k + \frac{|A|}{B-1},$$

then since the fractional part of $y(f_j(z))$ is $$\frac{|A|}{B-1}$$

this implies that B v(q)+v($a_J$)<$n_k$. Thus, $n_k$−(Bv(q)+v($a_J$))≥1 because Bv(q)+v($a_J$) is a positive integer. This implies the upper horizontal side of $f_j(W_j)$ is below $W_k$ which contradicts that $f_j(W_j) \cap W_k \neq \emptyset$.

Lemma 5.2

Right Affine Function Horizontally Covers or No Intersection
Proof.
It is similar to 5.1.

Definition 5.3

Covering Paths, Cycles and Prime Covering Cycles

Let $f_k$: $W_k \to P$ where 1≤k≤I denote I affine maps derived by a Turing machine (Q, A, η). Suppose S: {1, 2, ... m}→{1, 2, ... I} where m is a positive integer. Then the finite sequence [S(1), S(2), S(3), ..., S(m)] is a covering path of length m−1 if the following hold:

Define $\phi(S(1)) = f_{S(1)}(W_{S(1)})$
For each k with 2≤k≤m, define $\phi(S(k)) = f_{S(k)}(\phi(S(k-1)) \cap W_{S(k)})$
For each k satisfying 1≤k≤m, then $\phi(S(k)) \cap W_{S(k+1)} \neq \emptyset$ The covering path [S(1), S(2), S(3), ..., S(m)] is a covering cycle of length m if $\phi(S(m)) \cap W_{S(1)} \neq \emptyset$. If S(j)=S(k) and k≤m and 1≤k−j≤m then [S(j), S(j+1), ..., S(k−1)] is called a subcycle of [S(1), S(2), S(3), ..., S(m)]. A cycle is prime if it has no subcycles.

Remark 5.4

Orbit of Immortal Periodic Point Induces a Covering Cycle

Suppose p is an immortal periodic point. Suppose m is the fundamental period of p. Then there is a sequence S: {1, 2, ..., m}→{1, 2, ..., I} such that $f_{S(m)}f_{S(m-1)}\cdots f_{S(1)}(p)=p$; p lies in $W_{S(1)}$; $f_{S(k)}f_{S(k-1)}\cdots f_{S(1)}(p)$ lies in $W_{S(k+1)}$ for each k satisfying 1≤k≤m; and $f_{S(m)}f_{S(m-1)}\cdots f_{S(1)}(p)$ lies in $W_{S(1)}$. These previous conditions from the immortal periodic point imply that for k with 1≤k≤m, then $f_{S(k)}f_{S(k-1)}\cdots f_{S(1)}(p)$ lies in $\phi(S(k)) \cap W_{S(k+1)}$ and $f_{S(m)}f_{S(m-1)}\cdots f_{S(1)}(p)$ lies in $\phi(S(m)) \cap W_{S(1)}$. Thus, all cycle covering conditions in 5.3 hold.

Definition 5.5

Covering Cycle Induced by an Immortal Periodic Point

The sequence [S(1), S(2), S(3), ..., S(m)] generated in 5.4 is called the covering cycle induced by immortal periodic point p.

Definition 5.6

Hyperbolic Covering Cycle

[S(1), S(2), S(3), ..., S(m)] is called a hyperbolic covering cycle if the composition of the affine maps indexed by [S(1), S(2), S(3), ..., S(m)], namely, $f_{S(m)}f_{S(m-1)}\cdots f_{S(1)}$, has a linear part of the form $$\begin{pmatrix} B^k & 0 \\ 0 & \frac{1}{B^k} \end{pmatrix}$$

for some integer k≠0. It is called a non-hyperbolic covering cycle if the linear part equals $$\begin{pmatrix} 1 & 0 \\ 0 & 1 \end{pmatrix}.$$

A non-hyperbolic cycle is called an identity cycle if the translational part of $f_{S(m)}f_{S(m-1)}\cdots f_{S(1)}$ is zero.

Remark 5.7

Composition of Non-Hyperbolic Cycles is Closed

Suppose the covering cycle [S(1), S(2), S(3), ..., S(m)] is the composition of only non-hyperbolic prime cycles. Then [S(1), S(2), S(3), ..., S(m)] is non-hyperbolic.
Proof.
This follows immediately from the fact that if $r_1(x, y)=(x+m_1, y+n_1)$ and $r_2(x, y)=(x+m_2, y+n_2)$ then the linear part of $r_2r_1$ equals the identity matrix.

Notation 5.8

Permutations Correspond to Prime Covering Cycles

The fixed permutation (1) corresponds to covering cycle [1].

Permutation (1 2) corresponds to covering cycle [1, 2]
Permutation (S(1) S(2) ... S(m)] corresponds to covering cycle [S(1), S(2), ..., S(m)]

Lemma 5.9

Any Hyperbolic Cycle Contains at Least One Hyperbolic, Prime Cycle

Proof.
Let σ be a hyperbolic cycle. If it is prime, then the proof is completed. Otherwise, σ is a composition of prime cycles. From remark 5.7 at least one of these prime cycles must be hyperbolic.

Lemma 5.10

Any Immortal Periodic Point Lies in a Hyperbolic Cycle or Identity Cycle

Proof.
Let $[f_{S(1)}, f_{S(2)}, \ldots, f_{S(m)}]$ be the potential hyperbolic cycle or identity cycle induced by the immortal periodic point p. Then $f_{S(m)} \cdots f_{S(2)} f_{S(1)}(p) = p$. Then $f_{S(k)} \cdots f_{S(2)} f_{S(1)}(p)$ lies in $W_{S(k+1)}$ for each k because p is immortal. This means that for each k, $f_{S(k)} \cdots f_{S(2)} f_{S(1)}(p)$ lies in $\phi(S(k)) \cap W_{S(k+1)}$. Thus, $[f_{S(1)}, f_{S(2)}, \ldots, f_{S(m)}]$ is a covering cycle. If $f_{S(m)} \cdots f_{S(2)} f_{S(1)}$ is non-hyperbolic, then since $f_{S(m)} \cdots f_{S(2)} f_{S(1)}(p) = p$ the translational part of $f_{S(m)} \cdots f_{S(2)} f_{S(1)}$ must be zero. Otherwise, $f_{S(m)} \cdots f_{S(2)} f_{S(1)}$ is hyperbolic.

5.11 Fundamental Immortality

For any Turing Machine (Q, A, η), if p=(x(q, k, T), y(q, k, T)) for some configuration (q, k, T) has an immortal orbit with respect to the corresponding affine maps $f_k: W_k \to P$ where $1 \leq k \leq I$, derived from (Q, A, η), then for each immortal periodic point, there exists an identity cycle or a hyperbolic cycle containing it.
Proof.
By 4.16 the existence of an immortal orbit implies that immortal periodic orbit(s) exist. By lemma 5.10, every immortal periodic point lies in a hyperbolic cycle or identity cycle. If a particular immortal periodic point lies in a hyperbolic cycle, then by lemma 5.9, the hyperbolic cycle contains a prime, hyperbolic cycle that contains this immortal periodic point.

PERIODIC POINT PROPERTIES SECTION 6

Lemma 6.1

All Right Head Moves or all Left Tape Head Moves

If Turing Machine (Q, A, η) can execute |Q| consecutive computational steps which are all right tape head moves or all left tape head moves without halting, then the machine has an immortal periodic point with period ≤|Q|.
Proof.
Consecutive Right Tape Head Moves.
Suppose there are |Q| consecutive computational steps which are all right tape head moves. Thus, there is a sequence of |Q| commands $\eta(q_k, a_k) = (q_{k+1}, b_k, R)$ satisfying $1 \leq k \leq |Q|$ that execute these |Q| computational steps without halting. In the table below, the subscript k in each state $q_k$ indicates the state of the machine just before the kth computational step.

| STATE | | k | | | | k + |Q| − 1 | k + |Q| |
|---|---|---|---|---|---|---|---|
| $q_1$ | | $a_1$ | $a_2$ | ... | $a_k$ | ... | $a_{|Q|}$ | |
| $q_2$ | | $b_1$ | $a_2$ | ... | $a_k$ | ... | $a_{|Q|}$ | |
| ... | | | | | | | | |
| $q_k$ | | $b_1$ | $b_2$ | ... | $a_k$ | ... | $a_{|Q|}$ | |
| ... | | | | | | | | |
| $q_{|Q|}$ | | $b_1$ | $b_2$ | ... | $b_k$ | ... | $\underline{a}_{|Q|}$ | |
| $q_{|Q|+1}$ | | $b_1$ | $b_2$ | ... | $b_k$ | ... | $b_{|Q|}$ | $\underline{a}_{|Q|+1}$ |

The Dirichlet Box principle applied to the |Q|+1 states $\{q_1, q_2, \ldots q_{|Q|}, q_{|Q|+1}\}$ implies that two of the states are equal; namely, $q_j = q_k$ for some j<k. Thus, the point $$p = [q_j, \overline{b_j b_{j+1} \ldots b_{k-1}} \langle a_j \rangle a_{j+1} \ldots a_{k-1}]$$

is an immortal periodic point with period k−j and (k−j)≤|Q|.
Consecutive Left Tape Head Moves.
Suppose there are |Q| consecutive computational steps which are all left tape head moves. Thus, there is a sequence of |Q| commands $\eta(q_k, a_k) = (q_{k+1}, b_k, L)$ satisfying $1 \leq k \leq |Q|$ that execute these |Q| computational steps without halting. In the table below, the subscript k in each state $q_k$ indicates the state of the machine just before the kth computational step.

| STATE | k − |Q| | k − |Q| + 1 | | | | k |
|---|---|---|---|---|---|---|
| $q_1$ | | $a_{|Q|}$ | ... | $a_k$ | ... | $a_2$ | $\underline{a}_1$ |
| $q_2$ | | $a_{|Q|}$ | ... | $a_k$ | ... | $\underline{a}_2$ | $b_1$ |
| ... | | | | | | | |
| $q_k$ | | $a_{|Q|}$ | ... | $\underline{a}_k$ | ... | $b_2$ | $b_1$ |
| ... | | | | | | | |
| $q_{|Q|}$ | | $\underline{a}_{|Q|}$ | ... | $b_k$ | ... | $b_2$ | $b_1$ |
| $q_{|Q|+1}$ | $\underline{a}_{|Q|+1}$ | $b_{|Q|}$ | ... | $b_k$ | ... | $b_2$ | $b_1$ |

The Dirichlet Box principle applied to the |Q|+1 states $\{q_1, q_2, \ldots q_{|Q|}, q_{|Q|+1}\}$ implies that two of the states are equal; namely, $q_j = q_k$ for some j<k. Thus, the point $$p = [q_j, \overline{a_{k-1} \ldots \langle a_j \rangle b_{k-1} \ldots b_j}]$$

is an immortal periodic point with period k−j and (k −j)≤|Q|.

Remark 6.2

Consider Turing Machine (Q, A, η). If for some q in Q, and for some a, b in A, η(q, a)=(q, b, R) or η(q, a)=(q, b, L), then (Q, A, η) has an immortal fixed point.
Proof.
If η(q, a)=(q, b, R), then p=[q, $\overline{b}\langle a\rangle \overline{a}$] is an immortal fixed point of (Q, A, η). If η(q, a)=(q, b, L), then p=[q, $\overline{a}\langle a\rangle \overline{b}$] is an immortal fixed point of (Q, A, η).

Definition 6.3

Minimal Period

If (Q, A, η) has no immortal orbits, then it is called a halting machine. Otherwise, the minimum {C(p): p is an immortal periodic point of $(Q, A, \eta)\}$ is well-defined because it is the minimum of a non-empty subset of the natural numbers. This minimum is called the minimal period of $(Q, A, \eta)$.

Theorem 6.4

Two State Minimal Period Theorem

If $Q=\{q, r\}$ has only two non-halting states and $A=\{0, 1\}$, then $(Q, A, \eta)$ is a halting machine or its minimal period is 1, 2 or 4.

Proof.

If $(Q, A, \eta)$ is a halting machine, then the proof is completed. Otherwise, suppose $(Q, A, \eta)$ has an immortal periodic point with period $\geq 5$. Then it is shown that this implies the machine must have an immortal periodic point with period $\leq 4$.

Consider the first 5 computational steps of the immortal periodic point p. If two consecutive steps stay in the same state, then by remark 6.2, then $(Q, A, \eta)$ has an immortal periodic point with period 1. Done. Furthermore, if there are two consecutive right tape head moves or left tape head moves, during these five computational steps, then by lemma 6.1, there is an immortal periodic point with period $\leq 2$.

Thus, W.L.O.G. (due to symmetry), for the remaining cases the first five computational steps look like—where the variables $x_1, x_2, x_3, x_4, y_i, y_2, y_3$ represent elements of A:

| STATE | | | MOVE | STEP |
|---|---|---|---|---|
| $q$ | $x_1$ | $y_1$ | | |
| $r$ | $x_2$ | $\underline{y_1}$ | R | 1 |
| $q$ | $x_2$ | $y_2$ | L | 2 |
| $r$ | $x_3$ | $\underline{y_2}$ | R | 3 |
| $q$ | $x_3$ | $y_3$ | L | 4 |
| $r$ | $x_4$ | $\underline{y_3}$ | R | 5 |

Observation 1.

$x_1=x_2$ implies $x_1=x_2=x_3$ because computational steps 1 and 3 are $\eta(q, x_1)=(r, x_2, R)$ and $\eta(q, x_2)=(r, x_3, R)$.

Observation 2.

$y_1=y_2$ implies that $y_i=y_2=y_3$ because computational steps 2 and 4 are $\eta(r, y_1)=(q, y_2, L)$ and $\eta(r, y_2)=(q, y_3, L)$.

Observation 3.

Since A has 2 elements, $[x_1=x_2$ or $x_1=x_3$ or $x_2=x_3]$ and $[y_1=y_2$ or $y_1=y_3$ or $y_2=y_3]$.

Case 1: $x_2=x_3$ and $y_2=y_3$. Based on steps 3 and 4, point $p=[q, \overline{0}\langle x_2\rangle y_2\overline{0}]$ is an immortal periodic point with period 2.

Many of the nine cases below are reduced to previous cases.

Case 2: $x_1=x_2$ and $y_2=y_3$. The first observation reduces case 2 to case 1.

Case 3: $x_1=x_3$ and $y_2=y_3$. By replacing all occurrences of $x_3$ by $x_1$ and all occurrences of $y_3$ by $y_2$, then the previous table becomes:

| STATE | | | MOVE | STEP |
|---|---|---|---|---|
| $q$ | $x_1$ | $y_1$ | | |
| $r$ | $x_2$ | $\underline{y_1}$ | R | 1 |
| $q$ | $x_2$ | $y_2$ | L | 2 |
| $r$ | $x_1$ | $\underline{y_2}$ | R | 3 |
| $q$ | $x_1$ | $y_2$ | L | 4 |
| $r$ | $x_2$ | $\underline{y_2}$ | R | 5 |
| $q$ | $x_2$ | $y_2$ | L | 6 |

After the substitution, from step 4, then $\eta(r, y_2)=(q, y_2, L)$. This implies step 6 in the table. Looking at steps 2 and 6, point $p=[q, \overline{0}\langle x_2\rangle y_2\overline{0}]$ is an immortal periodic point with period 2 or 4.

Case 4: $x_1=x_3$ and $y_1=y_3$. Substituting $x_1$ for $x_3$ and $y_1$ for $y_3$ in step 4 of the original table, then the point $p=[q, \overline{0}\langle x_1\rangle y_1\overline{0}]$ is an immortal periodic point with period 2 or 4.

Case 5: $x_1=x_2$ and $y_1=y_3$. This reduces to case 4 from the first observation.

Case 6: $x_2=x_3$ and $y_1=y_3$. Substituting $x_2$ for $x_3$ and $y_1$ for $y_3$ in the original table and observing that from step 3 that $\eta(q, x_2)=(q, x_2, R)$. This implies that $x_4=x_2$

| STATE | | | MOVE | STEP |
|---|---|---|---|---|
| $q$ | $x_1$ | $y_1$ | | |
| $r$ | $x_2$ | $\underline{y_1}$ | R | 1 |
| $q$ | $x_2$ | $y_2$ | L | 2 |
| $r$ | $x_2$ | $\underline{y_2}$ | R | 3 |
| $q$ | $x_2$ | $y_1$ | L | 4 |
| $r$ | $x_2$ | $\underline{y_1}$ | R | 5 |

Then observe that after step 1 and step 5, the points are identical. Thus, the point $p=[r, \overline{0}x_2\langle y_1\rangle\overline{0}]$ is immortal with period equal to 2 or 4.

Case 7: $x_1=x_2$ and $y_1=y_2$. This reduces to case 2 from the second observation.

Case 8: $x_1=x_3$ and $y_1=y_2$. This reduces to case 4 from the second observation.

Case 9: $x_2=x_3$ and $y_1=y_2$. This reduces to case 6 from the second observation.

Finally, it is shown that any machine having an immortal periodic point with period 3 must have an immortal periodic point with period 1 or 2. Suppose the machine has an immortal period 3 point. During the three computational steps, the claim is that there has to be two consecutive steps that are in the same state. For example, the state sequence q, r, q, r would contradict that it is a period 3 orbit because at step 0 it is in state q and after step 3 it is in state r; similarly, the state sequence r, q, r, q would contradict that is a period 3 orbit. Thus, there must be two consecutive steps that are in the same state, which implies it is an immortal fixed point. Thus, the machine can not have a minimal period of 3.

PATTERNS AND REPEATING STATE CYCLES
SECTION 7

Definition 7.1

Overlap Matching & Intersection Patterns

The notion of an overlap match expresses how a part or all of one pattern may match part or all of another pattern. Let V and W be patterns. (V, s) overlap matches (W, t) if and only if $V(s+c)=W(t+c)$ for each integer c satisfying $\lambda \leq c \leq \mu$ such that $\lambda=\min\{s, t\}$ and $\mu=\min\{|V|-1-s, |W|-1-t\}$ where $0 \leq s \leq |V|$ and $0 \leq t \leq |W|$. The index s is called the head of pattern V and t is called the head of pattern W. If V is also a subpattern, then (V, s) submatches (W, t).

If (V, s) overlap matches (W, t), then define the intersection pattern I with head $u=\lambda$ as $(I, u)=(V, s) \cap (W, t)$, where $I(c)=V(c+s-\lambda)$ for every integer c satisfying $0 \leq c \leq (\mu+\lambda)$ where $\lambda=\min\{s, t\}$ and $\mu=\min\{|V|-1-s, |W|-1-t\}$.

Definition 7.2

Edge Pattern Substitution Operator

Consider pattern $V=v_0 v_1 \ldots v_n$, pattern $W=w_0 w_1 \ldots w_n$ with heads s, t satisfying $0 \leq s, t \leq n$ and pattern $P=p_0 p_1 \ldots p_m$ with head u satisfying $0 \leq u \leq m$. Suppose (P, u) overlap matches (V, s). Then define the edge pattern substitution operator $\oplus$ as $E=(P, u) \oplus [(V, s) \Rightarrow (W, t)]$ according to the four different cases A., B., C. and D.

Case A.)

$u > s$ and $m-u > n-s$

| $p_0$ | ... | ... | $p_{u-s}$ | ... | ... | $\underline{p_u}$ | ... | $p_{u+n-s}$ | $p_m$ |
|---|---|---|---|---|---|---|---|---|---|
| | $v_0$ | $v_1$ | ... | $\underline{v_s}$ | ... | $v_n$ | | | |
| | $w_0$ | $w_1$ | ... | $w_s$ | ... | $w_n$ | | | |

$$E(k) = \begin{cases} W(k+s-u) & \text{when } u \leq k+s \leq u+n \\ P(k) & \text{when } 0 \leq k < u-s \text{ OR } u+n-s < k \leq m \end{cases}$$

where the head of E is u+t−s. Observe that $|E|=m+1$

Case B.)

$u > s$ and $m-u \leq n-s$

| $p_0$ | $p_1$ | ... | ... | $p_{u-s}$ | ... | ... | $\underline{p_u}$ | ... | $p_m$ |
|---|---|---|---|---|---|---|---|---|---|
| | $v_0$ | $v_1$ | ... | $\underline{v_s}$ | ... | $v_{s+m-u}$ | $v_n$ | | |
| | $w_0$ | $w_1$ | ... | $w_s$ | ... | $w_{s+m-u}$ | $w_n$ | | |

$$E(k) = \begin{cases} W(k+s-u) & \text{when } u-s \leq k \leq n+s-u \\ P(k) & \text{when } 0 \leq k < u-s \end{cases}$$

where the head of E is u+t−s. Also, $|E|=n+s-u+1$

Case C.)

$u \leq s$ and $m-u \leq n-s$

| $p_0$ | ... | $\underline{p_u}$ | ... | $p_m$ |
|---|---|---|---|---|
| $v_0$ | ... | $v_{s-u}$ | ... | $\underline{v_s}$ | ... | $v_{s+m-u}$ | ... | $v_n$ |
| $w_0$ | ... | $w_{s-u}$ | ... | $w_s$ | ... | $w_{s+m-u}$ | ... | $w_n$ |

$E(k)=W(k)$ when $0 \leq k \leq n$ and the head of E is t. Also, $|E|=|W|=n+1$.

Case D.)

$u \leq s$ and $m-u > n-s$

| $p_0$ | ... | $\underline{p_u}$ | ... | $p_{u+n-s}$ | ... | $p_m$ |
|---|---|---|---|---|---|---|
| $v_0$ | ... | $v_{s-u}$ | ... | ... | $\underline{v_s}$ | ... | $v_n$ |
| $w_0$ | ... | $w_{s-u}$ | ... | ... | $w_s$ | ... | $w_n$ |

$$E(k) = \begin{cases} P(k+u-s) & \text{when } n < k \leq m+s-u \\ W(k) & \text{when } 0 \leq k \leq n \end{cases}$$

where the head of E is t. Also, $|E|=m+s-u+1$

Overlap and intersection matching and edge pattern substitution are useful in sections 7, 8 and 10.

Example 7.3

Overlap Matching and Edge Substitution

Set pattern P=0101 110. Set pattern V=11 $\underline{0}$101. Set pattern W=01 001$\underline{0}$. Then (P, 0) overlap matches (V, 2). Edge pattern substitution is well-defined so E=(P, 0)$\oplus$[(V, 2)$\Rightarrow$(W, 4)]=01 001$\underline{0}$ 110. The head or index of pattern E=4.

Also, (P, 4) overlap matches (V, 0). F=(P, 4)$\oplus$[(V, 0)$\Rightarrow$(W, 4)]=0101 0100$\underline{1}$0. The index of pattern F=u+t−s=4+4−0=8.

Definition 7.4

State Cycle

Consider N execution steps of Turing Machine (Q, A, η). After each execution step, the machine is in some state $q_k$ and the tape head is pointing to some alphabet symbol $a_k$. Relabeling the indices of the states and the alphabet symbols if necessary and assuming the machine has not halted after N execution steps in terms of the input commands is denoted as: $(q_0, a_0) \mapsto (q_1, a_1) \mapsto \ldots \mapsto (q_{N-1}, a_{N-1}) \mapsto (q_N, a_N)$. A state cycle is a valid execution sequence of input commands such that the first and last input command in the sequence have the same state i.e. $(q_k, a_k) \mapsto (q_{k+1}, a_{k+1}) \mapsto \ldots \mapsto (q_{N-1}, a_{N-1}) \mapsto (q_k, a_k)$. The length of this state cycle equals the number of input commands minus one. A state cycle is called a prime state cycle if it contains no proper state subcycles. For a prime state cycle, the length of the cycle equals the number of distinct states in the sequence. For example, $(2, 0) \mapsto (3, 1) \mapsto (4, 0) \mapsto (2, 1)$ is called a prime 3-state cycle because it has length 3 and also 3 distinct states $\{2, 3, 4\}$.

Remark 7.5

Any prime state cycle has length $\leq |Q|$

This follows from the Dirichlet principle and the definition of a prime state cycle.

Remark 7.6

Maximum Number of Distinct Prime State Cycles

Given an alphabet A and states Q, consider an arbitrary prime state cycle with length 1, $(q, a) \mapsto (q, b)$. There are $|Q||A|$ choices for the first input command and choices for the second input command since the states must match. Thus, there are $|Q|$ distinct prime state cycles with length 1.

Similarly, consider a prime state cycle with window of execution whose length is 2, this can be represented as $(q_1, a_1) \mapsto (q_2, a_2) \mapsto (q_1, b_1)$. For the tape head move sequence RL, the tape square diagram looks like FIG. 6.

Then there are $|Q||A|$ choices for $(q_1, a_1)$ and once $(q_1, a_1)$ is chosen there is only one choice for $q_2$ because it is completely determined by $\eta(q_1, a_1) = (q_2, b_1)$ where $\eta$ is the program in $(Q, A, \eta)$. Similarly, there is only one choice for $b_1$. There are $|A|$ choices for $a_2$. Thus, there are $|Q||A|^2$ distinct choices.

For an arbitrary prime state cycle $(q_1, a_1) \mapsto \ldots \mapsto (q_2, a_2) \mapsto (q_1, a_{n+1})$ with window of execution of length k then there are $|Q|$ choices for $(q_1, a_1)$ and $|A|$ choices for $a_2$ since the current window of execution length after the first step increases by 1. There is only one choice for $q_2$ because it is determined by $\eta(q_1, a_1)$. Similarly, for the jth computational step, if the current window of execution length increases by 1, then there are $|A|$ choices for $(q_{j+1}, a_{j+1})$. Similarly, for the jth computational step, if the current window of execution stays unchanged, then there is only one choice for $a_{j+1}$ that was determined by one of the previous j computational steps. Thus, there are at most $|Q||A|^k$ distinct prime state cycles whose window of execution length equals k. Definitions 3.15 and remark 3.16 imply that a prime k-state cycle has a window of execution length less than or equal to k. Thus, from the previous and 7.5, there are at most $$|Q| \sum_{k=1}^{|Q|} |A|^k$$

distinct prime state cycles in $(Q, A, \eta)$.

Remark 7.7

Any State Cycle Contains a Prime State Cycle

Proof.

Relabeling if necessary let $S(q_1, q_1) = (q_1, a_1) \mapsto \ldots \mapsto (q_n, a_n) \mapsto (q_1, a_{n+1})$ be a state cycle. If $q_1$ is the only state visited twice, then the proof is completed. Otherwise, define $\mu = \min\{|S(q_k, q_k)|: S(q_k, q_k) \text{ is a subcycle of } S(q_1, q_1)\}$. Then $\mu$ exists because $S(q_1, q_1)$ is a subcycle of $S(q_1, q_1)$. Claim: Any state cycle $S(q_j, q_j)$ with $|S(q_j, q_j)| = \mu$ must be a prime state cycle. Suppose not. Then there is a state $r \neq q_j$ that is visited twice in the state cycle $S(q_j, q_j)$. But then $S(q_r, q_r)$ is a cycle with length less than $\mu$ which contradicts $\mu$'s definition.

Definition 7.8

Consecutive Repeating State Cycle for $(Q, A, \eta)$

If machine $(Q, A, \eta)$ starts execution and repeats a state cycle two consecutive times i.e. $(q_1, b_1) \mapsto \ldots \mapsto (q_n, b_n) \mapsto (q_1, b_1) \mapsto \ldots \mapsto (q_n, b_n) \mapsto (q_1, b_1)$, then $(Q, A, \eta)$ has a consecutive repeating state cycle.

Definition 7.9

Execution Node for $(Q, A, \eta)$

An execution node (or node) is a triplet $\Pi = [q, w_0 w_1 \ldots w_n, t]$ for some state q in Q where $w_0 w_1 \ldots w_n$ is a pattern of n+1 alphabet symbols each in A such that t is a non-negative integer satisfying $0 \leq t \leq n$. Intuitively, $w_0 w_1 \ldots w_n$ is the pattern of alphabet symbols on n+1 consecutive tape squares on the tape and t represents the location of the tape head.

Lemma 7.10

Every Immortal Periodic Point Induces a Consecutive Repeating State Cycle

Proof.

Suppose p is an immortal periodic point with period n. Then by the Turing-Affine correspondence theorem the kth iterate of p is $f_{S(k)} f_{S(k-1)} \ldots f_{S(1)}(p)$ and the application of affine function $f_{S(k)}$ corresponds to the execution of input command $(q_k, b_k)$. Thus; let the input command sequence $(q_1, b_1) \mapsto \ldots \mapsto (q_n, b_n) \mapsto (q_{n+1}, b_{n+1})$ denote the first n input commands that are executed. Since p has period n, $f_{S(n)} \ldots f_{S(k)} \ldots f_{S(1)}(p) = p$. Thus, $(q_1, b_1) = (q_{n+1}, b_{n+1})$. Thus, the first n steps are a state cycle $(q_1, b_1) \mapsto \ldots \mapsto (q_n, b_n) \mapsto (q_1, b_1)$. Since the n+1 computational step corresponds to applying $f_{S(1)}$ to p which corresponds to input command $(q_1, b_1)$. By induction, the n+k computational step corresponds to applying function $f_{S(k)}$ to the point $f_{S(k-1)} \ldots f_{S(1)}(p)$ which by the previous paragraph corresponds to the execution of the input command $(q_k, b_k)$. Thus, the sequence of input commands is $(q_1, b_1) \mapsto \ldots \mapsto (q_n, b_n) \mapsto (q_1, b_1) \mapsto \ldots \mapsto (q_n, b_n) \mapsto (q_1, b_1)$.

Lemma 7.11

Every Consecutive Repeating State Cycle Induces an Immortal Periodic Orbit

Suppose Turing machine $(Q, A, \eta)$ begins or resumes execution at some tape square and repeats a state cycle two consecutive times. Then $(Q, A, \eta)$ has an immortal periodic point and this state cycle induces the immortal periodic point.

Proof.

Let the state cycle that is repeated two consecutive times be denoted as $(q_1, b_1) \mapsto \ldots \mapsto (q_n, b_n) \mapsto (q_1, b_1) \mapsto \ldots \mapsto (q_n, b_n) \mapsto (q_1, b_1)$. Let $s_k$ denote the tape square right before input command $(q_k, b_k)$ is executed the first time where $1 \leq k \leq n$. Let $t_k$ denote the tape square right before input command $(q_k, b_k)$ is executed the second time where $1 \leq k \leq n$.

Thus, the window of execution for the first repetition of the state cycle, right before input command $(q_1, b_1)$ is executed a second time, denoted $I_n = \{s_1, s_2, \ldots, s_k, s_{k+1} \ldots s_n, s_{n+1}\}$ where $s_{n+1} = t_1$. The window of execution for the second repetition of the state cycle is $J_n = \{t_1, t_2, \ldots, t_n, t_{n+1}\}$ where $t_{n+1} = t_n - s_n$.

Furthermore, observe that the window of execution for the computational steps 1 thru k is $I_k = \{s_1, s_2, \ldots, s_k, s_{k+1}\}$ where the tape square $s_{k+1}$ is indicated after input command $(q_k, b_k)$ is executed the first time. Also, observe that the window of execution for the computational steps n+1 thru n+k is $J_k=\{t_1, t_2, \ldots, t_k, t_{k+1}\}$ where the tape square $t_{k+1}$ is indicated after the input command $(q_k, b_k)$ is executed the second time (in the second repeating cycle).

Next a useful notation represents the tape patterns for each computational step. Then the proof is completed using induction.

Let $V_1$ denote the tape pattern—which is the sequence of alphabet symbols in the tape squares over the window of execution $I_n$—right before input command $(q_1, b_1)$ is executed the first time. Thus, $V_1(s_1)=b_1$. Let $V_k$ denote the tape pattern—which is the sequence of alphabet symbols in the tape squares over the window of execution $I_n$—right before input command $(q_k, b_k)$ is executed the first time. Thus, $V_k(s_k)=b_k$.

Let $W_1$ denote the tape pattern—which is the sequence of alphabet symbols in the tape squares over the window of execution $J_n$—right before input command $(q_1, b_1)$ is executed the second time. Thus, $W_1(t_1)=b_1$. Let $W_k$ denote the tape pattern—which is the sequence of alphabet symbols in the tape squares over the window of execution $J_n$—right before input command $(q_k, b_k)$ is executed the second time. Thus, $W_k(t_k)=b_k$.

Using induction, it is shown that $V_1$ on window of execution $I_n$ equals $W_1$ on window of execution $J_n$. This completes the proof.

Since $(q_1, b_1)$ is the input command before computational step 1 and $(q_1, b_1)$ is the input command before computational step n+1, then $V_1(s_1)=b_1=W_1(t_1)$. Thus, $V_1$ restricted to window of execution $I_1$ equals $W_1$ restricted to window of execution $J_1$.

From the definition, $\eta(q_1, b_1)=\eta(q_2, a_1, x)$ for some $a_1$ in A and where x equals L or R. Note that L represents a left tape head move and R a right tape head move.

Case x=R. a Right Tape Head Move.

|   | $s_1$ | $s_2$ |   |
|---|---|---|---|
| $V_1$ | $\underline{b_1}$ | $b_2$ |   |
| $V_2$ | $a_1$ | $\underline{b_2}$ |   |

|   | $t_1$ | $t_2$ |   |
|---|---|---|---|
| $W_1$ | $\underline{b_1}$ | $b_2$ |   |
| $W_2$ | $a_1$ | $\underline{b_2}$ |   |

Then $s_2=s_1+1$, $t_2=t_1+1$ and $V_1(s_2)=b_2=W_1(t_2)$. It has already been observed that $V_1(s_1)=b_1=W_1(t_1)$. Thus, $V_1$ restricted to the window of execution $J_2$ equals $W_1$ restricted on the window of execution $J_2$. Furthermore, the tape head is at $s_1$ right before computational step 1 and input command $(q_1, b_1)$ is executed; the tape head is at $t_1$ right before computational step n+1 and input command $(q_1, b_1)$ is executed.

Also, $V_2(s_1)=a_1=W_2(t_1)$ and $V_2(s_2)=b_2=W_2(t_2)$. Thus, $V_2$ restricted to the window of execution $I_2$ equals $W_2$ restricted to the window of execution $J_2$ Furthermore, the tape head is at $s_2$ right before computational step 2 with input command $(q_2, b_2)$ is executed; the tape head is at $t_2$ right before computational step n+2 with input command $(q_2, b_2)$ is executed.

Case x=L. a Left Tape Head Move.

|   | $s_2$ | $s_1$ |   |
|---|---|---|---|
| $V_1$ | $b_2$ | $\underline{b_1}$ |   |
| $V_2$ | $\underline{b_2}$ | $a_1$ |   |

|   | $t_2$ | $t_1$ |   |
|---|---|---|---|
| $W_1$ | $b_2$ | $\underline{b_1}$ |   |
| $W_2$ | $\underline{b_2}$ | $a_1$ |   |

Then $s_2=s_1-1$, $t_2=t_1-1$ and $V_1(s_2)=b_2=W_1(t_2)$. And $V_1(s_1)=b_1=W_1(t_1)$. Thus, $V_1$ restricted to the window of execution $I_2$ equals $W_1$ restricted on the window of execution $J_2$. Furthermore, the tape head is at $s_1$ right before computational step 1 and input command $(q_1, b_1)$ is executed; the tape head is at $t_1$ right before computational step n+1 and input command $(q_1, b_1)$ is executed.

Also, $V_2(s_1)=a_1=W_2(t_1)$ and $V_2(s_2)=b_2=W_2(t_2)$. Thus, $V_2$ restricted to the window of execution $I_2$ equals $W_2$ restricted to the window of execution $J_2$ Furthermore, the tape head is at $s_2$ right before computational step 2 and input command $(q_2, b_2)$ is executed; the tape head is at $t_2$ right before computational step n+2 and input command $(q_2, b_2)$ is executed. This completes the base case of induction.

Induction Hypothesis.

Suppose that for the $1, 2, \ldots, k-1$ computational steps and the corresponding $n+1, n+2, \ldots, n+k-1$ steps that for every i with $1 \le i \le k$ $V_1$ restricted to the window of execution $I_i$ equals $W_I$ restricted on the window of execution $J_i$; $V_2$ restricted to the window of execution $I_i$ equals $W_2$ restricted on the window of execution $J_i$; and $\ldots V_i$ restricted to the window of execution equals $W_i$ restricted on the window of execution $J_i$.

Furthermore, the tape head is at $s_i$ right before computational step i and input command $(q_i, b_i)$ is executed; the tape head is at $t_i$ right before computational step n+i and input command $(q_i, b_i)$ is executed.

Induction Step.

Since $(q_k, b_k)$ is the input command before computational step k and before computational step n+k, then $V_k(s_k)=b_k=W_k(t_k)$.

From the definition, $\eta(q_k, b_k)=\eta(q_{k+1}, a_k, x)$ for some $a_k$ in A and x equals L or R. Note that L represents a left tape head move and R a right tape head move.

Case x=R. a Right Tape Head Move for Computational Steps k and n+k.

|   | $s_k$ | $s_{k+1}$ |   |
|---|---|---|---|
| $V_k$ | $\underline{b_k}$ | $b_k$ |   |
| $V_{k+1}$ | $a_k$ | $\underline{b_{k+1}}$ |   |

|   | $t_k$ | $t_{k+1}$ |   |
|---|---|---|---|
| $W_k$ | $\underline{b_k}$ | $b_k$ |   |
| $W_{k+1}$ | $a_k$ | $\underline{b_{k+1}}$ |   |

By the inductive hypothesis $V_k$ restricted to window of execution $I_k$ equals $W_k$ restricted to window of execution $J_k$ and the only change to the tape and tape head after executing $\eta(q_k, b_k)=\eta(g_{k+1}, a_k, R)$ for the steps k and n+k is that $V_{k+1}(s_k)=a_k=W_{k+1}(t_k)$ and $V_{k+1}(s_{k+1})=b_{k+1}=W_{k+1}(t_{k+1})$ and that the tape heads move right to $s_{k+1}$ and $t_{k+1}$ respectively.

Thus, $V_{k+1}$ restricted to the window of execution $I_{k+1}$ equals $W_{k+1}$ restricted on the window of execution $J_{k+1}$. And for each j satisfying 1≤j≤k, then $V_j$ restricted to the window of execution $I_{k+1}$ equals $W_j$ restricted on the window of execution $J_{k+1}$.

Case x=L. A Left Tape Head Move for Computational Steps k and n+k.

|  | $s_{k+1}$ | $s_k$ |
|---|---|---|
| $V_k$ | $b_{k+1}$ | $\underline{b_k}$ |
| $V_{k+1}$ | $\underline{b_{k+1}}$ | $a_k$ |

|  | $t_{k+1}$ | $t_k$ |
|---|---|---|
| $W_k$ | $b_{k+1}$ | $\underline{b_k}$ |
| $W_{k+1}$ | $\underline{b_{k+1}}$ | $a_k$ |

By the inductive hypothesis $V_k$ restricted to window of execution $I_k$ equals $W_k$ restricted to window of execution $J_k$ and the only change to the tape and tape head after executing $\eta(q_k, b_k) = \eta(q_{k+1}, a_k, L)$ for the steps k and n+k is that $V_{k+1}(s_k) = a_k = W_{k+1}(t_k)$ and $V_{k+1}(S_{k+1}) = b_{k+1} = W_{k+1}(t_{k+1})$ and that the tape heads move left to $s_{k+1}$ and $t_{k+1}$ respectively.

Thus, $V_{k+1}$ restricted to the window of execution $I_{k+1}$ equals $W_{k+1}$ restricted on the window of execution $J_{k+1}$. And for each j satisfying 1≤j≤k, then $V_j$ restricted to the window of execution $I_{k+1}$ equals $W_j$ restricted on the window of execution $J_{k+1}$.

IMMORTALITY METHOD SECTION 8

Definition 8.1

Prime Directed Edge from Head and Tail Execution Nodes

A prime head execution node $\Delta = [q, v_0 v_1 \ldots v_n, s]$ and prime tail execution node $\Gamma = [r, w_0 w_1 \ldots w_n, t]$ (see FIG. 8) are called a prime directed edge iff all of the following hold:

When Turing machine (Q, A, η) starts execution, it is in state q; the tape head is located at tape square s. For each j satisfying 0≤j≤n tape square j contains symbol $v_j$. In other words, the initial tape pattern is $v_0 v_1 \ldots v_s \ldots v_n$.

During the next N computational steps, state r is visited twice and all other states in Q are visited at most once. In other words, the corresponding sequence of input commands during the N computational steps executed contains only one prime state cycle.

After N computational steps, where 1≤N≤|Q|, the machine is in state r. The tape head is located at tape square t. For each j satisfying 0≤j≤n tape square j contains symbol $w_j$. The tape pattern after the N computational steps is $w_0 w_1 \ldots w_t \ldots w_n$.

The window of execution for these N computational steps is [0, n].

A prime directed edge is denoted as $\Delta \Rightarrow \Gamma$ or $[q, v_0 v_1 \ldots v_n, s] \Rightarrow [r, w_0 w_1 \ldots w_n, t]$. The number of computational steps N is denoted as $|\Delta \Rightarrow \Gamma|$.

Definition 8.2

Prime Input Command Sequence 7.4 introduced input commands. If $(q_1, a_1) \mapsto \ldots \mapsto (q_n, a_n)$ is an execution sequence of input commands for (Q, A, η), then $(q_1, a_1) \mapsto \ldots \mapsto (q_n, a_n)$ is a prime input command sequence if $q_n$ is visited twice and all other states in the sequence are visited once. In other words, a prime input command sequence contains exactly one prime state cycle.

Notation 8.3

Prime Input Command Sequence Notation

Using the same notation as lemma 7.11, let $V_1$ denote the initial tape pattern—which is the sequence of alphabet symbols in the tape squares over the window of execution of the prime input command sequence—right before the first input command $(q_1, a_1)$ in the sequence is executed. And let $s_1$ denote the location of the tape head i.e. $V_1(s_1) = a_1$. Let $V_k$ denote the tape pattern right before the kth input command $(q_k, a_k)$ in the sequence is executed and let $s_k$ denote the location of the tape head i.e. $V_k(s_k) = a_k$.

Definition 8.4

Composition of Prime Input Command Sequences

Let $(q_1, a_1) \mapsto \ldots \mapsto (q_n, a_n)$ and $(r_1, b_1) \mapsto \ldots \mapsto (r_m, b_m)$ be prime input command sequences where $V_k$ denotes the tape pattern right before the kth input command $(q_k, a_k)$ with tape head at $s_k$ with respect to $V_k$ and $W_k$ denotes the tape pattern right before the kth input command $(r_k, b_k)$ with tape head at $t_k$ with respect to $W_k$.

Suppose $(V_n, s_n)$ overlap matches with $(W_1, t_1)$ and $q_n = r_1$. Then $(q_n, a_n) = (r_1, b_1)$. And the composition of these two prime input command sequences is defined as $(q_1, a_1) \mapsto \ldots \mapsto (q_n, a_n) \mapsto (r_2, b_2) \mapsto \ldots \mapsto (r_m, b_m)$ The composition is undefined if $(V_n, s_n)$ and $(W_1, t_1)$ do not overlap match or $q_n \neq r_1$.

If $(q_1, a_1) \mapsto \ldots \mapsto (q_n, a_n) \mapsto (q_1, b_1)$ is a prime state cycle, then it is also prime input command sequence. For simplicity in upcoming lemma 8.15, it is called a composition of one prime input command sequence.

The purpose of these next group of definitions is to show that any consecutive repeating state cycle is contained inside a composition of prime input command sequences. From lemmas 7.10 and 7.11, there is a one to one correspondence between a consecutive repeating state cycle and an immortal periodic point.

If this consecutive repeating state cycle is rotated, then it is still part of the same periodic orbit of the original periodic point. Next it is shown that there is a one to one correspondence between prime input command sequences and prime directed edges. Subsequently, it is explained how to link match prime directed edges. Then it is demonstrated how to find all prime directed edges for a particular Turing machine. If a particular Turing machine has any immortal periodic points, then it will have corresponding consecutive repeating state cycles which will be contained in an edge sequence of prime directed edges that are link matched.

Example 8.5

Directed Partition Method

Start with the finite sequence (0, 4, 2, 3, 4, 1, 3, 0, 1, 2, 0, 4, 2, 3, 4, 1, 3, 0, 1, 2).

Partition Steps
(0 4 2 3 4 1 3 0 1 2 0 4 2 3 4 1 3 0 1 2)
((0 4 2 3) 4 1 3 0 1 2 0 4 2 3 4 1 3 0 1 2) 4 lies in (0 4 2 3).
  1st element found.
((0 4 2 3) (4 1 3 0) 1 2 0 4 2 3 4 1 3 0 1 2) 1 lies in (4 1 3 0).
  2nd element found.

((0 4 2 3) (4 1 3 0) (1 2 0 4) 2 3 4 1 3 0 1 2) 2 lies in (1 2 0 4). 3rd element found.

((0 4 2 3) (4 1 3 0) (1 2 0 4) (2 3 4 1) 3 0 1 2) 3 lies in (2 3 4 1). 4th element found.

((0 4 2 3) (4 1 3 0) (1 2 0 4) (2 3 4 1) (3 0 1 2)) 0 lies in (0 4 2 3). 5th element found.

Definition 8.6

Tuples

A tuple is a finite sequence of objects denoted as $(\sigma_1, \sigma_2, \ldots, \sigma_m)$. The length of the tuple is the number of objects in the sequence denoted as $|(\sigma_1, \sigma_2, \ldots, \sigma_m)|=m$. For our purposes, the objects of the tuple may be states, input commands or natural numbers. (3) is a tuple of length one. (1, 4, 5, 6) is a tuple of length four. Sometimes the commas will be omitted as in the previous example. (4 6 0 1 2 3) is a tuple of length six. The 4 is called the first object in tuple (4 6 0 1 2 3). 1 is called a member of tuple (4 6 0 1 2 3).

Definition 8.7

Tuple of Tuples

A tuple of tuples is of the form $(w_1, w_2, \ldots, w_n)$ where each $w_k$ may have a different length. An example of a tuple of tuples is ((3), (1, 4, 5, 6), (4, 5, 6)). Sometimes the commas are omitted: ((0 8 2 3) (1 7 5 7) (5 5 6)).

Definition 8.8

Directed Partition of a Sequence

A directed partition is a tuple of tuples $(w_1, w_2, \ldots, w_n)$ that satisfies Rules A and B.
Rule A. No object a occurs in any element tuple $w_k$ more than once.
Rule B. If $w_k$ and $w_{k+1}$ are consecutive tuples, then the first object in tuple $w_{k+1}$ is a member of tuple $w_k$.

Example 8.9

Directed Partition Examples ((0 8 2 3) (8 7 5 4) (5 0 6)) is an example of a directed partition.

((0 8 2 3) (8 7 5 4) (5 0 6)) is sometimes called a partition tuple.

(0 8 2 3) is the first element tuple. And the first object in this element tuple is 0.

Element tuple (8 0 5 7 0 3) violates Rule A because object 0 occurs twice.

((0 8 2 3) (1 7 5 4) (5 0 6)) violates Rule B since 1 is not a member of element tuple (0 8 2 3).

Definition 8.10

Consecutive Repeating Sequence and Extensions

A consecutive repeating sequence is a sequence $(x_1, x_2, \ldots, x_n, \ldots, x_{2n})$ of length 2n for some positive integer n such that $x_k = x_{n+k}$ for each k satisfying $1 \leq k \leq n$. An extension sequence is the same consecutive repeating sequence for the first 2n elements $(x_1 \ldots x_n \ldots x_{2n} \ldots x_{2n+m})$ such that $x_k = x_{2n+k}$ for each k satisfying $1 \leq k \leq m$.

A minimal extension sequence is an extension sequence $(x_1, \ldots, x_{2n+m})$ where m is the minimum positive number such that there is one element in $x_{2n}, x_{2n+1}, \ldots, x_{2n+m}$ that occurs more than once. Thus, $x_{2n+k} = x_{2n+m}$ for some k satisfying $0 \leq k \leq m$.

For example, the sequence S=(4 2 3 4 1 3 0 1 2 0 4 2 3 4 1 3 0 1 2 0) is a consecutive repeating sequence and $\overline{S}$=(4 2 3 4 1 3 0 1 2 0 4 2 3 4 1 3 0 1 2 0 4 2 3 4 1) is an extension sequence. $\overline{S}$ contains consecutive repeating sequence S.

Definition 8.11

Directed Partition Extension with Last Tuple Satisfying Rule B

Suppose $(x_1 \ldots x_n \ldots x_{2n}, x_{2n+1}, \ldots, x_{2n+m})$ is an extension of consecutive repeating sequence $(x_1 \ldots, x_n \ldots x_{2n})$. Then $(w_1, w_2, \ldots, w_r)$ is a directed partition extension if it is a directed partition of the extension: The last tuple $w_r$ satisfies Rule B if $x_{2n+m}$ is the last object in tuple $w_r$ and $x_{m+1}$ lies in tuple $w_r$.

For example, the extension $\overline{S}$=(4 2 3 4 1 3 0 1 2 0 4 2 3 4 1 3 0 1 2 0 4 2 3) has directed partition extension ((4 2 3) (4 1 3 0) (1 2 0 4) (2 3 4 1) (3 0 1 2) (0 4 2 3)) and the last tuple satisfies Rule B since 4 lies in (0 4 2 3)

Method 8.12

Directed Partition Method

Given a finite sequence $(x_1 \ldots x_n)$ of objects.
Initialize element tuple $w_1$ to the empty tuple, ( )
Initialize partition tuple P to the empty tuple, ( )
For each element $x_k$ in sequence $(x_1 \ldots x_n)$

```
{
    if x_k is a member of the current element tuple w_r
    {
        Append element tuple w_r to the end of partition tuple so that
        P = (w_1 ... w_r)
        Initialize current element tuple w_{r+1} = (x_k)
    }
    else update w_r by appending x_k to end of element tuple w_r
}
```

The final result is the current partition tuple P after element $x_n$ is examined in the loop.

Observe that the tail of elements from $(x_1 \ldots x_n)$ with no repeated elements will not lie in the last element tuple of the final result P.

Example 8.13

Directed Partition Method implemented in newLISP, www.newlisp.org.

```
(define (add_object element_tuple object)
    (if (member object element_tuple) nil
        (append element_tuple (list object))  ))
(define (find_partition seq)
    (let
        (   (partition_tuple '( ) )
            (element_tuple '( ) )
            (test_add nil)
        )
        (dolist (object seq)
```

-continued

```
        (set 'test_add (add_object element_tuple object) )
        (if test_add
             (set 'element_tuple test_add)
             (begin
                (set 'partition_tuple  (append partition_tuple
                (list element_tuple) ) )
                (set 'element_tuple  (list object) )
        )))
        partition_tuple
))
(set 'seq '(4 2 3 4 1 3 0 1 2 0  4 2 3 4 1 3 0 1 2 0  4 2 3 4) )
> (find_partition seq)
( (4 2 3) (4 1 3 0) (1 2 0 4) (2 3 4 1) (3 0 1 2) (0 4 2 3)  )
4 lies in the last tuple (0 4 2 3)
```

Lemma 8.14

Every Consecutive Repeating Sequence has an Extension Sequence with a Directed Partition Such that the Last Tuple Satisfies the Rule B Property Proof.

As defined in 8.10, extend consecutive repeating sequence $(x_1, x_2 \ldots x_{2n})$ to the extension sequence $(x_1, x_2 \ldots x_{2n}, x_{2n+1} \ldots x_{2n+m})$ such that m is the minimum positive number such that there is one element in $x_{2n}, x_{2n+1} \ldots x_{2n+m}$ that occurs more than once. Thus, $x_{2n+k} = x_{2n+m}$ for some k satisfying $0 \leq k \leq m$.

Apply method 8.12 to $\overline{S} = (x_1, x_2 \ldots x_{2n}, x_{2n+1} \ldots x_{2n+m})$. Then the resulting partition tuple P extends at least until element $x_{2n}$ and the last tuple in P satisfies rule B. If the partition tuple P is mapped back to the underlying sequence of elements, then it is an extension sequence since it reaches element $x_{2n}$.

Lemma 8.15

Any Consecutive Repeating State Cycle is Contained in a Composition of One or More Prime Input Command Sequences Proof.

Let $\sigma = [(q_1, a_1) \mapsto \ldots \mapsto (q_n, a_n) \mapsto (q_1, a_1) \mapsto \ldots \mapsto (q_n, a_n)]$ be a consecutive repeating cycle. Method 8.12 & 8.14 show that this sequence of consecutive repeating input commands may be extended to a minimal extension sequence: $[(q_1, a_1) \mapsto \ldots \mapsto (q_n, a_n) \mapsto (q_1, a_1) \mapsto \ldots \mapsto (q_n, a_n) \mapsto (q_1, a_1) \mapsto \ldots \mapsto (q_m, a_m)]$ For simplicity, let $v_k$ denote input command $(q_k, a_k)$.

Apply method 8.12 to $(v_1, \ldots v_n v_1 \ldots v_n v_1 \ldots v_m)$ so that the result is the partition tuple $P = (w_1, \ldots w_r)$. Then the sequence of element tuples in P represent a composition of one or more prime input command sequences. Rules A and B imply that for consecutive tuples $w_k = (v_{k(1)} v_{k(2)} \ldots v_{k(m)})$ and $w_{k+1} = (v_{(k+1)(1)} v_{(k+1)(2)} \ldots v_{(k+1)(m)})$, then $(q_{k(1)}, a_{k(1)}) \mapsto (q_{k(2)}, a_{k(2)}) \mapsto \ldots \mapsto (q_{k(m)}, a_{k(m)}) \mapsto (q_{(k+1)}, a_{(k+1)(1)})$ is a prime input command sequence. And 8.14 implies that the last tuple $w_r$ corresponds to a prime input command sequence and that the consecutive repeating state cycle is contained in the partition P mapped back to the sequence of input commands.

Definition 8.16

Finite Sequence Rotation

Let $(x_0 x_1 \ldots x_n)$ be a finite sequence. A k-rotation is the resulting sequence $(x_k x_{k+1} \ldots x_n x_0 x_1 \ldots x_{k-1})$. The 3-rotation of (8 7 3 4 5) is (3 4 5 8 7). When it does matter how many elements it has been rotated, it is called a sequence rotation.

Definition 8.17

Rotating a State-Symbol Cycle

Let $(q_1, a_1) \mapsto \ldots \mapsto (q_n, a_n) \mapsto (q_1, b_1)$ be a state cycle. This state cycle is called a state-symbol cycle if $a_1 = b_1$. A rotation of this state-symbol cycle is the state cycle $(q_k, a_k) \mapsto \ldots \mapsto (q_n, a_n) \mapsto (q_1, a_1) \mapsto \ldots \mapsto (q_k, a_k)$ for some k satisfying $0 \leq k \leq n$. In this case, the state-symbol cycle has been rotated by k-1 steps.

Lemma 8.18

Any Consecutive Repeating Rotated State Cycle Generated from a Consecutive Repeating State Cycle Induces the Same Immortal Periodic Orbit Proof.

Let p be the immortal periodic point induced by this consecutive repeating state cycle. Rotating this state cycle by k steps corresponds to iterating p by the next k corresponding affine functions.

Lemma 8.19

Prime Directed Edges ⇔ Prime Input Command Sequences

Prime directed edges and prime input command sequences are in 1 to 1 correspondence.

Proof. ($\Rightarrow$) Let $\Delta \Rightarrow \Gamma$ be a prime directed edge where $\Delta = [q, v_0 v_1 \ldots v_n, s]$ and $\Gamma = [r, w_0 w_1 \ldots w_n, t]$. From the definition of a prime directed edge, over the next N computational steps some state r is visited twice, all other states in Q are visited at most once and there is a sequence of input commands $(q, v_s) \mapsto (q_1, a_1) \mapsto \ldots (r, a_k) \ldots \mapsto (r, w_t)$ corresponding to these N steps. This is a prime input command sequence.

($\Leftarrow$) Let $(q_1, a_1) \mapsto \ldots \mapsto (q_n, a_n)$ be a prime input command sequence with N computational steps. Then $q_n$ is visited twice and all other states in the sequence are visited only once. Let $v_0 v_1 \ldots v_n$ be the initial tape pattern over the window of execution during the N computational steps. Now $a_1 = v_s$ for some s. Let $w_0 w_1 \ldots w_n$ be the final tape pattern over the window of execution as a result of these N steps. Then $a_n = v_t$ for some t. Thus, $[q, v_0 v_1 \ldots v_n, s] \Rightarrow [r, w_0 w_1 \ldots w_n, t]$ is a prime directed edge.

Remark 8.20

Upper Bound for the Number of Prime Directed Edges

Each prime head node determines a unique prime directed edge so an upper bound for head nodes provides an upper bound for the number of distinct prime directed edges. Consider prime head node [q, V, s]. There are |Q| choices for the state q. Any pattern that represents the window of execution has length $\leq |Q|+1$. Furthermore, by the previous remark any pattern P such that (V, s) submatches (P, t) for some t, then the resultant pattern is the same since V spans the window of execution. Thus, $|A|^{|Q|+1}$ is an upper bound for the number of different patterns V.

Lastly, there are two choices for s in a |Q|+1 length pattern because the maximum number of execution steps is |Q| i.e.

the tape head move sequence is $L^{|Q|}$ or $R^{|Q|}$. Thus, $|Q|$ is an upper bound for the number of choices for s unless $|Q|=1$. The following bound works in the trivial case that $|Q|=1$. Thus, there are at most $|Q||A|^{|Q|+1}$ prime directed edges.

Example 8.21

3-State Machine Prime Directed Edges and Prime Input Command Sequences

Consider Turing Machine $(Q, A, \eta)$. $Q=\{2, 3, 4\}$ and 1 is the halting state.
$A=\{0, 1\}$ and $\eta$ is specified in the following table.

| q | $T_k$ | $\eta(q, T_k)$ |
|---|---|---|
| 2 | 0 | (3, 1, L) |
| 2 | 1 | (4, 0, L) |
| 3 | 0 | (4, 1, R) |
| 3 | 1 | (4, 0, R) |
| 4 | 0 | (1, 0, R) |
| 4 | 1 | (2, 0, R) |

| Prime Directed Edges | Prime Input Command Sequences |
|---|---|
| $[2, 0\underline{0}0, 1] \Rightarrow [2, 1\underline{0}0, 2]$ | $(2, 0) \mapsto (3, 0) \mapsto (4, 1) \mapsto (2, 0)$ |
| $[2, 1\underline{0}0, 1] \Rightarrow [2, 0\underline{0}0, 2]$ | $(2, 0) \mapsto (3, 1) \mapsto (4, 1) \mapsto (2, 0)$ |
| $[2, 1\underline{1}, 1] \Rightarrow [2, 0\underline{0}, 1]$ | $(2, 1) \mapsto (4, 1) \mapsto (2, 0)$ |
| $[2, 0\underline{0}1, 1] \Rightarrow [2, 1\underline{0}1, 2]$ | $(2, 0) \mapsto (3, 0) \mapsto (4, 1) \mapsto (2, 1)$ |
| $[2, 1\underline{0}1, 1] \Rightarrow [2, 0\underline{0}1, 2]$ | $(2, 0) \mapsto (3, 1) \mapsto (4, 1) \mapsto (2, 1)$ |
| $[3, 0\underline{1}0, 0] \Rightarrow [3, 1\underline{0}1, 1]$ | $(3, 0) \mapsto (4, 1) \mapsto (2, 0) \mapsto (3, 0)$ |
| $[3, 1\underline{1}0, 0] \Rightarrow [3, 0\underline{0}1, 1]$ | $(3, 1) \mapsto (4, 1) \mapsto (2, 0) \mapsto (3, 0)$ |
| $[4, 1\underline{0}, 0] \Rightarrow [4, 1\underline{1}, 1]$ | $(4, 0) \mapsto (2, 0) \mapsto (3, 0) \mapsto (4, 1)$ |
| $[4, 1\underline{1}, 0] \Rightarrow [4, 0\underline{0}, 1]$ | $(4, 1) \mapsto (2, 1) \mapsto (4, 0)$ |

There are 9 distinct prime state cycles. Observe that $|Q|^2|A|^{|Q|+1}=3^2(4^2)=144$. Observe that $|Q|(|A|+|A|^2)=2(2+4)=12$.

The upper bound in 8.20 appears to not be sharp. Although sharp upper bounds for the number of prime directed edges are important, these types of results are not addressed here.

In what follows prime directed edges are link matched so that for a given Turing Machine a method for finding consecutive repeating state cycles is demonstrated. It is proved that this method will find immortal periodic points if they exist. The expression demonstrate a method for finding is used instead of describe an algorithm in order to not create confusion with the current notion of a Turing algorithm computed by a fixed Turing machine. In section 9, an dynamic register machine is described that can implement this new method of computing.

Definition 8.22

Halting Execution Node

Suppose $[q, v_0 v_1 \ldots v_n, s]$ is an execution node and over the next 10 computational steps a prime state cycle is not found. In other words, a prime directed edge is not generated. Then the Turing machine execution halted in $|Q|$ or less steps. Let W be a pattern such that (W, t) submatches (V, s) and W spans the window of execution until execution halts. Define the halting node as $H=[q, W, t]$.

Notation 8.23

Set of all Prime Directed Edges

Remark 8.20 provides an upper bound on the number of prime directed edges. Let $P=\{\Delta_1 \Rightarrow \Gamma_1, \ldots, \Delta_k \Rightarrow \Gamma_k, \ldots, \Delta_N \Rightarrow \Gamma_N\}$ denote the finite set of prime directed edges for machine $(Q, A, \eta)$.

Definition 8.24

Overlap Matching of a Node to a Prime Head Node

Execution node $\Pi$ overlap matches prime head node $\Delta$ iff the following hold:
$\Pi=[r, w_0 w_1 \ldots w_n, t]$ is an execution node satisfying $0 \leq t \leq n$
$\Delta=[q, v_0 v_1 \ldots v_n, s]$ is a prime head node satisfying $0 \leq s \leq m$
State q=State r.
W denotes pattern $w_0 w_1 \ldots w_n$ and V denotes pattern $v_0 v_1 \ldots v_m$
Pattern (W, t) overlap matches (V, s) as defined in definition 7.1.

Lemma 8.25

Overlap Matching Prime Head Nodes are Equal

If $\Delta_j=[q, P, u]$ and $\Delta_k=[q, V, s]$ are prime head nodes and they overlap match, then they are equal. (Distinct edges have prime head nodes that do not overlap match.)
Proof.

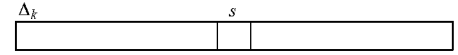

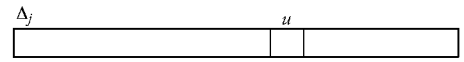

$0 \leq u \leq |\Delta_j|$ and $0 \leq s \leq |\Delta_k|$.
Let $(I, m)=(P, u) \cap (V, s)$ where $m=\min\{s, u\}$
Suppose the same machine begins execution on tape I with tape head at m in state q.
If s=u and $|\Delta_j|=|\Delta_k|$, then the proof is complete.
Otherwise, $s \neq u$ or $|\Delta_j| \neq |\Delta_k|$ or both. $\Delta_j$ has a window of execution $[0, |\Delta_j|-1]$ and $\Delta_k$ has window of execution $[0, |\Delta_k|-1]$. Let the ith step be the first time that the tape head exits finite tape I. This means the machine would execute the same machine instructions with respect to $\Delta_j$ and $\Delta_k$ up to the ith step, so on the ith step, $\Delta_j$ and $\Delta_k$ must execute the same instruction. Since it exits tape I at the ith step, this would imply that either pattern P or V are exited at the ith step. This contradicts either that $[0, |\Delta_j|-1]$ is the window of execution for $\Delta_j$ or $[0, |\Delta_k|-1]$ is the window of execution for $\Delta_k$.

Definition 8.26

Edge Node Substitution Operator $\Pi \oplus (\Delta \Rightarrow \Gamma)$

Let $\Delta \Rightarrow \Gamma$ be a prime directed edge with prime head node $\Delta=[q, v_0 v_1 \ldots v_n, s]$ and tail node $\Gamma=[r, w_0 w_1 \ldots w_n, t]$. If execution node $\Pi=[q, p_0 p_1 \ldots p_m, u]$ overlap matches $\Delta$, then the edge pattern substitution operator from 7.2 induces a new execution node $\Pi \oplus (\Delta \Rightarrow \Gamma) = [r, (P, u) \oplus [(V, s) \Rightarrow (W, t)], k]$ with head $k=u+t-s$ if $u>s$ and head $k=t$ if $u \leq s$ such that $0 \leq s$, $t \leq n$ and $0 \leq u \leq m$ and patterns $V = v_0 \, v_1 \ldots v_n$ and $W = w_0 \, w_1 \ldots w_n$ and $P = p_0 \, p_1 \ldots p_m$.

Definition 8.27

Prime Directed Edge Sequence and Link Matching

A prime directed edge sequence is defined inductively. Each element is a coordinate pair with the first element being a prime directed edge and the second element is an execution node. Each element is abstractly expressed as $(\Delta_k \Rightarrow \Gamma_k, \Pi_k)$.

The first element of a prime directed edge sequence is $(\Delta_1 \Rightarrow \Gamma_1, \Pi_1)$ where $\Pi_1 = \Gamma_1$, and $\Delta_1 \Rightarrow \Gamma_1$ is some prime directed edge in P. For simplicity in this definition, the indices in P are relabeled if necessary so the first element has indices equal to 1. If $\Pi_1$ overlap matches some non-halting prime head node $\Delta_2$, the second element of the prime directed edge sequence is $(\Delta_2 \Rightarrow \Gamma_2, \Pi_2)$ where $\Pi_2 = \Pi_1 \oplus (\Delta_2 \Rightarrow \Gamma_2)$. This is called a link match step.

Otherwise, $\Pi_1$ overlap matches a halting node, then the prime directed edge sequence terminates. This is expressed as $[(\Delta_1 \Rightarrow \Gamma_1, \Gamma_1), \text{HALT}]$. In this case it is called a halting match step.

If the first $k-1$ steps are link match steps, then the prime directed edge sequence is denoted as $[(\Delta_1 \Rightarrow \Gamma_1, \Pi_1), (\Delta_2 \Rightarrow \Gamma_2, \Pi_2), \ldots, (\Delta_k \Rightarrow \Gamma_k, \Pi_k]$ where $\Pi_j$ overlap matches prime head node $\Delta_{j+1}$ and $\Pi_{j+1} = \Pi_j \oplus (\Delta_{j+1} \Rightarrow \Gamma_{j+1})$ for each $j$ satisfying $0 \leq j \leq k$.

Notation 8.28

Edge Sequence Notation $E([p_1, p_2, \ldots, p_k], k)$

To avoid subscripts of a subscript, $p_k$ and the subscript $_{p(j)}$ represent the same number. As defined in 8.27, $P = \{\Delta_1 \Rightarrow \Gamma_1, \ldots, \Delta_k \Rightarrow \Gamma_k, \ldots, \Delta_N \Rightarrow \Gamma_N\}$ denotes the set of all prime directed edges. $E([p_1], 1)$ denotes the edge sequence $[(\Delta_{p(1)} \Rightarrow \Gamma_{p(1)}, \Pi_{p(1)})]$ of length 1 where $\Pi_{p(1)} = \Gamma_{p(1)}$ and $1 \leq p_1 \leq |P|$. Next $E([p_1, p_2], 2)$ denotes the edge sequence $[(\Delta_{p(1)} \Rightarrow \Gamma_{p(1)}, \Pi_{p(1)}, (\Delta_{p(2)} \Rightarrow \Gamma_{p(2)}, \Pi_{p(2)})]$ of length 2 where $\Pi_{p(2)} = \Pi_{p(1)} \oplus (\Delta_{p(2)} \Rightarrow \Gamma_{p(2)})$ and $1 \leq p_1, p_2 \leq |P|$.

In general, $E([p_1, p_2, \ldots, p_k], k)$ denotes the edge sequence of length k which is explicitly $[(\Delta_{p(1)} \Rightarrow \Gamma_{p(1)}, \Pi_{p(1)}), (\Delta_{p(2)} \Rightarrow \Gamma_{p(2)}, \Pi_{p(2)}), \ldots, (\Delta_{p(k)} \Rightarrow \Gamma_{p(k)}, \Pi_{p(k)})]$ where $\Pi_{p(j+1)} = \Pi_{p(j)} \oplus (\Delta_{p(j+1)} \Rightarrow \Gamma_{p(j+1)})$ for each $j$ satisfying $1 \leq j \leq k-1$ and $1 \leq p(j) \leq |P|$.

Definition 8.29

Edge Sequence Contains a Consecutive Repeating State Cycle

Lemma 8.19 implies that an edge sequence corresponds to a composition of prime input commands. The expression an edge sequence contains a consecutive repeating state cycle is used if the corresponding sequence of prime input commands contains a consecutive repeating state cycle.

Theorem 8.30 any Consecutive Repeating State Cycle of $(Q, a, \eta)$ is Contained in an Edge Sequence of $(Q, a, \eta)$ Proof.
This follows immediately from definition 8.29 and lemmas 8.15 and 8.19.

Remark 8.31

Period of an Immortal Periodic Point Contained in Edge Sequence

If $E([p_1, p_2, \ldots, p_r], r)$ contains a consecutive repeating state cycle, then the corresponding immortal periodic point has period $$\leq \frac{1}{2} \sum_{k=1}^{r} |\Delta_{p(k)} \Rightarrow \Gamma_{p(k)}|.$$

Proof. This follows from lemma 7.11 that a consecutive repeating state cycle induces an immortal periodic point. The length of the state cycle equals the period of the periodic point. Further, the number of input commands corresponding to the number of computational steps equals $|\Delta_{p(k)} \Rightarrow \Gamma_{p(k)}|$ in directed edge $\Delta_{p(k)} \Rightarrow \Gamma_{p(k)}$.

Method 8.32

Finding a Consecutive Repeating State Cycle in an Edge Sequence

Given an edge sequence whose corresponding prime input command sequence $(q_0, a_0) \mapsto (q_1, a_1) \mapsto \ldots \mapsto (q_N, a_N)$ has length N.

```
Set n = N / 2 if N is even; otherwise, set n = (N +1) / 2 if N is odd
for each k in {1, 2, ..., n }
{
    for each j in {0, 1, ..., N − 2k − 1}
    {
        if sequence (q_j, a_j) ↦ (q_{j+1}, a_{j+1}) ↦ ... ↦ (q_{j+k}, a_{j+k}) equals
           sequence (q_{j+k+1}, a_{j+k+1}) ↦ (q_{j+k+2}, a_{j+k+2})
           ↦ ... ↦ (q_{j+2k+1}, a_{j+2k+1})
        then
        {
            return consecutive repeating state cycle
            (q_j, a_j) ↦ (q_{j+1}, a_{j+1}) ↦ ... ↦ (q_{j+k}, a_{j+k}) ↦ ... ↦
            (q_{j+2k+1}, a_{j+2k+1})
        }
    }
}
If exited outer for loop without finding a consecutive repeating state cycle
Return NO consecutive repeating state cycles were found.
```

Example 8.33

A newLISP Function that Finds a Consecutive Repeating Sequence

```
(define (find_pattern_repeats p_length seq)
  (let
    (
     (k    0)
     (max_k (− (length seq) (+ p_length p_length)) )
     (pattern nil)
     (repeat_pair nil)
     (no_repeats true)
    )
    (while (and (<= k max_k) no_repeats)
```

-continued

```
            (set 'pattern (slice seq k p_length))
            (if (= pattern (slice seq (+ k p_length) p_length))
                (begin
                    (set 'repeat_pair (list pattern k))
                    (set 'no_repeats false)
                )
            )
            (set 'k (+ k 1))
        )
        repeat_pair
    ))
(define (find_repeats   seq)
    (let
        (
            (p_length   1)
            (max_p_length (/ (length seq) 2) )
            (repeat_pair nil)
        )
        (while (and   (<= p_length max_p_length)   (not repeat_pair) )
            (set 'repeat_pair   (find_pattern_repeats p_length seq))
            (set 'p_length   (+ p_length 1))
        )
        repeat_pair
    ))
(set 's1 '(3 5 7 2 3 5 7 11 5 7 ))
;;  s1 does not have a consecutive repeating sequence.
(set 's2 '(3 5 7 2 3 5 7 11 5 7 11 2 4 6 8 ))
;;  5 7 11 5 7 11 is a consecutive repeating sequence starting at element
in list s2
(set 's3 '(1 2 0 2 1 0 2 0 1 2 0 2 1 0 1 2 1 0 2 1 2 0 2 1 0 1 2 0 2 1 2 0 1 2
1 0 1 2 0 1 0 1 ))
;;  0 1 0 1 is a consecutive repeating sequence starting at element 38 in
list s3
> (find_repeats s1)
nil
> (find_repeats s2)
( (5 7 11) 5)
> (find_repeats s3)
( (0 1) 38)
```

Method 8.34

Prime Directed Edge Search Method

Given Turing Machine $(Q, A, \eta)$ as input, the search method works as follows.

Set $P = \emptyset$. For each non-halting state q in Q
For each pattern $a_{-|Q|} \ldots a_{-2} a_{-1} a_0 a_1 a_2 \ldots a_{|Q|}$ selected from $A^{2|Q|+1}$
{

| Tape Square |   | $-|Q|$ |     | $-2$ | $-1$ | 0 | 1 | 2 |     | $|Q|$ |
|---|---|---|---|---|---|---|---|---|---|---|
| Tape Contents |   | $a_{-|Q|}$ | ... | $a_{-2}$ | $a_{-1}$ | $a_0$ | $a_1$ | $a_2$ | ... | $a_{|Q|}$ |
| Start State | q |   |   |   |   |   |   |   |   |   |

With tape head located at $a_0$, start executing machine $(Q, A, \eta)$ until one state has been visited twice or $(Q, A, \eta)$ reaches a halting state. The Dirichlet principle implies this will take at most $|Q|$ computational steps. If it does not halt, let r be the state that is first visited twice. As defined in 8.1, over this window of execution, a prime directed edge $\Delta \Rightarrow \Gamma$ is constructed where
$\Delta = [q, v_0 v_1 \ldots v_n, s]$, $\Gamma = [r, w_0 w_1 \ldots w_m, t]$ and $0 \leq s, t \leq n \leq |Q|$.
Set $P = P \cup \{\Delta \Rightarrow \Gamma\}$
}

Remark 8.35

Prime Directed Edge Search Method Finds all Prime Directed Edges

Method 8.34 finds all prime directed edges of $(Q, A, \eta)$ and all halting nodes.

Proof.

Let $\Delta \Rightarrow \Gamma$ be a prime directed edge of $(Q, A, \eta)$. Then $\Delta \Rightarrow \Gamma$ has a head node $\Delta = [r, v_0 v_1 \ldots v_n, s]$, for some state r in Q, for some tape pattern $v_0 v_1 \ldots v_n$ that lies in $A^{n+1}$, such that $n \leq |Q|$ and $0 \leq s \leq n$. In the outer loop of 8.34, when r is selected from Q and in the inner loop when the tape pattern $a_{-|Q|} \ldots a_{-2} a_{-1} a_0 a_1 a_2 \ldots a_{|Q|}$ is selected from $A^{2|Q|+1}$ such that $$a_0 = v_s \quad a_1 = v_{s+1} \quad \ldots \quad a_k = v_{s+k} \quad \ldots \quad a_{n-s} = v_n$$

$$a_{-1} = v_{s-1} \quad a_{-2} = v_{s-2} \quad \ldots \quad a_{-k} = v_{s-k} \quad \ldots \quad a_{-s} = v_0$$

then the machine execution in 8.34 will construct prime directed edge $\Delta \Rightarrow \Gamma$.

When the head node is a halting node, the machine execution must halt in at most $|Q|$ steps. Otherwise, it would visit a non-halting state twice and thus, be a non-halting head node. The rest of the argument for this halting node is the same as for the non-halting head node. See FIG. 9, which shows a block diagram of the method implemented by search method 8.34. Note that since the collection of prime directed edges and halting nodes is the collection of all possible patterns of symbols and states, the collection of prime directed edges and halting nodes can process any tape pattern and since each prime directed edges and halt node does nothing more than the original set of instructions would do for the same pattern of symbols on the tape, the collection of prime directed edges and halting nodes produces the same results as the original set of instructions from which the prime directed edges and halting nodes were derived. As, a consequence, investigating the prime directed edges can be used as technique for investigating whether a particular Turing machine and tape combination includes an immortal configuration or eventually halts.

Method 8.36

Immortal Periodic Point Search Method

Given Turing Machine $(Q, A, \eta)$ as input, the method works as follows.

Use method 8.34 to find all prime directed edges, P.
set k = 1.
set $\Phi(1) = \{ E([1], 1), E([2], 1), \ldots, E([ |P| ], 1) \}$
while ( $\Phi(k) \neq \emptyset$ )
{
    set $\Phi(k+1) = \emptyset$.

-continued

```
for each E([p₁, p₂, ..., pₖ], k) in Φ(k)
{
    for each prime directed edge Δⱼ⇒Γⱼ in P
    {
        if Δⱼ⇒Γⱼ link matches with Π_{p(k)} then
        {
            set p_{k+1} = j
            set Φ(k+1) = Φ(k+1) ∪ E([p₁, p₂, ..., pₖ, p_{k+1}], k+1)
            if E([p₁, p₂, ..., pₖ, p_{k+1}], k+1) contains a consecutive
            repeating state cycle
            then return the consecutive repeating state cycle
        }
    }
}
k is incremented.
}
if (while loop exited because Φ(m) = Ø for some m) then return Ø
```

Remark 8.37

$|\Phi(k)|$ is finite and $|\Phi(k)| \leq |P|^k$

Proof.

$|\Phi(1)|=|P|$. Analyzing the nested loops, in method 8.36

```
for each E([p₁, p₂, ..., pₖ], k) in Φ(k)
    for each Δⱼ⇒Γⱼ in P { ... }
```

For each edge sequence $E([p_1, p_2, \ldots, p_k], k)$ chosen from $\Phi(k)$, at most $|P|$ new edge sequences are put in $\Phi(k+1)$. Thus $|\Phi(k+1)| \leq |P||\Phi(k)|$, so $|\Phi(k)| \leq |P|^k$.

Theorem 8.38

When $(Q, A, \eta)$ is a periodic machine. method 8.36 terminates in a finite number of steps with either a consecutive repeating state cycle or for some positive integer J, then $\Phi(J) = \emptyset$ Proof.

If $(Q, A, \eta)$ has at least one configuration (q. k. T) that is an immortal point, then by definition 8.42. this implies the existence of a periodic point p with some finite period N.

Thus, from lemma 7.10, there is a consecutive repeating state cycle that corresponds to the immortal periodic orbit of p. Since method 8.36 searches through all possible prime edge sequences of length k, a consecutive repeating state cycle will be found that is contained in a prime directed edge sequence with length at most 2N. Thus, this immortal periodic point of period N will be reached before or while computing $\Phi(2N)$.

Otherwise, $(Q, A, \eta)$ does not have any configurations with an immortal orbit; in other words, for every configuration, $(Q, A, \eta)$ halts in a finite number of steps.

Claim: There is a positive integer J such that every edge sequence terminates while executing method 8.36. By reductio absurdum, suppose not. Then there is at least one infinite prime directed edge sequence that exists: this corresponds to an immortal orbit, which contradicts that $(Q, A, \eta)$ does not have any configuration with an immortal orbit.

The next few definitions are paraphrased or directly stated from [HOOPER].

Definition 8.39

Instantaneous Description [Hooper]

A tape with designated scanned symbol and an internal state of the Turing Machine together constitute an instantaneous description (ID) of the Turing Machine. Recall from definitions 2.1, and 2.2 that given Turing Machine $(Q, A, \eta)$, and tape T, where T: Z→A, then a configuration is an element (q, k, T) for some state q in Q and for some tape head location k in Z. Observe that Hooper's scanned symbol and our tape head location represent the same meaning. Thus, Hooper's instantaneous description is equivalent to the definition of a Turing Machine configuration.

Definition 8.40

Immortal and Mortal Configuration

If a configuration (ID) upon execution of Turing Machine $(Q, A, \eta)$ halts after a finite number of computational steps, then it is called a mortal configuration (mortal ID). Otherwise a configuration (ID) is called immortal.

Definition 8.41

Halting Machine

Turing Machine $(Q, A, \eta)$ is called a halting machine if it contains only mortal (halting) configurations.

Definition 8.42

Periodic Turing Machine

A Turing machine $(Q, Q, \eta)$ that has at least one periodic configuration. whenever it has an immortal configuration is said to be a periodic Turing machine.

Corollary 8.432

Method 8.36 Determines Whether $(Q, a, \eta)$ is a Halting Machine when $(Q, a, \eta)$ is a Periodic Machine This follows immediately from theorem 8.38 and method 8.36.

Definition 8.43

Turing Immortality Problem and Halting Problem

The classic result of Turing machine theory is the undecidability of the problem of determining for a given configuration of a Turing machine $(Q, A, \eta)$ is whether this configuration is immortal or mortal. This is called the halting problem.

The immortality problem is the problem of deciding for a given Turing machine $(Q, A, \eta)$ whether it is a halting machine; in other words, determining whether an immortal configuration exists for the machine $(Q, A, \eta)$.

IMMORTAL DYNAMIC REGISTER MACHINE SECTION 9

In the next section, a complete description of a dynamic register machine program, called an IDRM, is presented. This embodiment of a computing system implements methods 8.34 and 8.36, which includes method 8.32. In this section, the design of this machine is explained from a human-friendly perspective. This section describes how the Turing machine $(Q, A, \eta)$ is represented and where it is located in the registers of the IDRM. This section also describes how methods 8.34 and 8.36 are implemented and executed by the IDRM program.

In section 11, the complete formal description of the IDRM is a program of 1590 instructions composed from the Constant (C m n), Successor (S m), Transfer (T m n), Address (A m n), Jump (J m n q), Delete (D m n), and Update (U m n q) Instructions. With a valid Turing Machine as input in its registers, this IDRM solves the Turing Immortality problem after a finite number of execution steps.

Representation 9.1

Turing Machine State, Alphabet and Command

The states Q of machine (Q, A, η) are represented with the natural numbers $\{1, 2, \ldots, |Q|\}$. The alphabet symbols are represented with natural numbers $\{1, 2, \ldots, |A|\}$. The function η determines all the Turing machine commands. A Turing machine command is of the form (q a r b m) where $2 \leq q \leq |Q|$, where $1 \leq r \leq |Q|$, where $1 \leq a, b \leq |A|$ and where $1 \leq m \leq 2$. The variable m=1 represents a left tape head move and m=2 represents a right tape head move. As described in definition 2.1, the design of the IDRM assumes that 1 with respect to Q is the halting state. This is why $q \leq 2$.

Representation 9.2

Turing Machine Program as Input in the IDRM Registers

Registers 0 to 155 are reserved for computation, program flow and important constants. The design of the IDRM assumes that registers 156 through 160 contain the first Turing machine command which is of the form (2 1 r b m). Further, it is assumed that the instructions for the Turing machine are dictionary ordered over the first two coordinates. In other words, each Turing machine command of the form (q a r b m) is stored as follows:

A.) q is stored in register number 5(q−1)a+151
B.) a is stored in register number 5(q−1)a+152
C.) r is stored in register number 5(q−1)a+153
D.) b is stored in register number 5(q−1)a+154
E.) m is stored in register number 5(q−1)a+155

The initial register contents starting at register 156 are shown in the table:

| 2 | 1 | $r_{21}$ | $b_{21}$ | $m_{21}$ | 2 | 2 | $r_{22}$ | $b_{22}$ | $m_{22}$ | ... | ... | ... | 2 | $|A|$ | $r_{2|A|}$ | $b_{2|A|}$ | $m_{2|A|}$ |
|---|---|---|---|---|---|---|---|---|---|---|---|---|---|---|---|---|---|
| 3 | 1 | $r_{31}$ | $b_{31}$ | $m_{31}$ | 3 | 2 | $r_{32}$ | $b_{32}$ | $m_{32}$ | ... | ... | ... | 3 | $|A|$ | $r_{3|A|}$ | $b_{3|A|}$ | $m_{3|A|}$ |
| 4 | 1 | $r_{41}$ | $b_{41}$ | $m_{41}$ | 4 | 2 | $r_{42}$ | $b_{42}$ | $m_{42}$ | ... | ... | ... | 4 | $|A|$ | $r_{4|A|}$ | $b_{4|A|}$ | $m_{4|A|}$ |
| ... | ... | ... | ... | ... | ... | ... | ... | ... | ... | ... | ... | ... | ... | ... | ... | ... | ... |
| $|Q|$ | 1 | $r_{|Q|1}$ | $b_{|Q|1}$ | $m_{|Q|1}$ | $|Q|$ | 2 | ... | ... | ... | ... | ... | ... | $|Q|$ | $|A|$ | $r_{|Q||A|}$ | $b_{|Q||A|}$ | $m_{|Q||A|}$ |
| 0 | | | | | | | | | | | | | | | | | |

This means register 157 contains a 1; register 158 contains $r_{21}$; register 159 contains $b_{21}$ register 160 contains $m_{21}$; register (160+5|A|) contains $m_{31}$ and so on.

The Ø in register number 5(|Q|−1)|A|+156 indicates the end of the Turing machine program. At the beginning of program execution, the design of the IDRM assumes that register 0 contains the address 5(|Q|−1)|A|+156. In other words, (R Ø)=5(|Q|−1)|A|+156. This assumption is made so that the IDRM can determine if the Turing machine program is presented in a valid format in registers 156 through register 5(|Q|−1)|A|+155. This is analogous to the notion of a well-formed formula in mathematical logic. See [ENDERTON].

Description 9.3

IDRM Program Summary

Overall, the purpose of instructions 0 to 296 in the IDRM program is to check that the Turing machine (Q, A, η) is stored in a valid format starting at register 156 and to set up registers for specific purposes based on |Q| and |A| in machine. Overall, the purpose of instructions 297 to 857 in the IDRM is to construct a linked list of all, if any exist, the prime directed edges of the given Turing Machine (Q, A, whose command set starts at register 156. These 858 instructions execute method 8.34. After the prime directed edge search method described in 8.34 is completed, instructions 858 to 1589 of the IDRM program execute the immortal periodic point search method 8.36. Next, further details of the IDRM program are discussed.

Description 9.4

IDRM Program Instructions 0 to 296

Instructions 0 through 126 in the IDRM determine whether the Turing machine represented in registers 156 through register (5(|Q|−1)|A|+155) is in a valid format. If not, then execution of the IDRM jumps to instruction 1570 and writes "ERROR TURING PROGRAM" in registers 0 through 19 using the ASCII code representation. In other words, 65 corresponds to "A"; 69 corresponds to "E"; 82 corresponds to "R" and so on. By doing this valid format checking, it assures that the execution of the IDRM always terminates regardless of the initial contents of the registers in the IDRM.

Observe that rather than omitting a Turing machine command, as this is the convention in [TURING] and [DAVIS], if η(q, a) halts, the IDRM uses the convention (q a 1 b m) to represent this halting instruction as specified in section 2. Precisely, the natural number q is stored in register 5(q−1)a+151; the number a is stored in register 5(q−1)a+152; 1 is stored in register 5(q−1)a+153; b is stored in register 5(q−1)a+154; and m is stored in register 5(q−1)a+155.

After the Ø in register (5(|Q|−1)|A|+156) there are four unused registers, followed by the A offsets: $A_2, A_3, \ldots, A_{|Q|}$. The A offsets are used to help the IDRM more effectively lookup the next Turing command based on the prior state and tape symbol. The A offsets are determined and stored by instructions 127 through 153 of the IDRM.

After the A offsets, some registers are used to store information necessary to do the prime edge computations for each tape pattern element. The location of these registers are based on the values of |A| and |Q|. In more detail, instructions 154 through 296 set up a scratch pad of registers needed to execute method 8.34 i.e. the finding and storing of all prime directed edges of (Q, A, η)—if any exist. In particular, instructions 154 through 167 set up registers to record the current prime input command sequence. Instructions 168 to 190 set up registers to record the current prospective head node. Instructions 191 to 212 set up registers to record the current prospective tail node.

Instructions 213 to 233 set up registers to record the execution tape during the computation of a prospective prime directed edge. Instructions 234 to 254 set up registers to store an iteration tape, which is used to iterate through every tape pattern in $A^{2|Q|+1}$. Instructions 255 to 265 set up registers to record the tape head moves during the computation of the prospective prime edge. Instructions 266 to 292 set up registers to compute the window of execution. Instructions 293 to 296 set up memory pointers to record the number of prime edges found so far and store a linked list of prime edges. In instruction 296, a free heap pointer is stored in register 155.

Description 9.5

IDRM Program Implementing Prime Directed Edge Search Method 8.34

For each non-halting state q in Q and for each tape pattern in $A^{2|Q|+1}$ the IDRM program executes machine (Q, A, η) for at most n≤|Q| computational steps of the Turing machine. As a result, this particular tape pattern and starting state q form a prime directed edge or they do not. If they do, the prime directed edge is stored in a prime edge linked list.

Each element (node) in the prime edge linked list is stored contiguously in registers as follows: next_node, pe_number, h_node, t_node, s_node, n, q, s, s_p, $v_0, v_1 \ldots v_n$, r, t, t_p, $w_0$, $w_1 \ldots w_n$, 2N, $(q, v_s)$, $(q_1, a_1) \ldots (q_N, a_N)$ In other words, if next_node is stored in register 7000, then pe_number is stored in register 7001. h_node is stored in register 7002. t_node is stored in register 7003. s_node is stored in register 7004. n is stored in register 7005. q is stored in register 7006. s is stored in register 7007. s_p is stored in register 7008 and so on.

The contents of register next_node stores the register number of the next node.

The register contents pe_number stores the name (a number) of this prime edge.

Register h_node contains the address of the register state q in the head node.

Register t_node contains the address of the register state r in the tail node.

Register s_node contains the address of 2N in the prime input command sequence.

The window of execution size is stored in the register n q is the state of the head node.

s is the index of the head node.

s_p points to the location of tape symbol $v_s$ (i.e. index pointer of the head node)

r is the state of the tail node.

t is the index of the tail node.

t_p points to the location of tape symbol $v_s$ (i.e. index pointer of the head node)

N is the number of computational steps for this prime directed edge.

N+1 is the number of prime input commands in the prime input command sequence.

Tape symbol $a_0$=Tape symbol $v_s$

State r=State $q_N$

Register 81 stores the number of prime directed edges.

The node numbers count sequentially up to the number of prime directed edges.

$v_0, v_1 \ldots v_n$ is the initial tape pattern of the head node.

$w_0, w_1 \ldots w_n$ is the final tape pattern of the tail node.

$(q, v_s)$, $(q_1, a_1)$, ... $(q_N, a_N)$ is the prime input command sequence corresponding to this prime directed edge.

Now that the data structure for representing and storing prime directed edges in the registers has been described, more detail is provided on the instructions 297 to 857 that execute the prime directed edge search method.

In particular, instructions 297 to 313 initialize the tape pattern in $A^{2|Q|+1}$ to all 1's. Instruction 314 begins the outer loop that iterates from state 2 up to state |Q|. This is the outer for loop in method 8.34, expressed as: For each non-halting state q in Q.

Instructions 331 to 349 copy the iterated tape pattern, starting at the register pointed to by register 68. Instruction 334 stores the value of 2|Q|+1 in register 2. Instructions 350 to 367 initialize the prospective head node state and the tape symbols. Instructions 371 to 395 initialize register 33 to the correct command (q a r b m) in the Turing command table. The current state q of the Turing machine is stored in register 65. The current tape symbol a is stored in register 66.

Instructions 396 to 408 store $(q_k, a_k)$ in the register that is pointed to by the contents of register 51. Instructions 409 to 483 execute one computational step of the Turing machine whose command table starts at register 156. Instruction 484 increments register 48 which stores the number of computational steps for this prospective prime directed edge.

Instructions 485 to 496 check to see if state $q_{k+1}$ has already been visited. If so, the program execution jumps to instruction 497. Instructions 497 to 509 store $(q_N, a_N)$ starting at the register pointed to by the contents of register 51. Instructions 510 to 550 compute the window of execution. Instructions 551 to 578 increment the tape pattern which is an element of $A^{2|Q|+1}$. This enables the program to search every element in $A^{2|Q|+1}$ as a prospective head node.

Instructions 579 to 778 copy this new prime directed edge found to the end of the prime directed edge linked list, whose data structure format has already been described.

Instructions 779 and 780 update the prime directed edge linked list pointers. Instructions 781 to 839 check if the new head node just found is the same as the head node at the end of the prime directed edge linked list. If yes, then the new prime directed edge is the same as the last one found and it is ignored.

Otherwise, the prime directed edge just found is new and so it is added to the end of the prime directed edge linked list. This is performed in instructions 840 to 854. The number of prime directed edges found so far is incremented in instruction 855.

Instructions 856 and 857 cause program execution to jump back to instruction 314, where the next tape pattern is examined to decide if the current state and the new tape pattern determine a new prime directed edge. When the tape pattern reaches all 1's again, instructions 328, 329 and 330 increment the state q and the next prime directed edge is searched for. Once all states have been exhausted up to the last state value then the program jumps to instruction 858 where the immortal periodic search method 8.36 starts.

Description 9.6

IDRM Program Implementing Immortal Periodic Search Method 8.36

After the prime directed edge search method described in 8.34 is completed, instructions 858 to 1589 of the IDRM program execute the immortal periodic point search method 8.36. Following the notation of 8.36, Φ(k) is the set of all edge sequences of length k. The IDRM program, represents $\Phi(1)$, the set of prime directed edges as a linked list where each node is in square brackets:

$[ptr_1, 2N_1, r_1, idx_1, ub_1, \text{lb\_ptr}_1, \text{idx\_ptr}_1, \text{ub\_ptr}_1, 1, w_{0,1},$
$\quad \ldots w_{idx,1} \ldots w_{ub,1}, (q_{0,1}, a_{0,1}), (q_{1,1}, a_{1,1}), \ldots, (q_{N1,1}, a_{N1,1})]$
$[ptr_2, 2N_2, r_2, idx_2, ub_2, \text{lb\_ptr}_2, \text{idx\_ptr}_2, \text{ub\_ptr}_2, 2, w_{0,2},$
$\quad \ldots w_{idx,2} \ldots w_{ub,2}, (q_{0,2}, a_{0,2}), (q_{1,2}, a_{1,2}), \ldots, (q_{N2,2}, a_{N2,2})]$
$\ldots$
$[ptr_m, 2N_m, r_m, idx_m, ub_m, \text{lb\_ptr}_m, \text{idx\_ptr}_m, \text{ub\_ptr}_m, m, w_{0,m},$
$\quad \ldots w_{idx,m} \ldots w_{ub,m}, (q_{0,m}, a_{0,m}), (q_{1,m}, a_{1,m}), \ldots, (q_{Nm,m}, a_{Nm,m})]$ The contents of register $ptr_j$ points to register $ptr_{j+1}$ m is the number of prime directed edges.

$(q_{0,j}, a_{0,j}), (q_{1,j}, a_{1,j}), \ldots, (q_{Nj,j}, a_{Nj,j})$ is the sequence of input commands corresponding to the prime directed edges that have been linked matched for this jth edge sequence. For E(1), this is just the prime input command sequence corresponding to the jth prime edge.

$2N_j$ is stored in the register following $ptr_j$ where $N_j+1$ is the number input command pairs.

$r_j$ is the state of tail node $\Gamma$ for the jth prime edge which corresponds to state r in definition 8.1.

$W_{0,j} \ldots w_{idx,j} \ldots w_{ub,j}$ represents the tape of the tail node and the tape head points to alphabet symbol $w_{idx,j}$ $idx_j$ contains the tape head index which corresponds to the index t in the tail node $\Gamma$ of definition 8.1.

$ub_j$ contains the upper bound, where the window of execution is $[0, ub_j]$

The contents of register $\text{lb\_ptr}_j$ points to the register containing tape symbol $w_{0,j}$ The contents of register $\text{idx\_ptr}_j$ points to the register containing tape symbol $w_{idx,j}$ The contents of register $\text{ub\_ptr}_j$ points to the register containing tape symbol $W_{ub,j}$ j indicates the jth prime edge.

The above representation of $\Phi(1)$ is constructed by the execution of instructions 858 to 1016 of the IDRM program. In other words, in method 8.36, the expression Set $\Phi(1)=\{E([1], 1), E([2], 1), \ldots, E([|P|], 1)\}$ is executed by instructions 858 to 1016.

In more detail, instructions 858 to 875 set up an array of m prime edge pointers. Instructions 876 and 877 test if register 0 contains m, the number of prime directed edges. Instructions 878 to 885 initialize registers so that register 33 points to the next prime directed edge pointer, register 155 points to the free heap, and register 99 points to the head node of the edge sequence linked list. Also, register 97 is initialized to 1 which stores the number of distinct prime edges composed together in every element of $\Phi(1)$ i.e. the 1 in $\Phi(1)$. Register 96 is initialized to 1 which stores at that time during program execution the number of edge sequences in $\Phi(k)$. Instructions 886 and 887 test if the program is finished with constructing $\Phi(1)$.

Instructions 888 to 903 set up the h_node, t_node, and s_node pointers. Instructions 904 to 910 store state $r_j$. Instructions 911 to 918 store $idx_j$. Instructions 919 to 926 store $ub_j$. Instructions 927 to 938 store $\text{lb\_ptr}_j$. Instructions 939 to 945 compute $\text{idx\_ptr}_j$. Instructions 946 to 951 store $\text{idx\_ptr}_j$. Instructions 952 to 957 compute $\text{ub\_ptr}_j$. Instructions 958 to 963 store $\text{ub\_ptr}_j$. Instructions 964 to 969 store $p_{1,j}$ which equals j. Instructions 970 to 987 store $w_{0,j} \ldots w_{idx,j} \ldots w_{ub,j}$.

Instructions 988 to 1004 store $(q_{0,j}, a_{0,j}), (q_{1,j}, a_{1,j}), \ldots, (q_{Nj,j}, a_{Nj,j})$. Instructions 1005 to 1016 update pointers and registers to jump back to instruction 886 and repeat this loop for the $j+1^{st}$ prime edge that is stored in 5(1).

After $\Phi(1)$ is constructed, instruction 1018 is the start of the loop where $\Phi(k+1)$ is constructed from $\Phi(k)$. Instruction 1018 corresponds to the beginning of the while loop while $(\Phi(k) \neq \emptyset)$ in method 8.36. In particular, if $\Phi(k)=\emptyset$ is executed by instructions 1021 and 1022. If $\Phi(k)=\emptyset$, then the IDRM program jumps to instruction 1551. After this the program writes "HALT" in registers 0 through 4 using the ASCII code representation. Then the IDRM program jumps to instruction 1590 which does not exist and this terminates the execution.

Instruction 1028 corresponds to the beginning of the for loop
for each $E([p_1, p_2, \ldots, p_k], k)$ in $\Phi(k)$ in method 8.36.

Instruction 1032 corresponds to the beginning of the for loop: for each prime directed edge $\Delta_j \Rightarrow \Gamma_j$ in P in method 8.36.

In regard to if $\Delta_j \Rightarrow \Gamma_j$ link matches with $\Pi_{p(k)}$ in method 8.36, instructions 1070 to 1461 test for an overlap match between the current prime edge found and the execution node $\Pi_{p(k)}$ in the loop starting at instruction 1032.

if $E([p_1, p_2, \ldots, p_k, p_{k+1}], k+1)$ contains a consecutive repeating state cycle in method 8.36 is executed in instructions 1475 to 1537 of the IDRM program. Instructions 1475 to 1537 look for a consecutive repeating state cycle in $(q_{0,j}, a_{0,j}), (q_{1,j}, a_{1,j}), \ldots, (q_{Nj,j}, a_{Nj,j})$ If a consecutive repeating state cycle is found, the program jumps to instruction 1557. Then it writes "IMMORTAL" in registers 0 through 7 using the ASCII code representation. After the program writes the length of one repeat of the consecutive repeating state cycle in register 8. After the program writes the starting register of the first repeat of the state cycle in register 9 and writes the starting register of the second repeat of the state cycle in register 10. Then the IDRM program jumps to instruction 1590 which does not exist and this terminates the execution.

Next the representation of $\Phi(k)$ in the registers of the IDRM program is discussed. Similar to $\Phi(1)$ the jth element in $\Phi(k)$ is of the form:

$[ptr_j, 2N_j, r_j, idx_j, ub_j, \text{lb\_ptr}_j, \text{idx\_ptr}_j, \text{ub\_ptr}_j, p_1, p_2, \ldots, P_k w_{0,j}, \ldots, w_{idx,j} \ldots w_{ub,j}, (q_{0,j}, a_{0,j}), (q_{1,j}, a_{1,j}), \ldots, (q_{Nj,j}, a_{Nj,j})]$ k is the number prime directed edges composed together.

$2N_j$ is stored in the register following $ptr_j$ where $N_j+1$ is the number input command pairs corresponding to the edge sequence if $E([p_1, p_2, \ldots, p_k], k)$ in 8.28.

$r_j$ is the state of the execution node $\Pi_{p(k)}$ as defined in 8.26, 8.27, and 8.28.

$idx_j$ contains the tape head index of the execution node $\Pi_{p(k)}$ $ub_j$ contains the upper bound of the tape of the execution node $\Pi_{p(k)}$ The contents of register $\text{lb\_ptr}_j$ points to the register containing tape symbol $w_{0,j}$ The contents of register $\text{idx\_ptr}_j$ points to the register containing tape symbol $w_{idx,j}$ The contents of register $\text{ub\_ptr}_j$ points to the register containing tape symbol $w_{ub,j}$ $p_1, p_2, \ldots p_k$ records the sequence of prime directed edges that were link matched. Each $p_j$ is determined by its pe_number stored in the prime edge linked list.

$w_{0,j} \ldots w_{idx,j} \ldots w_{ub,j}$ represents the tape of the execution node and the tape head points to alphabet symbol $w_{idx,j}$ $(q_{0,j}, a_{0,j}), (q_{1,j}, a_{1,j}), \ldots, (q_{Nj,j}, a_{Nj,j})$ is the composition of the prime input command sequences corresponding to the prime directed edges $p_1, p_2, \ldots, p_k$ that were link matched as described in definition 8.4.

IMMORTALITY DYNAMIC REGISTER MACHINE PROGRAM SECTION 10

This section presents a complete formal description of a dynamic register machine program, called the IDRM, that determines for a periodic Turing Machine, whether it is a halting machine or contains an immortal periodic configuration. This embodiment of a computing system is achieved with a program composed of 1590 instructions that are selected from the Constant (C m n), Successor (S m), Transfer (T m n), Address (A m n), Jump (J m n q), Delete (D m n), and Update (U m n q) Instructions. Mathematical concepts and computational methods are described in sections 1 through 8. The dynamic register machine instructions and program execution were described in section 0. The design of this program has been described in section 9.

Due to the lack of space and USPTO font requirements, the program comments are listed first rather than next to or above the program instruction, which is a common practice in computer programs.

In instruction number 0, register 0 stores the register number of the terminating zero register that indicates the end of the Turing program. In instruction number 3, register 21 stores the jump address which is 6. In instruction number 3, check if terminating zero register contains zero. If not, exit IDRM program with ERROR in TURING PROGRAM.

In instruction 6, the terminating zero register is ok. Now check that this register number is >156 where stored the Turing program begins. In instruction 10, test if terminating register <=156, then exit ERROR TURING PROGRAM. In instruction number 14, register 21 stores the jump address. In instruction 16, prepare to find the maximum alphabet and state values in Turing program, In instruction 17, register 30 stores the maximum alphabet value. In instruction 18, register 29 stores the maximum state value.

In instruction 21, register 34 contains state q in Turing command (q a r b m). In instruction 23, register 35 contains alphabet symbol a in Turing command (q a r b m). In instruction number 25, register 36 contains state r in Turing command (q a r b m). In instruction number 27, register 37 contains alphabet symbol b in Turing command (q a r b m). In instruction 29, register 38 contains move symbol m in Turing command (q a r b m). In instruction 31, if state q=0, then end of valid Turing program or invalid program. In instruction 33, store new state value from Turing program in register 0. In instruction 34, register 29 contains the current maximum state value. In instruction 35, register 20 stores the continue address 38 after the maximum subroutine exit.

Instructions 36 and 37 jump to program instruction 109 where the maximum subroutine starts. Instruction 38 copies the new maximum state value from register 2 into register 29. In instructions 41 and 42, if alphabet symbol a=0 in (q a r b m), then jump to instruction 1570 where "Error Turing program" is written to registers 0 through 19 in ASCII format.

In instruction 42, store new alphabet a value in (q a r b m) from Turing program in register 0. In instruction 43, store current maximum alphabet value in register 1. In instruction 44, register 20 stores the continue address 47 after max subroutine exit. In instruction 46, jump to program instruction 109 where the max subroutine starts. In instruction 47, copy new maximum alphabet value from register 2 into register 30.

In instructions 49 and 50, if state value r=0, (q a r b m), exit with ERROR. It is an invalid Turing program. In instruction 51, store current state r from Turing command in register 0. In instruction 51, store maximum state in register 0. In instruction 53, register 20 stores the continue address 56 after max subroutine exit. In instruction 56, copy new maximum state value from register 2 into register 29. In instruction 59, if symbol b=0, in (q a r b m) exit with ERROR, Invalid Turing program.

In instruction 60, store new alphabet "b" value in (q a r b m) from Turing program in register 0. In instruction 61, store current maximum alphabet value in register 1. In instruction 64, jump to program instruction 109 where the max subroutine starts. In instruction 65, copy new maximum alphabet value from register 2 into register 30. In instruction 68, check if move symbol m=1, LEFT move, in (q a r b m). In instruction 71, check if move symbol m=2, RIGHT move, in (q a r b m).

In instruction 72, if an invalid move symbol, exit with ERROR. Invalid Turing program In instruction 74, increment reg 33 to indirectly point to q in next (q a r b m) command. In instruction 76, jump to Line 21 to start checking the next command (q a r b m). In instruction 77, Turing program commands start at register 156.

Starting at instruction 78, now that maximum state and alphabet values are determined use these in a state and alphabet loop to check that there is a valid Turing program starting at register 156. In instruction 83, start Q_count loop. Q_COUNT is iterated from 2 to MAX Q. The halt state is represented with 1, so Q_COUNT is initialized to 2. In instruction 87, the start of alphabet A_COUNT loop. The alphabet symbols ranges from 1 to |A|=MAX_A. In instruction 90, store q from (q a r b m) command in register 34. In instruction 92, store a in command (q a r b m) in register 35.

In instruction 98, check that q=Q_COUNT in register 23. In instruction 100, if (q!=Q_COUNT), then it is an invalid Turing program. Exit with ERROR. In instruction 102, check that a=A_COUNT in register 25. In instruction 104, if (a!=A_COUNT), then it is an invalid Turing program. Exit with ERROR.

In instruction 105, register 18 stores the number of insert instructions for Update (U m 18 q). In instruction 106, register 19 stores the number of instructions to delete in (D m 19). In instruction 107, line 127 is where the A_OFFSETS program is located. In instruction 108, jump to A_offsets.

Starting at instruction 109, the MAXIMUM program, compares registers 0 and 1. It returns the maximum of registers 0 and 1 in register 2.

The A_offsets are determined and stored by instructions 127 to 153. In particular, the A_offsets A_2, A_3, ..., A_|Q| are stored at (R (R 39)), (R (+ (R 39) 1)), and so on. In instruction 128, register 156 contains 2 which is the first Turing command (2 1 r b m) in a valid Turing program. In instruction 135, offset A_k is stored in the next register, with A_2 in (R (R 39)). In instruction 138, add 5 to register 0 so that it points to the next Turing command (q a r b m).

Instructions 154 to 296 set up a scratch pad of registers to execute prime directed edge search method 8.34 described in section 8. Instructions 154 to 167 set up registers to record the prime input command sequence. Instructions 168 to 190 set up registers to record current prospective head node. Instructions 191 to 212 set up registers to record the current prospective tail node. Instructions 213 to 233 set up registers to record the execution tape during the computation of a prospective prime directed edge.

Instructions 234 to 254 set up registers to store an iteration tape, which is used to iterate through every tape patter in $A^{2|Q|+1}$. Instructions 255 to 265 set up registers to record the tape head moves during computation of the prospective prime edge. Instructions 266 to 292 set up registers to compute the window of execution.

Instructions 293 to 296 set up memory pointers to record the number of prime edges found so far and store a linked list of prime edges. In Instruction 296 a free heap pointer is stored in register 155. Instructions 297 to 858 perform the Prime directed edge search method as defined in 8.34 Instructions 297 to 313 initialize the tape $A^{2|Q|+1}$ to all 1's. Instructions 331 to 349 copy the iterated tape pattern, starting at the register pointed to by register 68. Instruction 334 stores the value of 2|Q|+1 in register 2. Instructions 350 to 367 initialize the prospective head node state and the tape symbols. Instructions 371 to 395 initialize register 33 to the correct command (q a r b m) in the Turing command table. The current state q of the Turing machine is stored in register 65. The current tape symbol a is stored in register 66. Instructions 396 to 408 store $(q_k, a_k)$ in the register that is pointed to by the contents of register 51. Instructions 409 to 483 execute one computational step of the Turing machine whose command table starts at register 156.

Instruction 484 increments register 48 which stores the number of computational steps for this prospective prime directed edge. Instructions 485 to 496 check to see if state $q_k+_1$ has already been visited. If state $q_{k+1}$ has already been visited, jump to 497.

Instructions 497 to 509 store $(q_N, a_N)$ starting at the register pointed to by the contents of register 51. Instructions 510 to 550 compute the window of execution. Instructions 551 to 578 increment the tape pattern which is an element of $A^{2|Q|+1}$. This enables the program to search every element in $A^{2|Q|+1}$ as a prospective head node.

Instructions 579 to 778 copy this new prime directed edge found to the end of the prime directed edge linked list. Instructions 779 and 780 update the prime directed edge linked list pointers. Instructions 781 to 839 check if the new head node just found is the same as the head node at the end of the prime directed edge linked list. If yes, then the new prime directed edge is the same as the last one found and it is ignored.

The prime directed edge just found is new and so it is added to the end of the primed directed edge linked list. This occurs in instructions 840 to 854. The number of prime directed edges found so far is incremented and stored in register 81. In instruction 857, Jump back to instruction 314 where the next tape pattern is examined to decide if the current state and new tape pattern determine a new prime directed edge. Instructions 858 to 875 set up an array of m prime edge pointers.

Instructions 876, 877 test if register 0 contains m, the number of prime directed edges. Instructions 878 to 885 initialize registers so that register 33 points to the next prime directed edge pointer, register 155 points to the free heap, and register 99 points to the head node of the edge sequence linked list. In instruction 884, Register 96 stores the number of current edge sequences in E(k). In instruction 885, register 97 is initialized to 1 and stores the number of distinct prime edges composed together in every element of E(1).

Instructions 888 to 903 set up the h_node, t_node and s_node pointers. Instructions 904 to 910 store state r_j. Instructions 911 to 918 store idx_j. Instructions 919 to 926 store ub_j. Instructions 927 to 938 store lb_ptr_j. Instructions 939 to 945 compute idx_ptr_j. Instructions 946 to 951 store idx_ptr_j. Instructions 952 to 957 compute ub_ptr_j. Instructions 958 to 963 store ub_ptr_j. Instructions 964 to 969 store $p_{1,j}$ which equals j. Instructions 970 to 987 store $w_{0,j}$ ... $w_{idx,j}$ ... $w_{ub,j}$. Instructions 988 to 1004 store $(q_{0,j}, a_{0,j})$ ... $(q_{Nj,j}, a_{Nj,j})$. Instructions 1005 to 1016 update pointers and pointers to jump back to instruction 886. In instructions 1015 and 1016, the program jumps back to instruction 886 and repeats this loop for the j+1st prime edge that is stored in E(1). Instruction 1018 is the start of the loop where E(k+1) is constructed from E(k). In instructions 1021 and 1022, check if E(k)=empty set i.e. if the number of edge sequences=0. If E(k)=empty set, jump to instruction 1551 and write HALT, using the ASCII representation, in registers 0 to 4.

Instruction 1028 corresponds to the start of for loop: for each E([$p_1, p_2, \ldots p_k$], k) in E(k) in method 8.34. Instruction 1032 is the beginning of the for loop: for each prime directed edge $(\Delta_j \Rightarrow \Gamma_j)$ in prime edge set P if $\Delta_j \Rightarrow \Gamma_j$ link matches with $\Pi_{p(k)}$ then in method 8.34 is executed starting at instruction 1070. Instructions 1070 to 1461 test for an overlap match between the current prime edge found in the loop beginning at instruction 1032 and the execution node. Instructions 1475 to 1537 search for a consecutive repeating state cycle in $(q_{0,j}, a_{0,j}), (q_{1,j}, a_{1,j}) \ldots (q_{Nj,j}, a_{Nj,j})$. if E([$p_1, p_2, \ldots, p_k$], k+1) contains a consecutive repeating state cycle, as stated in 8.34, is executed in instructions 1475 to 1537.

Instruction 1551 is reached if the Turing machine was valid and it is a halting machine. Instruction 1551 stores "H" in register 0. ASCII code 72="H". Instruction 1552 stores "A" in register 1. ASCII code 65="A". Instruction 1553 stores "L" in register 2. ASCII code 76="L". Instruction 1554 stores "T" in register 3. ASCII code 84="T". Instruction 1555 stores address 1590 in register 21. And instruction 1556 jumps to end of the IDRM program.

Instruction 1557 is reached if the Turing machine was valid and it has an immortal periodic point. Instruction 1557 stores "I" in register 0. ASCII code 73="I". Instruction 1558 stores "M" in register 1. ASCII code 77="M". Instruction 1559 stores "M" in register 2. ASCII code 77="M". Instruction 1560 stores "O" in register 3. ASCII code 79="O". Instruction 1561 stores "R" in register 4. ASCII code 82="R". Instruction 1562 stores "T" in register 5. ASCII code 84="T". Instruction 1563 stores "A" in register 6. ASCII code 65="A". Instruction 1564 stores "L" in register 7. ASCII code 76="L". Instruction 1565 stores the length of one repeat of the consecutive repeating state cycle. Instruction 1566 stores the register where the first repeat of the state cycle begins. Instruction 1567 stores the register where the second repeat of the state cycle begins. Instruction 1568 stores address 1590 in register 21. Instruction 1569 jumps to the end of the IDRM program.

Instruction 1570 is reached if the Turing program is in an invalid format. Instruction 1570 stores "E" in register 0. ASCII code 69="E". Instruction 1571 stores "R" in register 1. ASCII code 82="R". Instruction 1572 stores "R" in register 2. ASCII code 82="R". Instruction 1573 stores "O" in register 3. ASCII code 79="O". Instruction 1574 stores "R" in register 4. ASCII code 82="R". Instruction 1575 stores " " in register 5. ASCII code 32=" ". Instructions 1576 through 1589 store "TURING PROGRAM" in registers 6 through 19, using ASCII format as described in the previous instructions.

The complete IDRM program description starts on the next page. The first column shows the instruction number starting at 0. The second column shows the dynamic register machine instruction.

| Number | Instruction |
| --- | --- |
| 0 | (A 1 0) |
| 1 | (C 2 0) |
| 2 | (C 21 6) |
| 3 | (J 1 2 21) |
| 4 | (C 21 1570) |

-continued

| Number | Instruction |
|---|---|
| 5 | (J 0 0 21) |
| 6 | (T 9 0) |
| 7 | (C 33 156) |
| 8 | (C 1 0) |
| 9 | (C 21 1570) |
| 10 | (J 1 9 21) |
| 11 | (C 21 16) |
| 12 | (J 1 33 21) |
| 13 | (S 1) |
| 14 | (C 21 9) |
| 15 | (J 0 0 21) |
| 16 | (C 26 1) |
| 17 | (C 30 0) |
| 18 | (C 29 0) |
| 19 | (C 31 0) |
| 20 | (C 32 0) |
| 21 | (A 34 33) |
| 22 | (S 33) |
| 23 | (A 35 33) |
| 24 | (S 33) |
| 25 | (A 36 33) |
| 26 | (S 33) |
| 27 | (A 37 33) |
| 28 | (S 33) |
| 29 | (A 38 33) |
| 30 | (C 0 0) |
| 31 | (C 21 77) |
| 32 | (J 34 0 21) |
| 33 | (T 0 34) |
| 34 | (T 1 29) |
| 35 | (C 20 38) |
| 36 | (C 21 109) |
| 37 | (J 0 0 21) |
| 38 | (T 29 2) |
| 39 | (C 0 0) |
| 40 | (C 21 1570) |
| 41 | (J 35 0 21) |
| 42 | (T 0 35) |
| 43 | (T 1 30) |
| 44 | (C 20 47) |
| 45 | (C 21 109) |
| 46 | (J 0 0 21) |
| 47 | (T 30 2) |
| 48 | (C 0 0) |
| 49 | (C 21 1570) |
| 50 | (J 36 0 21) |
| 51 | (T 0 36) |
| 52 | (T 1 29) |
| 53 | (C 20 56) |
| 54 | (C 21 109) |
| 55 | (J 0 0 21) |
| 56 | (T 29 2) |
| 57 | (C 0 0) |
| 58 | (C 21 1570) |
| 59 | (J 37 0 21) |
| 60 | (T 0 37) |
| 61 | (T 1 30) |
| 62 | (C 20 65) |
| 63 | (C 21 109) |
| 64 | (J 0 0 21) |
| 65 | (T 30 2) |
| 66 | (C 0 1) |
| 67 | (C 21 74) |
| 68 | (J 38 0 21) |
| 69 | (C 0 2) |
| 70 | (C 21 74) |
| 71 | (J 38 0 21) |
| 72 | (C 21 1570) |
| 73 | (J 0 0 21) |
| 74 | (S 33) |
| 75 | (C 21 21) |
| 76 | (J 0 0 21) |
| 77 | (C 33 156) |
| 78 | (C 23 1) |
| 79 | (T 8 29) |
| 80 | (S 8) |
| 81 | (T 9 30) |

-continued

| Number | Instruction |
|---|---|
| 82 | (S 9) |
| 83 | (S 23) |
| 84 | (C 21 105) |
| 85 | (J 23 8 21) |
| 86 | (C 25 0) |
| 87 | (S 25) |
| 88 | (C 21 83) |
| 89 | (J 25 9 21) |
| 90 | (A 34 33) |
| 91 | (S 33) |
| 92 | (A 35 33) |
| 93 | (S 33) |
| 94 | (S 33) |
| 95 | (S 33) |
| 96 | (S 33) |
| 97 | (C 21 101) |
| 98 | (J 34 23 21) |
| 99 | (C 21 1570) |
| 100 | (J 0 0 21) |
| 101 | (C 21 87) |
| 102 | (J 35 25 21) |
| 103 | (C 21 1570) |
| 104 | (J 0 0 21) |
| 105 | (C 18 1) |
| 106 | (C 19 1) |
| 107 | (C 21 127) |
| 108 | (J 9 9 21) |
| 109 | (C 21 125) |
| 110 | (J 0 1 21) |
| 111 | (C 2 0) |
| 112 | (J 1 2 21) |
| 113 | (C 21 122) |
| 114 | (J 0 2 21) |
| 115 | (S 2) |
| 116 | (C 21 122) |
| 117 | (J 0 2 21) |
| 118 | (C 21 125) |
| 119 | (J 1 2 21) |
| 120 | (C 21 115) |
| 121 | (J 0 0 21) |
| 122 | (T 2 1) |
| 123 | (C 21 126) |
| 124 | (J 0 0 21) |
| 125 | (T 2 0) |
| 126 | (J 0 0 20) |
| 127 | (T 39 33) |
| 128 | (C 0 156) |
| 129 | (T 1 30) |
| 130 | (C 23 1) |
| 131 | (C 5 2) |
| 132 | (T 6 33) |
| 133 | (C 7 0) |
| 134 | (C 22 136) |
| 135 | (U 5 18 22) |
| 136 | (D 22 19) |
| 137 | (C 2 0) |
| 138 | (S 0) |
| 139 | (S 0) |
| 140 | (S 0) |
| 141 | (S 0) |
| 142 | (S 0) |
| 143 | (S 2) |
| 144 | (C 21 148) |
| 145 | (J 1 2 21) |
| 146 | (C 21 138) |
| 147 | (J 1 1 21) |
| 148 | (S 33) |
| 149 | (S 23) |
| 150 | (C 21 154) |
| 151 | (J 23 29 21) |
| 152 | (C 21 131) |
| 153 | (J 0 0 21) |
| 154 | (S 33) |
| 155 | (T 48 33) |
| 156 | (S 33) |
| 157 | (T 50 33) |
| 158 | (C 0 0) |

-continued

| Number | Instruction |
|---|---|
| 159 | (T 1 29) |
| 160 | (S 1) |
| 161 | (S 0) |
| 162 | (S 33) |
| 163 | (S 33) |
| 164 | (C 21 168) |
| 165 | (J 0 1 21) |
| 166 | (C 21 161) |
| 167 | (J 0 0 21) |
| 168 | (S 33) |
| 169 | (T 56 33) |
| 170 | (C 0 1) |
| 171 | (C 28 0) |
| 172 | (T 1 29) |
| 173 | (S 0) |
| 174 | (S 28) |
| 175 | (S 33) |
| 176 | (C 21 180) |
| 177 | (J 0 1 21) |
| 178 | (C 21 173) |
| 179 | (J 0 0 21) |
| 180 | (T 57 33) |
| 181 | (C 0 1) |
| 182 | (T 1 29) |
| 183 | (S 0) |
| 184 | (S 28) |
| 185 | (S 33) |
| 186 | (C 21 190) |
| 187 | (J 0 1 21) |
| 188 | (C 21 183) |
| 189 | (J 0 0 21) |
| 190 | (T 58 33) |
| 191 | (S 28) |
| 192 | (S 33) |
| 193 | (S 33) |
| 194 | (T 62 33) |
| 195 | (C 0 1) |
| 196 | (T 1 29) |
| 197 | (S 0) |
| 198 | (S 33) |
| 199 | (C 21 203) |
| 200 | (J 0 1 21) |
| 201 | (C 21 197) |
| 202 | (J 0 0 21) |
| 203 | (T 63 33) |
| 204 | (C 0 1) |
| 205 | (T 1 29) |
| 206 | (S 0) |
| 207 | (S 33) |
| 208 | (C 21 212) |
| 209 | (J 0 1 21) |
| 210 | (C 21 206) |
| 211 | (J 0 0 21) |
| 212 | (T 64 33) |
| 213 | (S 33) |
| 214 | (S 33) |
| 215 | (T 68 33) |
| 216 | (C 0 1) |
| 217 | (T 1 29) |
| 218 | (S 0) |
| 219 | (S 33) |
| 220 | (C 21 224) |
| 221 | (J 0 1 21) |
| 222 | (C 21 218) |
| 223 | (J 0 0 21) |
| 224 | (T 69 33) |
| 225 | (C 0 1) |
| 226 | (T 1 29) |
| 227 | (S 0) |
| 228 | (S 33) |
| 229 | (C 21 233) |
| 230 | (J 0 1 21) |
| 231 | (C 21 227) |
| 232 | (J 0 0 21) |
| 233 | (T 70 33) |
| 234 | (S 33) |
| 235 | (S 33) |

-continued

| Number | Instruction |
|---|---|
| 236 | (T 72 33) |
| 237 | (C 0 1) |
| 238 | (T 1 29) |
| 239 | (S 0) |
| 240 | (S 33) |
| 241 | (C 21 245) |
| 242 | (J 0 1 21) |
| 243 | (C 21 239) |
| 244 | (J 0 0 21) |
| 245 | (T 73 33) |
| 246 | (C 0 1) |
| 247 | (T 1 29) |
| 248 | (S 0) |
| 249 | (S 33) |
| 250 | (C 21 254) |
| 251 | (J 0 1 21) |
| 252 | (C 21 248) |
| 253 | (J 0 0 21) |
| 254 | (T 74 33) |
| 255 | (S 33) |
| 256 | (S 33) |
| 257 | (T 46 33) |
| 258 | (C 0 0) |
| 259 | (T 1 29) |
| 260 | (S 0) |
| 261 | (S 33) |
| 262 | (C 21 266) |
| 263 | (J 0 1 21) |
| 264 | (C 21 260) |
| 265 | (J 0 0 21) |
| 266 | (S 33) |
| 267 | (S 33) |
| 268 | (T 43 33) |
| 269 | (C 0 0) |
| 270 | (T 1 28) |
| 271 | (C 2 1) |
| 272 | (C 5 2) |
| 273 | (C 7 0) |
| 274 | (T 6 33) |
| 275 | (C 22 277) |
| 276 | (U 5 18 22) |
| 277 | (D 22 19) |
| 278 | (S 0) |
| 279 | (S 2) |
| 280 | (S 33) |
| 281 | (C 21 290) |
| 282 | (J 0 1 21) |
| 283 | (C 21 287) |
| 284 | (J 2 29 21) |
| 285 | (C 21 274) |
| 286 | (J 0 0 21) |
| 287 | (T 44 33) |
| 288 | (C 21 274) |
| 289 | (J 0 0 21) |
| 290 | (S 33) |
| 291 | (S 33) |
| 292 | (A 27 44) |
| 293 | (C 81 0) |
| 294 | (T 83 33) |
| 295 | (T 85 33) |
| 296 | (T 155 33) |
| 297 | (C 71 1) |
| 298 | (C 3 1) |
| 299 | (T 2 72) |
| 300 | (C 0 0) |
| 301 | (T 1 28) |
| 302 | (C 5 2) |
| 303 | (C 7 3) |
| 304 | (T 6 2) |
| 305 | (C 22 307) |
| 306 | (U 5 18 22) |
| 307 | (D 22 19) |
| 308 | (S 0) |
| 309 | (S 2) |
| 310 | (C 21 314) |
| 311 | (J 0 1 21) |
| 312 | (C 21 304) |

-continued

| Number | Instruction |
|---|---|
| 313 | (J 0 0 21) |
| 314 | (C 0 1) |
| 315 | (T 33 72) |
| 316 | (C 1 0) |
| 317 | (C 21 328) |
| 318 | (J 1 28 21) |
| 319 | (A 3 33) |
| 320 | (C 21 324) |
| 321 | (J 0 3 21) |
| 322 | (C 21 331) |
| 323 | (J 0 0 21) |
| 324 | (S 1) |
| 325 | (S 33) |
| 326 | (C 21 317) |
| 327 | (J 0 0 21) |
| 328 | (C 21 858) |
| 329 | (J 71 29 21) |
| 330 | (S 71) |
| 331 | (T 65 71) |
| 332 | (T 0 68) |
| 333 | (T 1 72) |
| 334 | (T 2 28) |
| 335 | (C 3 0) |
| 336 | (C 5 2) |
| 337 | (C 21 349) |
| 338 | (J 2 3 21) |
| 339 | (T 6 0) |
| 340 | (T 7 1) |
| 341 | (C 22 343) |
| 342 | (U 5 18 22) |
| 343 | (D 22 19) |
| 344 | (S 0) |
| 345 | (S 1) |
| 346 | (S 3) |
| 347 | (C 21 337) |
| 348 | (J 0 0 21) |
| 349 | (A 66 73) |
| 350 | (T 53 65) |
| 351 | (T 0 56) |
| 352 | (T 1 72) |
| 353 | (T 2 28) |
| 354 | (C 3 0) |
| 355 | (C 5 2) |
| 356 | (C 21 368) |
| 357 | (J 2 3 21) |
| 358 | (T 6 0) |
| 359 | (T 7 1) |
| 360 | (C 22 362) |
| 361 | (U 5 18 22) |
| 362 | (D 22 19) |
| 363 | (S 0) |
| 364 | (S 1) |
| 365 | (S 3) |
| 366 | (C 21 356) |
| 367 | (J 0 0 21) |
| 368 | (C 48 0) |
| 369 | (T 67 69) |
| 370 | (T 51 50) |
| 371 | (C 21 551) |
| 372 | (J 65 26 21) |
| 373 | (C 0 2) |
| 374 | (T 33 39) |
| 375 | (C 21 381) |
| 376 | (J 65 0 21) |
| 377 | (S 0) |
| 378 | (S 33) |
| 379 | (C 21 375) |
| 380 | (J 0 0 21) |
| 381 | (A 0 33) |
| 382 | (T 33 0) |
| 383 | (T 1 33) |
| 384 | (S 1) |
| 385 | (A 35 1) |
| 386 | (C 21 395) |
| 387 | (J 35 66 21) |
| 388 | (S 33) |
| 389 | (S 33) |

-continued

| Number | Instruction |
|---|---|
| 390 | (S 33) |
| 391 | (S 33) |
| 392 | (S 33) |
| 393 | (C 21 383) |
| 394 | (J 0 0 21) |
| 395 | (T 47 46) |
| 396 | (C 5 2) |
| 397 | (T 6 51) |
| 398 | (C 7 65) |
| 399 | (C 22 401) |
| 400 | (U 5 18 22) |
| 401 | (D 22 19) |
| 402 | (S 51) |
| 403 | (T 6 51) |
| 404 | (T 7 67) |
| 405 | (C 22 407) |
| 406 | (U 5 18 22) |
| 407 | (D 22 19) |
| 408 | (S 51) |
| 409 | (A 34 33) |
| 410 | (S 33) |
| 411 | (A 35 33) |
| 412 | (S 33) |
| 413 | (A 36 33) |
| 414 | (S 33) |
| 415 | (A 37 33) |
| 416 | (S 33) |
| 417 | (A 38 33) |
| 418 | (A 66 67) |
| 419 | (C 21 423) |
| 420 | (J 66 35 21) |
| 421 | (C 21 1570) |
| 422 | (J 0 0 21) |
| 423 | (T 65 36) |
| 424 | (T 66 37) |
| 425 | (C 5 2) |
| 426 | (T 6 67) |
| 427 | (C 7 37) |
| 428 | (C 22 430) |
| 429 | (U 5 18 22) |
| 430 | (D 22 19) |
| 431 | (C 21 551) |
| 432 | (J 65 26 21) |
| 433 | (C 5 2) |
| 434 | (T 6 47) |
| 435 | (C 7 4) |
| 436 | (C 0 1) |
| 437 | (C 21 446) |
| 438 | (J 38 0 21) |
| 439 | (S 67) |
| 440 | (C 4 2) |
| 441 | (C 22 443) |
| 442 | (U 5 18 22) |
| 443 | (D 22 19) |
| 444 | (C 21 460) |
| 445 | (J 0 0 21) |
| 446 | (C 4 1) |
| 447 | (C 22 449) |
| 448 | (U 5 18 22) |
| 449 | (D 22 19) |
| 450 | (T 0 68) |
| 451 | (T 1 0) |
| 452 | (S 1) |
| 453 | (C 21 459) |
| 454 | (J 1 67 21) |
| 455 | (S 1) |
| 456 | (S 0) |
| 457 | (C 21 453) |
| 458 | (J 0 0 21) |
| 459 | (T 67 0) |
| 460 | (S 47) |
| 461 | (A 66 67) |
| 462 | (C 0 2) |
| 463 | (T 33 39) |
| 464 | (C 21 470) |
| 465 | (J 65 0 21) |
| 466 | (S 0) |

-continued

| Number | Instruction |
|---|---|
| 467 | (S 33) |
| 468 | (C 21 464) |
| 469 | (J 0 0 21) |
| 470 | (A 0 33) |
| 471 | (T 33 0) |
| 472 | (T 1 33) |
| 473 | (S 1) |
| 474 | (A 35 1) |
| 475 | (C 21 484) |
| 476 | (J 66 35 21) |
| 477 | (S 33) |
| 478 | (S 33) |
| 479 | (S 33) |
| 480 | (S 33) |
| 481 | (S 33) |
| 482 | (C 21 472) |
| 483 | (J 0 0 21) |
| 484 | (S 48) |
| 485 | (C 1 1) |
| 486 | (T 52 50) |
| 487 | (A 0 52) |
| 488 | (C 21 497) |
| 489 | (J 0 65 21) |
| 490 | (C 21 396) |
| 491 | (J 1 48 21) |
| 492 | (S 52) |
| 493 | (S 52) |
| 494 | (S 1) |
| 495 | (C 21 487) |
| 496 | (J 0 0 21) |
| 497 | (C 5 2) |
| 498 | (T 6 51) |
| 499 | (C 7 65) |
| 500 | (C 22 502) |
| 501 | (U 5 18 22) |
| 502 | (D 22 19) |
| 503 | (S 51) |
| 504 | (T 6 51) |
| 505 | (C 7 66) |
| 506 | (C 22 508) |
| 507 | (U 5 18 22) |
| 508 | (D 22 19) |
| 509 | (S 51) |
| 510 | (T 47 46) |
| 511 | (T 40 44) |
| 512 | (T 41 44) |
| 513 | (T 45 44) |
| 514 | (C 1 1) |
| 515 | (C 2 2) |
| 516 | (C 3 0) |
| 517 | (A 0 47) |
| 518 | (C 21 529) |
| 519 | (J 0 1 21) |
| 520 | (C 21 525) |
| 521 | (J 41 4521) |
| 522 | (S 45) |
| 523 | (C 21 545) |
| 524 | (J 0 0 21) |
| 525 | (S 45) |
| 526 | (S 41) |
| 527 | (C 21 545) |
| 528 | (J 0 0 21) |
| 529 | (T 9 45) |
| 530 | (C 4 1) |
| 531 | (A 5 45) |
| 532 | (T 6 43) |
| 533 | (C 21 539) |
| 534 | (J 4 5 21) |
| 535 | (S 4) |
| 536 | (S 6) |
| 537 | (C 21 533) |
| 538 | (J 0 0 21) |
| 539 | (T 45 6) |
| 540 | (C 21 544) |
| 541 | (J 40 9 21) |
| 542 | (C 21 545) |
| 543 | (J 0 0 21) |

-continued

| Number | Instruction |
|---|---|
| 544 | (T 40 45) |
| 545 | (S 3) |
| 546 | (S 47) |
| 547 | (C 21 551) |
| 548 | (J 48 3 21) |
| 549 | (C 21 517) |
| 550 | (J 0 0 21) |
| 551 | (T 33 72) |
| 552 | (C 0 0) |
| 553 | (T 1 28) |
| 554 | (A 2 33) |
| 555 | (C 21 579) |
| 556 | (J 0 1 21) |
| 557 | (C 21 568) |
| 558 | (J 2 30 21) |
| 559 | (S 2) |
| 560 | (C 5 2) |
| 561 | (T 6 33) |
| 562 | (C 7 2) |
| 563 | (C 22 565) |
| 564 | (U 5 18 22) |
| 565 | (D 22 19) |
| 566 | (C 21 579) |
| 567 | (J 0 0 21) |
| 568 | (C 5 2) |
| 569 | (T 6 33) |
| 570 | (C 2 1) |
| 571 | (C 7 2) |
| 572 | (C 22 574) |
| 573 | (U 5 18 22) |
| 574 | (D 22 19) |
| 575 | (S 0) |
| 576 | (S 33) |
| 577 | (C 21 554) |
| 578 | (J 0 0 21) |
| 579 | (C 21 856) |
| 580 | (J 65 26 21) |
| 581 | (T 82 81) |
| 582 | (S 82) |
| 583 | (T 33 85) |
| 584 | (S 33) |
| 585 | (C 5 2) |
| 586 | (T 6 33) |
| 587 | (C 7 82) |
| 588 | (C 22 590) |
| 589 | (U 5 18 22) |
| 590 | (D 22 19) |
| 591 | (S 33) |
| 592 | (T 88 33) |
| 593 | (S 33) |
| 594 | (T 89 33) |
| 595 | (S 33) |
| 596 | (T 90 33) |
| 597 | (S 33) |
| 598 | (C 42 0) |
| 599 | (C 54 0) |
| 600 | (C 60 0) |
| 601 | (T 0 40) |
| 602 | (C 21 606) |
| 603 | (J 0 44 21) |
| 604 | (C 21 607) |
| 605 | (J 0 0 21) |
| 606 | (T 54 42) |
| 607 | (C 21 611) |
| 608 | (J 0 45 21) |
| 609 | (C 21 612) |
| 610 | (J 0 0 21) |
| 611 | (T 60 42) |
| 612 | (C 21 618) |
| 613 | (J 0 41 21) |
| 614 | (S 42) |
| 615 | (S 0) |
| 616 | (C 21 602) |
| 617 | (J 0 0 21) |
| 618 | (C 5 2) |
| 619 | (T 6 33) |
| 620 | (C 7 42) |

-continued

| Number | Instruction |
|---|---|
| 621 | (C 22 623) |
| 622 | (U 5 18 22) |
| 623 | (D 22 19) |
| 624 | (S 33) |
| 625 | (C 5 2) |
| 626 | (T 6 33) |
| 627 | (C 7 71) |
| 628 | (C 22 630) |
| 629 | (U 5 18 22) |
| 630 | (D 22 19) |
| 631 | (C 5 2) |
| 632 | (T 6 88) |
| 633 | (C 7 33) |
| 634 | (C 22 636) |
| 635 | (U 5 18 22) |
| 636 | (D 22 19) |
| 637 | (S 33) |
| 638 | (C 5 2) |
| 639 | (T 6 33) |
| 640 | (C 7 54) |
| 641 | (C 22 643) |
| 642 | (U 5 18 22) |
| 643 | (D 22 19) |
| 644 | (S 33) |
| 645 | (T 55 33) |
| 646 | (S 33) |
| 647 | (T 77 33) |
| 648 | (T 78 56) |
| 649 | (C 0 0) |
| 650 | (A 1 40) |
| 651 | (C 21 657) |
| 652 | (J 0 1 21) |
| 653 | (S 0) |
| 654 | (S 78) |
| 655 | (C 21 651) |
| 656 | (J 0 0 21) |
| 657 | (T 2 42) |
| 658 | (S 2) |
| 659 | (C 1 0) |
| 660 | (C 5 2) |
| 661 | (C 21 676) |
| 662 | (J 54 1 21) |
| 663 | (C 21 683) |
| 664 | (J 2 1 21) |
| 665 | (T 6 77) |
| 666 | (T 7 78) |
| 667 | (C 22 669) |
| 668 | (U 5 18 22) |
| 669 | (D 22 19) |
| 670 | (S 77) |
| 671 | (S 78) |
| 672 | (S 33) |
| 673 | (S 1) |
| 674 | (C 21 661) |
| 675 | (J 0 0 21) |
| 676 | (T 6 55) |
| 677 | (C 7 77) |
| 678 | (C 22 680) |
| 679 | (U 5 18 22) |
| 680 | (D 22 19) |
| 681 | (C 21 663) |
| 682 | (J 0 0 21) |
| 683 | (C 5 2) |
| 684 | (T 6 33) |
| 685 | (C 7 65) |
| 686 | (C 22 688) |
| 687 | (U 5 18 22) |
| 688 | (D 22 19) |
| 689 | (C 5 2) |
| 690 | (T 6 89) |
| 691 | (C 7 33) |
| 692 | (C 22 694) |
| 693 | (U 5 18 22) |
| 694 | (D 22 19) |
| 695 | (S 33) |
| 696 | (C 5 2) |
| 697 | (T 6 33) |
| 698 | (C 7 60) |
| 699 | (C 22 701) |
| 700 | (U 5 18 22) |
| 701 | (D 22 19) |
| 702 | (S 33) |
| 703 | (T 61 33) |
| 704 | (S 33) |
| 705 | (T 77 33) |
| 706 | (T 78 68) |
| 707 | (C 0 0) |
| 708 | (A 1 40) |
| 709 | (C 21 715) |
| 710 | (J 0 1 21) |
| 711 | (S 0) |
| 712 | (S 78) |
| 713 | (C 21 709) |
| 714 | (J 0 0 21) |
| 715 | (T 2 42) |
| 716 | (S 2) |
| 717 | (C 1 0) |
| 718 | (C 5 2) |
| 719 | (C 21 734) |
| 720 | (J 60 1 21) |
| 721 | (C 21 741) |
| 722 | (J 2 1 21) |
| 723 | (T 6 77) |
| 724 | (T 7 78) |
| 725 | (C 22 727) |
| 726 | (U 5 18 22) |
| 727 | (D 22 19) |
| 728 | (S 77) |
| 729 | (S 78) |
| 730 | (S 33) |
| 731 | (S 1) |
| 732 | (C 21 719) |
| 733 | (J 0 0 21) |
| 734 | (T 6 61) |
| 735 | (C 7 77) |
| 736 | (C 22 738) |
| 737 | (U 5 18 22) |
| 738 | (D 22 19) |
| 739 | (C 21 721) |
| 740 | (J 0 0 21) |
| 741 | (C 0 0) |
| 742 | (T 49 48) |
| 743 | (C 21 749) |
| 744 | (J 48 0 21) |
| 745 | (S 0) |
| 746 | (S 49) |
| 747 | (C 21 743) |
| 748 | (J 0 0 21) |
| 749 | (C 5 2) |
| 750 | (T 6 33) |
| 751 | (C 7 49) |
| 752 | (C 22 754) |
| 753 | (U 5 18 22) |
| 754 | (D 22 19) |
| 755 | (C 5 2) |
| 756 | (T 6 90) |
| 757 | (C 7 33) |
| 758 | (C 22 760) |
| 759 | (U 5 18 22) |
| 760 | (D 22 19) |
| 761 | (S 33) |
| 762 | (T 77 33) |
| 763 | (T 78 50) |
| 764 | (C 0 0) |
| 765 | (S 49) |
| 766 | (T 6 77) |
| 767 | (T 7 78) |
| 768 | (C 22 770) |
| 769 | (U 5 18 22) |
| 770 | (D 22 19) |
| 771 | (C 21 779) |
| 772 | (J 49 0 21) |
| 773 | (S 77) |
| 774 | (S 78) |

-continued

| Number | Instruction |
|---|---|
| 775 | (S 33) |
| 776 | (S 0) |
| 777 | (C 21 766) |
| 778 | (J 0 0 21) |
| 779 | (S 33) |
| 780 | (T 84 83) |
| 781 | (C 21 840) |
| 782 | (J 84 85 21) |
| 783 | (T 77 84) |
| 784 | (T 78 85) |
| 785 | (S 77) |
| 786 | (S 77) |
| 787 | (S 77) |
| 788 | (S 77) |
| 789 | (S 77) |
| 790 | (S 78) |
| 791 | (S 78) |
| 792 | (S 78) |
| 793 | (S 78) |
| 794 | (S 78) |
| 795 | (A 1 77) |
| 796 | (A 2 78) |
| 797 | (C 21 801) |
| 798 | (J 1 2 21) |
| 799 | (C 21 836) |
| 800 | (J 0 0 21) |
| 801 | (S 77) |
| 802 | (S 78) |
| 803 | (A 75 77) |
| 804 | (A 76 78) |
| 805 | (C 21 809) |
| 806 | (J 75 76 21) |
| 807 | (C 21 836) |
| 808 | (J 0 0 21) |
| 809 | (S 77) |
| 810 | (S 78) |
| 811 | (A 79 77) |
| 812 | (A 80 78) |
| 813 | (C 21 817) |
| 814 | (J 79 80 21) |
| 815 | (C 21 836) |
| 816 | (J 0 0 21) |
| 817 | (S 77) |
| 818 | (S 78) |
| 819 | (S 77) |
| 820 | (S 78) |
| 821 | (C 0 0) |
| 822 | (S 1) |
| 823 | (A 79 77) |
| 824 | (A 80 78) |
| 825 | (C 21 829) |
| 826 | (J 79 80 21) |
| 827 | (C 21 836) |
| 828 | (J 0 0 21) |
| 829 | (S 77) |
| 830 | (S 78) |
| 831 | (S 0) |
| 832 | (C 21 856) |
| 833 | (J 0 1 21) |
| 834 | (C 21 823) |
| 835 | (J 0 0 21) |
| 836 | (A 0 84) |
| 837 | (T 84 0) |
| 838 | (C 21 781) |
| 839 | (J 0 0 21) |
| 840 | (C 5 2) |
| 841 | (T 6 85) |
| 842 | (C 7 33) |
| 843 | (C 22 845) |
| 844 | (U 5 18 22) |
| 845 | (D 22 19) |
| 846 | (T 85 33) |
| 847 | (S 33) |
| 848 | (T 155 33) |
| 849 | (C 0 0) |
| 850 | (T 6 85) |
| 851 | (C 7 0) |
| 852 | (C 22 854) |
| 853 | (U 5 18 22) |
| 854 | (D 22 19) |
| 855 | (S 81) |
| 856 | (C 21 314) |
| 857 | (J 0 0 21) |
| 858 | (T 86 155) |
| 859 | (T 33 86) |
| 860 | (T 84 83) |
| 861 | (C 0 0) |
| 862 | (C 5 2) |
| 863 | (C 21 876) |
| 864 | (J 0 81 21) |
| 865 | (C 7 84) |
| 866 | (T 6 33) |
| 867 | (C 22 869) |
| 868 | (U 5 18 22) |
| 869 | (D 22 19) |
| 870 | (S 0) |
| 871 | (S 33) |
| 872 | (A 2 84) |
| 873 | (T 84 2) |
| 874 | (C 21 863) |
| 875 | (J 0 0 21) |
| 876 | (C 0 0) |
| 877 | (T 155 33) |
| 878 | (S 155) |
| 879 | (T 33 86) |
| 880 | (T 91 155) |
| 881 | (S 155) |
| 882 | (T 99 155) |
| 883 | (T 93 99) |
| 884 | (C 96 1) |
| 885 | (C 97 1) |
| 886 | (C 21 1017) |
| 887 | (J 0 81 21) |
| 888 | (T 94 93) |
| 889 | (S 93) |
| 890 | (A 77 33) |
| 891 | (S 77) |
| 892 | (S 77) |
| 893 | (T 88 77) |
| 894 | (S 77) |
| 895 | (T 89 77) |
| 896 | (S 77) |
| 897 | (T 90 77) |
| 898 | (C 5 2) |
| 899 | (T 6 93) |
| 900 | (A 7 90) |
| 901 | (C 22 903) |
| 902 | (U 5 18 22) |
| 903 | (D 22 19) |
| 904 | (S 93) |
| 905 | (T 6 93) |
| 906 | (A 7 89) |
| 907 | (C 22 909) |
| 908 | (U 5 18 22) |
| 909 | (D 22 19) |
| 910 | (S 93) |
| 911 | (T 6 93) |
| 912 | (A 78 89) |
| 913 | (S 78) |
| 914 | (T 7 78) |
| 915 | (C 22 917) |
| 916 | (U 5 18 22) |
| 917 | (D 22 19) |
| 918 | (A 102 78) |
| 919 | (S 93) |
| 920 | (T 6 93) |
| 921 | (S 77) |
| 922 | (T 7 77) |
| 923 | (C 22 925) |
| 924 | (U 5 18 22) |
| 925 | (D 22 19) |
| 926 | (A 103 77) |
| 927 | (S 93) |
| 928 | (T 6 93) |

| Number | Instruction |
|---|---|
| 929 | (T 77 93) |
| 930 | (S 77) |
| 931 | (S 77) |
| 932 | (S 77) |
| 933 | (S 77) |
| 934 | (C 7 77) |
| 935 | (C 22 937) |
| 936 | (U 5 18 22) |
| 937 | (D 22 19) |
| 938 | (T 104 77) |
| 939 | (C 1 0) |
| 940 | (C 21 946) |
| 941 | (J 1 102 21) |
| 942 | (S 77) |
| 943 | (S 1) |
| 944 | (C 21 940) |
| 945 | (J 0 0 21) |
| 946 | (S 93) |
| 947 | (T 6 93) |
| 948 | (C 7 77) |
| 949 | (C 22 951) |
| 950 | (U 5 18 22) |
| 951 | (D 22 19) |
| 952 | (C 21 958) |
| 953 | (J 1 103 21) |
| 954 | (S 77) |
| 955 | (S 1) |
| 956 | (C 21 952) |
| 957 | (J 0 0 21) |
| 958 | (S 93) |
| 959 | (T 6 93) |
| 960 | (C 7 77) |
| 961 | (C 22 963) |
| 962 | (U 5 18 22) |
| 963 | (D 22 19) |
| 964 | (S 93) |
| 965 | (T 6 93) |
| 966 | (C 7 96) |
| 967 | (C 22 969) |
| 968 | (U 5 18 22) |
| 969 | (D 22 19) |
| 970 | (S 93) |
| 971 | (C 1 0) |
| 972 | (A 77 89) |
| 973 | (S 77) |
| 974 | (S 77) |
| 975 | (S 77) |
| 976 | (T 6 93) |
| 977 | (T 7 77) |
| 978 | (C 22 980) |
| 979 | (U 5 18 22) |
| 980 | (D 22 19) |
| 981 | (C 21 988) |
| 982 | (J 1 103 21) |
| 983 | (S 1) |
| 984 | (S 93) |
| 985 | (S 77) |
| 986 | (C 21 976) |
| 987 | (J 0 0 21) |
| 988 | (S 93) |
| 989 | (A 77 90) |
| 990 | (C 1 1) |
| 991 | (A 49 77) |
| 992 | (S 77) |
| 993 | (T 6 93) |
| 994 | (T 7 77) |
| 995 | (C 22 997) |
| 996 | (U 5 18 22) |
| 997 | (D 22 19) |
| 998 | (C 21 1005) |
| 999 | (J 1 49 21) |
| 1000 | (S 1) |
| 1001 | (S 93) |
| 1002 | (S 77) |
| 1003 | (C 21 993) |
| 1004 | (J 0 0 21) |
| 1005 | (S 93) |
| 1006 | (T 6 94) |
| 1007 | (C 7 93) |
| 1008 | (C 22 1010) |
| 1009 | (U 5 18 22) |
| 1010 | (D 22 19) |
| 1011 | (S 0) |
| 1012 | (S 33) |
| 1013 | (S 96) |
| 1014 | (T 155 93) |
| 1015 | (C 21 886) |
| 1016 | (J 0 0 21) |
| 1017 | (T 101 81) |
| 1018 | (T 98 101) |
| 1019 | (C 101 0) |
| 1020 | (C 96 0) |
| 1021 | (C 21 1551) |
| 1022 | (J 96 98 21) |
| 1023 | (T 92 99) |
| 1024 | (T 94 92) |
| 1025 | (T 99 155) |
| 1026 | (T 100 99) |
| 1027 | (C 21 1018) |
| 1028 | (J 96 98 21) |
| 1029 | (C 87 0) |
| 1030 | (T 84 86) |
| 1031 | (C 21 1545) |
| 1032 | (J 87 81 21) |
| 1033 | (A 33 84) |
| 1034 | (S 87) |
| 1035 | (T 93 94) |
| 1036 | (S 93) |
| 1037 | (A 137 93) |
| 1038 | (S 93) |
| 1039 | (A 105 93) |
| 1040 | (S 93) |
| 1041 | (A 109 93) |
| 1042 | (S 93) |
| 1043 | (A 111 93) |
| 1044 | (S 93) |
| 1045 | (A 113 93) |
| 1046 | (S 93) |
| 1047 | (A 115 93) |
| 1048 | (S 93) |
| 1049 | (A 117 93) |
| 1050 | (C 107 0) |
| 1051 | (S 33) |
| 1052 | (A 138 33) |
| 1053 | (S 33) |
| 1054 | (T 88 33) |
| 1055 | (S 33) |
| 1056 | (T 89 33) |
| 1057 | (S 33) |
| 1058 | (T 90 33) |
| 1059 | (S 33) |
| 1060 | (A 112 33) |
| 1061 | (A 33 88) |
| 1062 | (A 106 33) |
| 1063 | (S 33) |
| 1064 | (A 110 33) |
| 1065 | (S 33) |
| 1066 | (A 116 33) |
| 1067 | (S 33) |
| 1068 | (T 114 33) |
| 1069 | (C 108 0) |
| 1070 | (C 21 1074) |
| 1071 | (J 105 106 21) |
| 1072 | (C 21 1173) |
| 1073 | (J 0 0 21) |
| 1074 | (T 118 115) |
| 1075 | (T 119 116) |
| 1076 | (T 1 109) |
| 1077 | (T 2 110) |
| 1078 | (A 3 118) |
| 1079 | (A 4 119) |
| 1080 | (C 21 1084) |
| 1081 | (J 3 21) |
| 1082 | (C 21 1173) |

-continued

| Number | Instruction |
|---|---|
| 1083 | (J 0 0 21) |
| 1084 | (C 21 1094) |
| 1085 | (J 1 111 21) |
| 1086 | (C 21 1098) |
| 1087 | (J 2 112 21) |
| 1088 | (S 1) |
| 1089 | (S 2) |
| 1090 | (S 118) |
| 1091 | (S 119) |
| 1092 | (C 21 1078) |
| 1093 | (J 0 0 21) |
| 1094 | (C 125 1) |
| 1095 | (C 126 0) |
| 1096 | (C 21 1100) |
| 1097 | (J 0 0 21) |
| 1098 | (C 125 0) |
| 1099 | (C 126 1) |
| 1100 | (T 1 107) |
| 1101 | (T 2 108) |
| 1102 | (C 0 0) |
| 1103 | (C 21 1112) |
| 1104 | (J 1 109 21) |
| 1105 | (C 21 1136) |
| 1106 | (J 2 110 21) |
| 1107 | (S 0) |
| 1108 | (S 1) |
| 1109 | (S 2) |
| 1110 | (C 21 1103) |
| 1111 | (J 0 0 21) |
| 1112 | (C 127 1) |
| 1113 | (C 128 0) |
| 1114 | (T 118 113) |
| 1115 | (C 0 0) |
| 1116 | (C 21 1122) |
| 1117 | (J 107 0 21) |
| 1118 | (S 0) |
| 1119 | (S 118) |
| 1120 | (C 21 1116) |
| 1121 | (J 0 0 21) |
| 1122 | (T 119 114) |
| 1123 | (C 3 0) |
| 1124 | (C 21 1130) |
| 1125 | (J 108 3 21) |
| 1126 | (S 3) |
| 1127 | (S 119) |
| 1128 | (C 21 1124) |
| 1129 | (J 0 0 21) |
| 1130 | (C 21 1160) |
| 1131 | (J 2 110 21) |
| 1132 | (S 119) |
| 1133 | (S 2) |
| 1134 | (C 21 1130) |
| 1135 | (J 0 0 21) |
| 1136 | (C 127 0) |
| 1137 | (C 128 1) |
| 1138 | (T 119 114) |
| 1139 | (C 0 0) |
| 1140 | (C 21 1146) |
| 1141 | (J 108 0 21) |
| 1142 | (S 0) |
| 1143 | (S 119) |
| 1144 | (C 21 1140) |
| 1145 | (J 0 0 21) |
| 1146 | (T 118 113) |
| 1147 | (C 3 0) |
| 1148 | (C 21 1154) |
| 1149 | (J 107 3 21) |
| 1150 | (S 3) |
| 1151 | (S 118) |
| 1152 | (C 21 1148) |
| 1153 | (J 0 0 21) |
| 1154 | (C 21 1160) |
| 1155 | (J 1 109 21) |
| 1156 | (S 118) |
| 1157 | (S 1) |
| 1158 | (C 21 1154) |
| 1159 | (J 0 0 21) |

-continued

| Number | Instruction |
|---|---|
| 1160 | (C 21 1176) |
| 1161 | (J 118 115 21) |
| 1162 | (J 119 116 21) |
| 1163 | (A 3 118) |
| 1164 | (A 4 119) |
| 1165 | (C 21 1169) |
| 1166 | (J 3 4 21) |
| 1167 | (C 21 1173) |
| 1168 | (J 0 0 21) |
| 1169 | (S 118) |
| 1170 | (S 119) |
| 1171 | (C 21 1160) |
| 1172 | (J 0 0 21) |
| 1173 | (C 120 0) |
| 1174 | (C 21 1542) |
| 1175 | (J 0 0 21) |
| 1176 | (C 120 1) |
| 1177 | (C 121 0) |
| 1178 | (C 122 0) |
| 1179 | (C 123 0) |
| 1180 | (C 124 0) |
| 1181 | (C 21 1189) |
| 1182 | (J 120 127 21) |
| 1183 | (C 21 1195) |
| 1184 | (J 120 126 21) |
| 1185 | (C 21 1198) |
| 1186 | (J 120 125 21) |
| 1187 | (C 21 1361) |
| 1188 | (J 0 0 21) |
| 1189 | (C 21 1201) |
| 1190 | (J 120 125 21) |
| 1191 | (C 21 1204) |
| 1192 | (J 120 126 21) |
| 1193 | (C 21 1361) |
| 1194 | (J 0 0 21) |
| 1195 | (C 121 1) |
| 1196 | (C 21 1205) |
| 1197 | (J 0 0 21) |
| 1198 | (C 122 1) |
| 1199 | (C 21 1205) |
| 1200 | (J 0 0 21) |
| 1201 | (C 123 1) |
| 1202 | (C 21 1205) |
| 1203 | (J 0 0 21) |
| 1204 | (C 124 1) |
| 1205 | (T 132 100) |
| 1206 | (S 132) |
| 1207 | (S 132) |
| 1208 | (S 132) |
| 1209 | (S 132) |
| 1210 | (S 132) |
| 1211 | (S 132) |
| 1212 | (S 132) |
| 1213 | (C 3 0) |
| 1214 | (S 132) |
| 1215 | (S 3) |
| 1216 | (S 132) |
| 1217 | (C 21 1221) |
| 1218 | (J 3 97 21) |
| 1219 | (C 21 1215) |
| 1220 | (J 0 0 21) |
| 1221 | (S 132) |
| 1222 | (C 145 0) |
| 1223 | (A 78 89) |
| 1224 | (A 129 78) |
| 1225 | (S 78) |
| 1226 | (A 146 78) |
| 1227 | (S 78) |
| 1228 | (S 78) |
| 1229 | (T 142 78) |
| 1230 | (T 147 112) |
| 1231 | (C 21 1239) |
| 1232 | (J 120 121 21) |
| 1233 | (J 120 122 21) |
| 1234 | (C 21 1308) |
| 1235 | (J 120 123 21) |
| 1236 | (J 120 124 21) |

-continued

| Number | Instruction |
|---|---|
| 1237 | (C 21 1542) |
| 1238 | (J 0 0 21) |
| 1239 | (T 0 110) |
| 1240 | (C 135 0) |
| 1241 | (C 21 1247) |
| 1242 | (J 0 109 21) |
| 1243 | (S 0) |
| 1244 | (S 135) |
| 1245 | (C 21 1241) |
| 1246 | (J 0 0 21) |
| 1247 | (C 1 0) |
| 1248 | (T 118 113) |
| 1249 | (T 131 132) |
| 1250 | (C 5 2) |
| 1251 | (C 139 0) |
| 1252 | (C 3 0) |
| 1253 | (C 141 0) |
| 1254 | (T 6 131) |
| 1255 | (T 7 118) |
| 1256 | (C 22 1258) |
| 1257 | (U 5 18 22) |
| 1258 | (D 22 19) |
| 1259 | (S 131) |
| 1260 | (S 118) |
| 1261 | (S 1) |
| 1262 | (S 3) |
| 1263 | (S 141) |
| 1264 | (C 21 1268) |
| 1265 | (J 1 135 21) |
| 1266 | (C 21 1254) |
| 1267 | (J 0 0 21) |
| 1268 | (C 1 0) |
| 1269 | (T 144 142) |
| 1270 | (T 6 131) |
| 1271 | (T 7 144) |
| 1272 | (C 22 1274) |
| 1273 | (U 5 18 22) |
| 1274 | (D 22 19) |
| 1275 | (C 21 1287) |
| 1276 | (J 1 146 21) |
| 1277 | (C 21 1291) |
| 1278 | (J 1 147 21) |
| 1279 | (S 131) |
| 1280 | (S 144) |
| 1281 | (S 118) |
| 1282 | (S 1) |
| 1283 | (S 3) |
| 1284 | (S 141) |
| 1285 | (C 21 1270) |
| 1286 | (J 0 0 21) |
| 1287 | (T 140 3) |
| 1288 | (T 133 131) |
| 1289 | (C 21 1277) |
| 1290 | (J 0 0 21) |
| 1291 | (C 21 1361) |
| 1292 | (J 120 122 21) |
| 1293 | (S 131) |
| 1294 | (S 118) |
| 1295 | (T 6 131) |
| 1296 | (T 7 118) |
| 1297 | (C 22 1299) |
| 1298 | (U 5 18 22) |
| 1299 | (D 22 19) |
| 1300 | (C 21 1361) |
| 1301 | (J 3 111 21) |
| 1302 | (S 131) |
| 1303 | (S 118) |
| 1304 | (S 3) |
| 1305 | (S 141) |
| 1306 | (C 21 1295) |
| 1307 | (J 0 0 21) |
| 1308 | (C 1 0) |
| 1309 | (T 3 109) |
| 1310 | (C 5 2) |
| 1311 | (C 141 0) |
| 1312 | (T 131 132) |
| 1313 | (T 144 142) |

-continued

| Number | Instruction |
|---|---|
| 1314 | (T 6 131) |
| 1315 | (T 7 144) |
| 1316 | (C 22 1318) |
| 1317 | (U 5 18 22) |
| 1318 | (D 22 19) |
| 1319 | (C 21 1334) |
| 1320 | (J 1 146 21) |
| 1321 | (C 21 1338) |
| 1322 | (J 3 110 21) |
| 1323 | (C 21 1342) |
| 1324 | (J 1 147 21) |
| 1325 | (S 131) |
| 1326 | (S 144) |
| 1327 | (S 118) |
| 1328 | (S 1) |
| 1329 | (S 3) |
| 1330 | (S 4) |
| 1331 | (S 141) |
| 1332 | (C 21 1314) |
| 1333 | (J 0 0 21) |
| 1334 | (T 140 146) |
| 1335 | (T 133 131) |
| 1336 | (C 21 1321) |
| 1337 | (J 0 0 21) |
| 1338 | (T 118 113) |
| 1339 | (C 4 0) |
| 1340 | (C 21 1323) |
| 1341 | (J 0 0 21) |
| 1342 | (C 21 1361) |
| 1343 | (J 120 123 21) |
| 1344 | (S 131) |
| 1345 | (S 118) |
| 1346 | (T 6 131) |
| 1347 | (T 7 118) |
| 1348 | (C 22 1350) |
| 1349 | (U 5 18 22) |
| 1350 | (D 22 19) |
| 1351 | (C 21 1361) |
| 1352 | (J 4 111 21) |
| 1353 | (S 131) |
| 1354 | (S 118) |
| 1355 | (S 4) |
| 1356 | (S 141) |
| 1357 | (C 21 1346) |
| 1358 | (J 0 0 21) |
| 1359 | (C 21 1361) |
| 1360 | (J 0 0 21) |
| 1361 | (T 130 129) |
| 1362 | (T 134 131) |
| 1363 | (S 131) |
| 1364 | (T 136 131) |
| 1365 | (T 77 117) |
| 1366 | (S 77) |
| 1367 | (C 1 1) |
| 1368 | (T 6 136) |
| 1369 | (T 7 77) |
| 1370 | (C 22 1372) |
| 1371 | (U 5 18 22) |
| 1372 | (D 22 19) |
| 1373 | (C 21 1380) |
| 1374 | (J 1 137 21) |
| 1375 | (S 1) |
| 1376 | (S 136) |
| 1377 | (S 77) |
| 1378 | (C 21 1368) |
| 1379 | (J 0 0 21) |
| 1380 | (A 77 90) |
| 1381 | (C 1 1) |
| 1382 | (A 49 77) |
| 1383 | (S 77) |
| 1384 | (S 136) |
| 1385 | (T 6 136) |
| 1386 | (T 7 77) |
| 1387 | (C 22 1389) |
| 1388 | (U 5 18 22) |
| 1389 | (D 22 19) |
| 1390 | (S 137) |

| Number | Instruction |
|---|---|
| 1391 | (S 136) |
| 1392 | (S 77) |
| 1393 | (C 21 1398) |
| 1394 | (J 1 49 21) |
| 1395 | (S 1) |
| 1396 | (C 21 1385) |
| 1397 | (J 0 0 21) |
| 1398 | (T 6 100) |
| 1399 | (C 7 136) |
| 1400 | (C 22 1402) |
| 1401 | (U 5 18 22) |
| 1402 | (D 22 19) |
| 1403 | (T 136 100) |
| 1404 | (S 136) |
| 1405 | (C 5 2) |
| 1406 | (T 6 136) |
| 1407 | (C 7 137) |
| 1408 | (C 22 1410) |
| 1409 | (U 5 18 22) |
| 1410 | (D 22 19) |
| 1411 | (S 136) |
| 1412 | (T 6 136) |
| 1413 | (C 7 130) |
| 1414 | (C 22 1416) |
| 1415 | (U 5 18 22) |
| 1416 | (D 22 19) |
| 1417 | (S 136) |
| 1418 | (T 6 136) |
| 1419 | (C 7 140) |
| 1420 | (C 22 1422) |
| 1421 | (U 5 18 22) |
| 1422 | (D 22 19) |
| 1423 | (S 136) |
| 1424 | (T 6 136) |
| 1425 | (C 7 141) |
| 1426 | (C 22 1428) |
| 1427 | (U 5 18 22) |
| 1428 | (D 22 19) |
| 1429 | (S 136) |
| 1430 | (T 6 136) |
| 1431 | (C 7 132) |
| 1432 | (C 22 1434) |
| 1433 | (U 5 18 22) |
| 1434 | (D 22 19) |
| 1435 | (S 136) |
| 1436 | (T 6 136) |
| 1437 | (C 7 133) |
| 1438 | (C 22 1440) |
| 1439 | (U 5 18 22) |
| 1440 | (D 22 19) |
| 1441 | (S 136) |
| 1442 | (T 6 136) |
| 1443 | (C 7 134) |
| 1444 | (C 22 1446) |
| 1445 | (U 5 18 22) |
| 1446 | (D 22 19) |
| 1447 | (T 93 94) |
| 1448 | (S 93) |
| 1449 | (S 93) |
| 1450 | (S 93) |
| 1451 | (S 93) |
| 1452 | (S 93) |
| 1453 | (S 93) |
| 1454 | (S 93) |
| 1455 | (C 3 0) |
| 1456 | (S 136) |
| 1457 | (S 93) |
| 1458 | (T 6 136) |
| 1459 | (T 7 93) |
| 1460 | (C 22 1462) |
| 1461 | (U 5 18 22) |
| 1462 | (D 22 19) |
| 1463 | (S 3) |
| 1464 | (S 136) |
| 1465 | (C 21 1469) |
| 1466 | (J 3 97 21) |
| 1467 | (C 21 1458) |
| 1468 | (J 0 0 21) |
| 1469 | (T 6 136) |
| 1470 | (C 7 138) |
| 1471 | (C 22 1473) |
| 1472 | (U 5 18 22) |
| 1473 | (D 22 19) |
| 1474 | (S 101) |
| 1475 | (C 151 1) |
| 1476 | (C 0 0) |
| 1477 | (C 21 1484) |
| 1478 | (J 0 137 21) |
| 1479 | (S 0) |
| 1480 | (S 0) |
| 1481 | (S 151) |
| 1482 | (C 21 1477) |
| 1483 | (J 0 0 21) |
| 1484 | (C 150 0) |
| 1485 | (C 21 1538) |
| 1486 | (S 150) |
| 1487 | (J 150 151 21) |
| 1488 | (S 150) |
| 1489 | (J 150 151 21) |
| 1490 | (T 148 134) |
| 1491 | (S 148) |
| 1492 | (C 153 0) |
| 1493 | (T 149 148) |
| 1494 | (C 0 0) |
| 1495 | (C 21 1507) |
| 1496 | (J 0 150 21) |
| 1497 | (S 0) |
| 1498 | (S 0) |
| 1499 | (S 149) |
| 1500 | (S 149) |
| 1501 | (S 153) |
| 1502 | (S 153) |
| 1503 | (C 21 1485) |
| 1504 | (J 153 137 21) |
| 1505 | (C 21 1495) |
| 1506 | (J 0 0 21) |
| 1507 | (T 77 148) |
| 1508 | (T 78 149) |
| 1509 | (C 0 0) |
| 1510 | (T 154 153) |
| 1511 | (A 3 77) |
| 1512 | (A 4 78) |
| 1513 | (C 21 1517) |
| 1514 | (J 3 4 21) |
| 1515 | (C 21 1527) |
| 1516 | (J 0 0 21) |
| 1517 | (S 77) |
| 1518 | (S 78) |
| 1519 | (S 0) |
| 1520 | (S 154) |
| 1521 | (C 21 1557) |
| 1522 | (J 0 150 21) |
| 1523 | (C 21 1485) |
| 1524 | (J 154 137 21) |
| 1525 | (C 21 1511) |
| 1526 | (J 0 0 21) |
| 1527 | (S 148) |
| 1528 | (S 148) |
| 1529 | (S 149) |
| 1530 | (S 149) |
| 1531 | (C 21 1485) |
| 1532 | (S 153) |
| 1533 | (J 153 137 21) |
| 1534 | (S 153) |
| 1535 | (J 153 137 21) |
| 1536 | (C 21 1507) |
| 1537 | (J 0 0 21) |
| 1538 | (A 9 100) |
| 1539 | (T 100 9) |
| 1540 | (T 155 100) |
| 1541 | (S 155) |
| 1542 | (S 84) |
| 1543 | (C 21 1031) |
| 1544 | (J 0 0 21) |

-continued

| Number | Instruction |
|--------|-------------|
| 1545 | (S 96) |
| 1546 | (A 95 94) |
| 1547 | (T 94 95) |
| 1548 | (C 21 1027) |
| 1549 | (J 0 0 21) |
| 1550 | (S 97) |
| 1551 | (C 0 72) |
| 1552 | (C 1 65) |
| 1553 | (C 2 76) |
| 1554 | (C 3 84) |
| 1555 | (C 21 1590) |
| 1556 | (J 0 0 21) |
| 1557 | (C 0 73) |
| 1558 | (C 1 77) |
| 1559 | (C 2 77) |
| 1560 | (C 3 79) |
| 1561 | (C 4 82) |
| 1562 | (C 5 84) |
| 1563 | (C 6 65) |
| 1564 | (C 7 76) |
| 1565 | (T 8 150) |
| 1566 | (T 9 148) |
| 1567 | (T 10 149) |
| 1568 | (C 21 1590) |
| 1569 | (J 0 0 21) |
| 1570 | (C 0 69) |
| 1571 | (C 1 82) |
| 1572 | (C 2 82) |
| 1573 | (C 3 79) |
| 1574 | (C 4 82) |
| 1575 | (C 5 32) |
| 1576 | (C 6 84) |
| 1577 | (C 7 85) |
| 1578 | (C 8 82) |
| 1579 | (C 9 73) |
| 1580 | (C 10 78) |
| 1581 | (C 11 71) |
| 1582 | (C 12 32) |
| 1583 | (C 13 80) |
| 1584 | (C 14 82) |
| 1585 | (C 15 79) |
| 1586 | (C 16 71) |
| 1587 | (C 17 82) |
| 1588 | (C 18 65) |
| 1589 | (C 19 77) |

The invention claimed is:

1. A machine implemented method comprising:
   executing, by a machine, a computation with a collection of prime directed edges, each prime directed edge being defined as including at least a pairs of execution nodes, the collection of prime directed edges forming a collection of pairs of execution nodes, the machine including
   at least a memory system for storing data and machine instructions, the data including sequences of symbols,
   a head for reading the sequence of symbols in the memory system and writing a sequence of symbols to the memory system, and
   a controller for implementing machine instructions read from the memory system, wherein
      each pair of execution nodes represents a machine instruction;
      each execution node has a state of the machine and a sequence of symbols, and is located at a different location in the memory system than the sequence of symbols read;
      one execution node in the pair of execution nodes represents input of the machine instruction; and
      the other execution node in the pair of execution nodes represents output of the machine instruction;
      wherein the machine determines which pair of execution nodes to execute based on the sequence of symbols read.

2. The method of claim 1, wherein said pairs of execution nodes represent a syntax of a programming language.

3. The method of claim 1, wherein for each pair of execution nodes said input is a head execution node and said output is a tail execution node and the execution node and the execution of the machine instruction is implemented with an edge pattern substitution.

4. The method of claim 3, wherein said edge pattern substitution overlap matches said head node with the current memory pattern and the memory pattern is edge substituted with the tail node.

5. The machine implemented method of claim 1, wherein said method implements a digital computer program.

6. The method of claim 5 wherein said computer program is written in the C programming language.

7. The method of claim 5 wherein said computer program is written in the JAVA programming language.

8. The method of claim 5 wherein said computer program is written in Perl.

9. The method of claim 1 wherein a computer program is translated into a collection of prime directed edges.

10. The method of claim 9 wherein said computer program is executed by link matching prime directed edges.

11. The method of claim 10 wherein possible computer program behaviors are determined by constructing prime directed edge sequences by link matching prime directed edges.

12. The method of claim 3 wherein at least two execution pairs having two distinct head nodes interact with memory patterns of different lengths.

13. A computing machine comprising:
   a memory system for storing a collection of prime directed edges, each prime directed edge being defined as including at least a pairs of execution nodes, the collection of prime directed edges forming a collection of pairs of execution nodes; and
   a head for reading a sequence of symbols in the memory system and writing a sequence of symbols in the memory system,
   the machine being configured to execute a computation with the pairs of execution nodes; wherein
   each pair of execution nodes represents a machine instruction;
   one execution node in the pair represents input of the machine instruction represented by the execution nodes;
   another execution node in the pair represents output of the machine instruction represented by the execution nodes; and
   each execution node has a state of the machine and a sequence of symbols;
   the memory also storing a first set of computing instructions, which when implemented causes the computing machine to implement a method including at least
   determining, by the computing machine, a result of executing a set
   of program instructions, the set of program instructions including more than one program instruction,
   replacing, by the computing machine, the second set of machine program instructions with a single machine instruction, represented by a pair of execution nodes, which when implemented outputs the result of executing the set of program instructions; and storing, by the computing machine each pair of execution nodes in a location where the computing machine can find and recognize the pairs of execution nodes.

14. The machine of claim 13, wherein for each pair of execution nodes said input is a head execution node and said output is a tail execution node and the execution of each machine instruction uses edge pattern substitution.

15. The machine of claim 14, wherein said edge pattern substitution overlap matches said head node with a sequence of symbols in the memory system and this sequence of symbols is edge substituted with the sequence of symbols from said tail node.

16. The machine of claim 13, wherein said machine executes a digital computer program.

17. The machine of claim 16 wherein said computer program is written in the C programming language.

18. The machine of claim 16 wherein said computer program is compiled to JAVA virtual machine instructions.

19. The machine of claim 16 wherein said computer program is written in the Haskell programming language.

20. The machine of claim 16 wherein said computer program is translated into a collection of prime directed edges.

21. The machine of claim 20 wherein said computer program is executed by link matching prime directed edges.

22. The machine of claim 21 wherein multiple computer program behaviors are constructed with prime directed edge sequences by link matching prime directed edges.

23. The machine of claim 14 wherein at least two distinct ones of said head execution nodes have sequences of symbols having sequence lengths that are different.

24. A computer implemented method comprising:
executing, by a computer, a computation with a collection of prime directed edges, each prime directed edge being defined as including at least a pairs of execution nodes, the collection of prime directed edges forming a collection of pairs of execution nodes, the computer having at least a memory system for storing data and machine instructions; each of the pairs of execution nodes representing one of the machine instructions; one execution node in the pair represents input to the machine instruction; another execution node in the pair represents output from this machine instruction; each execution node being associated with a sequence of symbols, and a number representing a location in this sequence of symbols; a first execution node of the pair being located at a first memory location; a second execution node of the pair being located at a second location in memory; the computer having a state;
the executing including at least
reading, by the computer, a sequence of symbols from a third location in memory;
updating, by the computer, the state of the computer based on the pair of execution nodes; and
writing, by the computer, to the third location in memory based on the pair of execution of nodes.

25. The method of claim 23, further comprising:
determining a result of a set of machine instructions, and
replacing the set of machine instructions with a pair of execution nodes, which when implemented outputs the result.

26. A computer comprising:
a memory system storing a set of machine instructions represented by a collection of prime directed edges, each prime directed edge being defined as including at least a pair of execution nodes the collection of prime directed edges forming a collection of pairs of execution nodes, in a first location in memory, each pair of execution nodes representing a machine instruction; one execution node of the pair representing input to the machine instruction that is represented by the pair of execution nodes; another execution node of the pair representing output from the machine instruction represented by the pair execution nodes; each execution node being associated with a sequence of symbols; the computer having a state; and
the computer implementing the of machine instructions and changing the state of the computer based on the pair of execution nodes executed;
the memory system also storing a set of computing instructions located in a second location in the memory system, which when implemented
causes the computer to implement a method including at least
determining, by the computer, a result of executing a set of program instructions, the set of program instructions including more than
one program instruction,
replacing, by the computer, the set of program instructions with a single machine instruction, represented by a pair of execution nodes, which when implemented outputs the result of executing the set of program instructions; and
storing, by the computer, the pair of execution nodes with the collection of execution nodes in the memory system.

27. The method of claim 1, further comprising:
determining a result of a set of machine instructions, and
replacing the set of machine instructions with a pair of execution nodes, which when implemented outputs the result.

28. The method of claim 24, each pair of execution nodes having a head execution node and a tail execution node,
the tail execution node being the execution node that represents the output, which is located at a first location in memory, and
the head execution node being the execution node that represents the input, which is located in a second location in memory,
the method further comprising:
searching the collection of execution nodes for a head execution node of a pair of execution nodes that has a first sequence of symbols that has a portion that matches a portion of a second sequence of symbols in the third location in memory;
the updating including at least replacing the portion of the second sequence of symbols, that matched with a portion of the first sequence, with a third sequence of symbols in the tail execution node of the pair of execution nodes.

29. A computer implemented method comprising:
executing, by a computer, a computation with a collection of prime directed edges, each prime directed edge being defined as including at least a pairs of execution nodes, the collection of prime directed edges forming a collection of pairs of execution nodes, the computer having at least a memory system for storing data and machine instructions; each of the pairs of execution nodes representing one of the machine instructions; one execution node in the pair represents input to the machine instruction; another execution node in the pair represents output from this machine instruction; each execution node being associated with a sequence of symbols, and a number representing a location in this sequence of symbols; a first execution node of the pair being located at a first memory location; a second execution node of the pair being located at a second location in memory; and
the computer having a state;
the executing including at least
   reading, by the computer, a sequence of symbols from a third location in memory;
   updating, by the computer, the state of the computer based on the pair of execution nodes; and
writing, by the computer, to the third location in memory based on the pair of execution of nodes;
wherein prior to the executing, the execution node in the pair that represents the input to the machine instruction has a predetermined association with the execution node in the pair that represents output from the machine instruction as an input-output pair of execution nodes.

* * * * *